( 12 ) United States Patent
Chang

(10) Patent No.: US 8,352,444 B1
(45) Date of Patent: Jan. 8, 2013

(54) USER-DRIVEN MENU GENERATION SYSTEM WITH DYNAMIC GENERATION OF TARGET FILES WITH PLACEHOLDERS FOR PERSISTENT CHANGE OR TEMPORARY SECURITY CHANGE OVER CLOUD COMPUTING VIRTUAL STORAGE FROM TEMPLATE FILES

(76) Inventor: Peter Hon-You Chang, Sterling Heights, MI (US)

( * ) Notice: Subject to any disclaimer, the term of this patent is extended or adjusted under 35 U.S.C. 154(b) by 0 days.

(21) Appl. No.: 13/544,552

(22) Filed: Jul. 9, 2012

Related U.S. Application Data

(60) Provisional application No. 61/572,169, filed on Jul. 11, 2011.

(51) Int. Cl.
*G06F 7/00* (2006.01)
*G06F 17/00* (2006.01)
(52) U.S. Cl. ......................... 707/694; 707/693
(58) Field of Classification Search .................. None
See application file for complete search history.

(56) References Cited

U.S. PATENT DOCUMENTS

| | | | |
|---|---|---|---|
| 4,974,160 A | 11/1990 | Bone et al. | |
| 5,041,967 A | 8/1991 | Ephrath et al. | |
| 5,220,675 A | 6/1993 | Padawer et al. | |
| 5,345,550 A | 9/1994 | Bloomfield | |
| 5,530,796 A | 6/1996 | Wang | |
| 5,625,783 A | 4/1997 | Ezekiel et al. | |
| 5,630,125 A | 5/1997 | Zellweger | |
| 5,664,182 A * | 9/1997 | Nierenberg et al. ................. 1/1 |
| 5,678,039 A | 10/1997 | Hinks et al. | |
| 5,742,818 A | 4/1998 | Shoroff et al. | |
| 5,760,768 A | 6/1998 | Gram | |
| 5,778,389 A | 7/1998 | Pruett et al. | |
| 5,784,583 A | 7/1998 | Redpath | |
| 5,799,325 A | 8/1998 | Rivette et al. | |
| 5,864,848 A | 1/1999 | Horvitz et al. | |
| 5,877,966 A | 3/1999 | Morris et al. | |
| 5,999,180 A | 12/1999 | Coskrey | |
| 6,067,087 A | 5/2000 | Krauss et al. | |
| 6,177,942 B1 | 1/2001 | Keong et al. | |
| 6,236,984 B1 * | 5/2001 | Owens et al. ................. 707/736 |

(Continued)

OTHER PUBLICATIONS

Xuanhua Shi, Chao Liu, Song Wu, Hai Jin, Xiaoxin Wu, Li Deng "A Cloud Service Cache System Based on Memory Template of Virtual Machine" Apr. 2011 IEEE.*

(Continued)

*Primary Examiner* — Neveen Abel Jalil
*Assistant Examiner* — Polina Peach
(74) *Attorney, Agent, or Firm* — Knobbe, Martens, Olson & Bear LLP

(57) ABSTRACT

Dynamic generation of target files is described. A user can select a template file. The template file includes: at least first and second changeable fields configured to be changed persistently, and a third changeable field. The second changeable field is configured to receive a security-related value. A third changeable field includes a first value configured to be changed temporarily to receive an encrypted version of the first value. The template file is parsed to generate a user interface, including: a first prompting label, corresponding to the first changeable field, requesting the user to enter the user content value, a second prompting label, corresponding to the second changeable field, requesting that the user enter audit data and/or access control data. An encrypted version of the first value corresponding to the third changeable field is generated. The first value is temporarily replaced with the encrypted value. The target file is then generated.

24 Claims, 45 Drawing Sheets

U.S. PATENT DOCUMENTS

| | | | |
|---|---|---|---|
| 6,243,700 B1 | 6/2001 | Zellweger | |
| 6,317,143 B1 | 11/2001 | Wugofski | |
| 6,317,787 B1 | 11/2001 | Boyd et al. | |
| 6,487,713 B1 | 11/2002 | Cohen et al. | |
| 6,751,306 B2 | 6/2004 | Himmel et al. | |
| 6,826,566 B2 | 11/2004 | Lewak et al. | |
| 6,886,025 B1 | 4/2005 | Britton | |
| 6,904,568 B2 | 6/2005 | Colgrove | |
| 7,020,660 B2 | 3/2006 | Woodring | |
| 7,027,975 B1 | 4/2006 | Pazandak et al. | |
| 7,191,167 B1* | 3/2007 | Turba et al. | 715/234 |
| 7,254,784 B2 | 8/2007 | Chang | |
| 7,320,007 B1 | 1/2008 | Chang | |
| 7,428,699 B1* | 9/2008 | Kane et al. | 715/236 |
| 7,594,276 B2* | 9/2009 | Grawrock et al. | 726/27 |
| 7,761,591 B2* | 7/2010 | Graham | 709/233 |
| 7,996,372 B2* | 8/2011 | Rubel, Jr. | 707/694 |
| 8,010,512 B2* | 8/2011 | Koyanagi et al. | 707/694 |
| 8,041,689 B2* | 10/2011 | Rowley | 707/694 |
| 2001/0002128 A1 | 5/2001 | Takayama et al. | |
| 2002/0065818 A1 | 5/2002 | Starr | |
| 2002/0095385 A1* | 7/2002 | McAvoy et al. | 705/51 |
| 2002/0163535 A1* | 11/2002 | Mitchell et al. | 345/744 |
| 2003/0028562 A1* | 2/2003 | Shaughnessy et al. | 707/513 |
| 2003/0098891 A1 | 5/2003 | Molander | |
| 2003/0131340 A1 | 7/2003 | McArdle | |
| 2004/0083426 A1* | 4/2004 | Sahu | 715/505 |
| 2004/0143583 A1 | 7/2004 | Poole et al. | |
| 2004/0255137 A1* | 12/2004 | Ying | 713/193 |
| 2005/0015379 A1* | 1/2005 | Aureglia et al. | 707/100 |
| 2005/0044491 A1 | 2/2005 | Peterson | |
| 2007/0061487 A1* | 3/2007 | Moore et al. | 709/246 |
| 2007/0128899 A1* | 6/2007 | Mayer | 439/152 |
| 2008/0162542 A1 | 7/2008 | Chang | |
| 2009/0019351 A1* | 1/2009 | Hitchcock et al. | 715/222 |
| 2009/0183117 A1 | 7/2009 | Chang | |
| 2009/0192972 A1* | 7/2009 | Spivack et al. | 706/50 |
| 2010/0332404 A1* | 12/2010 | Valin | 705/310 |

OTHER PUBLICATIONS

Matthias Schmidt, Niels Fallenbeck, Matthew Smith, Bernd Freisleben Secure Service-Oriented Grid Computing with Public Virtual Worker Nodes 2009 IEEE.*

Hohenstein et al., An Approach for Generating File Interfaces, Databases Systems for Advanced Applications, 1999. Proceedings., 6th International Conference on, Apr. 19-21, 1999, pp. 61-68.

* cited by examiner

Graphics User Interface

File Dialog Window

Generated Dialog Window for Menu Information

Generated Dialog Window for Place Holders Information

Example of Placeholders of Changeable Fields
(PH in the boxes stands for Placeholder)

1300
%PH_Persistent_Changeable_Field_Head_tag%
GUI_Label_of_Field%PH_Persistent_Changeabl
e_Field_End_tag% ...

1305
PH_Temporary_Changeable_Field_Head_tag#
Content#PH_Temporary_Changeable_Field_End
_tag#

1310
PH_Temporary_Changeable_Field_Head_tag#%PH_Persistent_Changeable_Field_
Head_tag%GUI_Label_of_Field%PH_Persistent_Changeable_Field_End_tag%
PH_Temporary_Changeable_Field_End_tag#

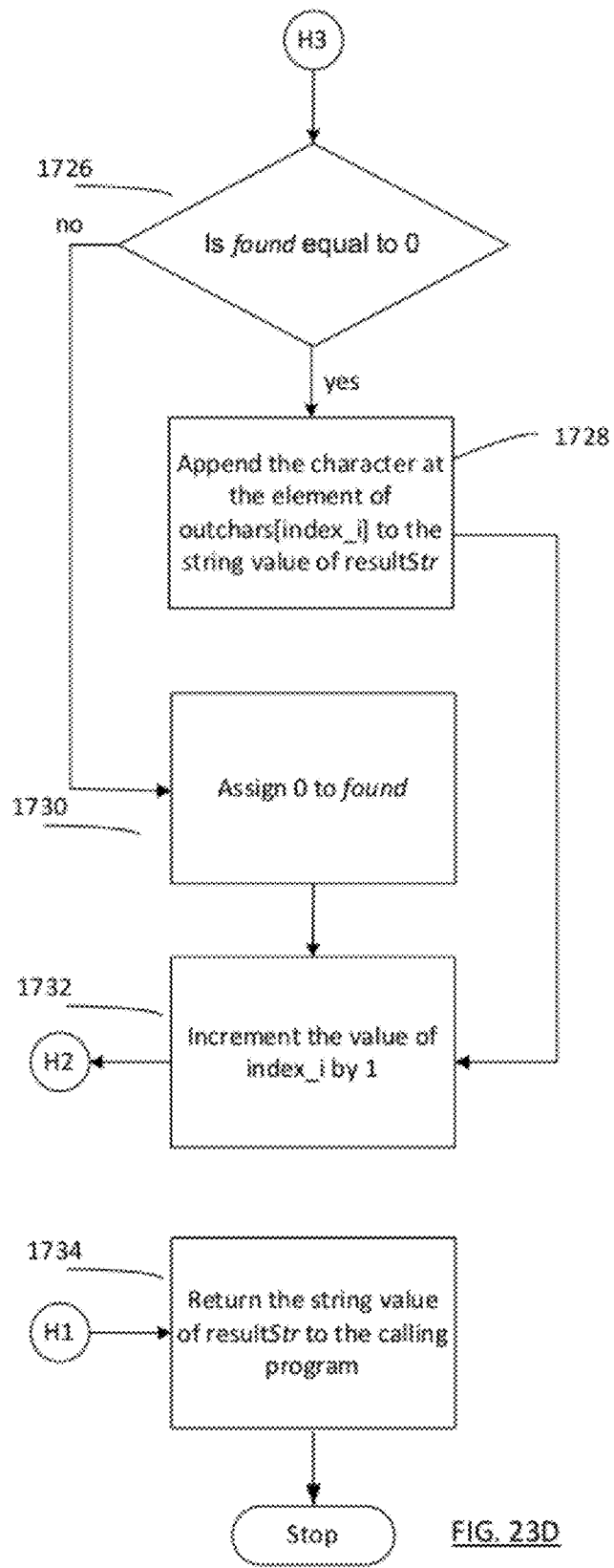

Please Enter Values:

- patient name: Smith, John
- examination date: March 26, 2012
- medical record number: 311234750
- weight: 180 lb
- height: 6 ft 2 in
- temperature: 98 f
- blood pressure: 120 / 70
- patient symptom: cough, stuffy nose
- diagnosis: cold
- treatment: cold medicine

USER-DRIVEN MENU GENERATION SYSTEM WITH DYNAMIC GENERATION OF TARGET FILES WITH PLACEHOLDERS FOR PERSISTENT CHANGE OR TEMPORARY SECURITY CHANGE OVER CLOUD COMPUTING VIRTUAL STORAGE FROM TEMPLATE FILES

CROSS-REFERENCE TO RELATED APPLICATIONS

This application claims priority from U.S. provisional patent application Ser. No. 61/572,169 filed on Jul. 11, 2011, the content of which is incorporated by reference in its entirety.

BACKGROUND OF THE INVENTION

1. Field of the Invention

This application is generally related to the generation of files.

2. Description of the Related Art

In most current popular computer operating system platforms, such as UNIX/Linux, Microsoft Windows, or Apple Mac OS platforms, files with text file type are among the most frequently used file types to store information due to the simplicity of content representation of the file. For a text file that needs to be processed frequently with a relatively small number of changeable fields, a template file can be created. An example for the text file type with template files is a file composed of texts and Extensible Markup Language (XML). A special application of XML is its use of the generation of the eXtensible HyperText Markup Language (XHTML) as a superset of the Hypertext Markup Language (HTML) for the compositions of Web pages on Web sites accessible on the Internet. XML files of various sizes are also used for many other purposes including but not limited to data storage or system configuration by many enterprise systems, such as Enterprise Resource Planning (ERP) systems, systems built from Service-Oriented Architecture (SOA), Cloud Computing systems, smartphone mobile systems, such as Apple iOS, Google Android, RIM Blackberry, and healthcare record systems, such as Electronic Medical Record (EMR) and Electronic Health Record (EHR). From a Web site of the U.S. Department of Health and Human Services, the EMR for a patient contains the clinic data of the patient; the EHR for a patient contains the information of the patient's overall health. XML files contain many static tag names and static attribute names. They typically contain relatively smaller number of fields that may be requested to be changed over a period of time. Other important types of text files that can be generated by template files with changeable fields include but not limited to operating system service files, which include UNIX/Linux shell scripts and Windows batch files, and database service files, which include Structured Query Language (SQL) script files and stored procedure files.

Security is among the utmost concerns among enterprise systems and also medical systems such as EHR or EMR. The Health Insurance Portability and Accountability Act of 1996 (HIPAA) expects security measures such as encryption, access controls and audit trail to be constructed into the EHR and EMR systems.

SUMMARY OF THE INVENTION

The embodiments of this disclosure introduce the use of user menus and activity summary files to set up an encryption and track the processing of file resources of cloud computing environments over the Internet, by an application program. Throughout this disclosure, the term of cloud computing environment is referred as CCE.

For any new file resource of a CCE that is intended to be a new text file, referred here as the target file, that are requested by users to be changed only for a relatively smaller number of fields, referred here as changeable field that are changed persistently or temporarily, over a period of time after its creation and that its unchangeable lines and unchangeable fields are known beforehand, the embodiments of disclosures introduce the use of a template file containing placeholders for the changeable fields; the template file resides on the CCE or on the local computing platform. The remaining parts of the template file consist of unchangeable lines and unchangeable fields for the target file. The change to a changeable field is persistent of type 1 or type 2. It is persistent of type 1 if it is for insertion only, which is to fill a content value for the purpose of generating the target file. It is persistent of type 2 if it is for security update only, such as updating audit trail information or access control list. The change to a changeable field is temporary if it fills a value temporarily for a security purpose such as scrambling the original content of the field, such as encrypting, and that the temporary value will be changed back to its original content, such as decrypting, when an authorized user retrieves and views the target file. The embodiments of disclosures introduce a method of dynamically retrieving the template file from the cloud and dynamically generating the target file over the cloud from the template file with the user inputs. The tools used for the dynamical retrievals and generations include but not limited to the TCL Expect Language, or automation programs developed from the C++ language Remote Procedure Call library for remote computing, or a certain implementation of a Web service.

A changeable field of a template file is named from an internal point of view. It has a field variable name in an implementation and identifies a field location in the template file. All changeable fields need to be replaced to transform the template file to a real document. A placeholder of a template file is named from an external point of view. Placeholders are ways to represent the changeable fields so that a computer program can be developed to detect them and replace them.

The present embodiments of disclosures enhance the user driven menu generation system, referred hereafter as UDMGS, and the activity tracking with menu system, referred hereafter as ATWM system, as described in U.S. Pat. No. 7,320,007. The present embodiments of disclosures add the tracking of a processing of any existing file or a new target file by an application command over the CCE. For a new target file in a CCE that is a text file and that is of a certain file type category, it also dynamically generates the file with a template file that is selected by a user among previously created template files. For a text file that is of this category, only a relatively smaller number of fields in its content, identified by placeholders, need changes, either persistently or temporarily, over a period of time after its creation and the remaining unchangeable lines and unchangeable fields are known beforehand. The change to a changeable field is persistent if it either inserts a content value at a placeholder location that needs the input by a user dynamically for the purpose of generating the target file or updates a security related fields with security information such as audit trail logging information or access control list. The change to a changeable field is temporary if it fills a value at a placeholder location temporarily for a security purpose such as scrambling the original content of the field, such as encrypting, and that the temporary value will be changed back to its original content, such as decrypting, when the target file is retrieved and viewed by an authorized user. For both existing files and new files, the embodiments of disclosures also flatten the directory or folder structure of an operating system in a CCE or a local computing platform by including the referencing of files of similar functions in menus instead of referencing them in a subdirectory or a subfolder. As discussed above, XML files contain many static tag names and static attribute names. They typically contain relatively smaller number of fields that may need changes over a period of time. A benefit of the embodiments of the disclosure herein is that it potentially increases the productivities and security of users by many folds with its capability of dynamically generating secured XML documents over a CCE and thereby saving the manual efforts of the users. The capability involves with using templates with placeholders for the changeable fields. By extracting information of the placeholders of persistent type 1, it dynamically prompts users to enter values for the changeable fields and then generates the target document. By extracting information of the placeholders of persistent type 2, it dynamically updates security information such as audit trail logging information or access control list. By automatically detecting placeholders of temporary type, it dynamically generates a security measure such as encryption to scramble the original content of the field. Instead of using a local storage device of a desktop computer, by storing over a CCE enterprise wide documents that are composed by languages such as mark-up languages that include but not limited to XML, a user can move from location to location and is still able to access these documents securely from different computing devices over the CCE.

Certain example embodiments provide a computer implemented method for generating a target file, comprising: enabling a user to select a first template file, wherein the first template file includes: a plurality of fields, including: at least first and second changeable fields configured to be changed persistently, wherein the first changeable field is configured to receive from a user a content value used to generate a target file; the second changeable field is configured to receive a security-related value; at least a third changeable field including a first value configured to be changed temporarily to receive an encrypted version of the first value; one or more unchangeable fields; parsing the first template file to generate a user interface, including: a first prompting label, corresponding to the first changeable field, requesting the user to enter the user content value, a second prompting label, corresponding to the second changeable field, requesting that the user enter audit data and/or access control data; generating an encrypted version of the first value corresponding to the third changeable field, and temporarily replacing the first value with the encrypted value; and generating the target file based at least in part on: a user input received via the first changeable field, including the user content value, a user input received via the second changeable field, including the audit data and/or access control data, and on the encrypted version of the first value.

Optionally, the second changeable field is configured to receive an audit trail update. Optionally, the second changeable field is configured to receive access control permission data. Optionally, the method further comprises: retrieving the first template file from a cloud storage system; and dynamically generating the target file from the first template file based at least in part on user inputs received via the first changeable field, the second changeable field, and on the encrypted version of the first value. Optionally, the method further comprises decrypting the encrypted version of the first value of the third changeable field at least partly in response to determining that an authorized user is accessing the first target file. Optionally, the method further comprises: detecting a first tag in the first template file indicating a first placeholder for the first changeable field; at least partly in response to detecting the first tag in the first template file, extracting information of the first placeholder, and dynamically prompting the user to enter at least one value, detecting a second tag in the first template file to indicate a second placeholder for the second changeable field; at least partly in response to detecting the second tag in the first template file, extracting information of the second placeholder, and dynamically updating security information; detecting a third tag in the first template file indicating a third placeholder for the third changeable field; and at least partly in respond to detecting the third tag in the first template file, extracting the first value of the third placeholder, and replacing it by a dynamically generated encrypted value; wherein generating the target file is performed and/or stored using a host computer or a cloud computer system. Optionally, the method further comprises: retrieving the first template file from a cloud storage system; wherein generating the target file is performed dynamically, over a host computer or a cloud computer system. Optionally, the method further comprises appending the generated target file with a selected second template file; and generating a second target file based at least in part on a parsing of the generated target file with the appended selected second template file. Optionally, the method further comprises appending the first changeable field with another changeable field or embedding the first changeable field within the third changeable field. Optionally, the method further comprises using geometric equations for points, line segments, or curve segments, to encrypt the first value corresponding to the third changeable field and then to decrypt the encrypted first value. Optionally, the target file is a markup language file. Optionally, the target file is an electronic medical record file, an electronic health record file, a smartphone mobile service file, an enterprise resource planning file, a Web service file, a cloud service file, an operating system service file, or a database service file, composed of text and/or markup language. Optionally, the method further comprises tracking the generation of the target file from the first template file using an audit trail in the form of one or more activity summary files and/or one or more tables in one or more relational databases, wherein the audit trail is describable by an object class diagram in a unified modeling language.

Certain example embodiments provide a system comprising one or more computing devices; non-transitory computer readable media having instructions stored thereon that when executed by the one or more computing devices, cause the one or more computing devices to perform operations comprising: enabling a user to select a first template file, wherein the first template file includes: a plurality of fields, including: at least first and second changeable fields configured to be changed persistently, wherein the first changeable field is configured to receive from a user a content value used to generate a target file; the second changeable field is configured to receive a security-related value; at least a third changeable field including a first value configured to be changed temporarily to receive an encrypted version of the first value; one or more unchangeable fields; parsing the first template file to generate a user interface, including: a first prompting label, corresponding to the first changeable field, requesting the user to enter the user content value, a second prompting label, corresponding to the second changeable field, requesting that the user enter audit data and/or access control data; generating an encrypted version of the first value corresponding to the third changeable field, and temporarily replacing the first value with the encrypted value; and generating the target file based at least in part on: a user input received via the first changeable field, including the user content value, a user input received via the second changeable field, including the audit data and/or access control data, and on the encrypted version of the first value.

Certain example embodiments include a non-transitory computer readable media having instructions stored thereon that when executed by a computing system, cause the computing system to perform operations comprising: enabling a user to select a first template file, wherein the first template file includes: a plurality of fields, including: at least first and second changeable fields configured to be changed persistently, wherein the first changeable field is configured to receive from a user a content value used to generate a target file; the second changeable field is configured to receive a security-related value; at least a third changeable field including a first value configured to be changed temporarily to receive an encrypted version of the first value; one or more unchangeable fields; parsing the first template file to generate a user interface, including: a first prompting label, corresponding to the first changeable field, requesting the user to enter the user content value, a second prompting label, corresponding to the second changeable field, requesting that the user enter audit data and/or access control data; generating an encrypted version of the first value corresponding to the third changeable field, and temporarily replacing the first value with the encrypted value; and generating the target file based at least in part on: a user input received via the first changeable field, including the user content value, a user input received via the second changeable field, including the audit data and/or access control data, and on the encrypted version of the first value.

BRIEF DESCRIPTION OF THE DRAWINGS

FIG. 16 illustrates an example of the placeholders of a persistent changeable field, a temporary changeable field, and a persistent changeable field embedded within a temporary changeable field. Each placeholder begins with a head tag and ends with an end tag. As is shown in the figure, there is no restriction on the locations of these fields.

FIG. 17 illustrates an example screen image of a dialog frame window created by executing a dynamic dialog frame method that is generated from using the extracted field names from placeholders of persistent types 1 and 2 in an XML based template file as labels in the dialog frame window.

FIG. 30 illustrates an example screen image of a dialog frame window created by executing a dynamic dialog frame method that is generated from using the extracted field names from placeholders of persistent types 1 for prompting a healthcare user to enter a patient's medical record information.

DETAILED DESCRIPTION OF PREFERRED EMBODIMENTS

The systems and methods of the present embodiments of disclosures are illustrated and described herein in connection with certain embodiments, with the perception that the present disclosure is to be regarded as an exemplification of the various aspects and principles of the present embodiments of disclosures and the associated functional specifications needed for their implementation. However, it should be appreciated that the systems and methods of the present embodiments of disclosures may be implemented in still different configurations, forms and variations, based on the understandings herein.

The systems and methods of the present embodiments of disclosures typically may be used with and operate on and/or within an ordinary user's computer system. The examples of such computer systems are desktop computer, laptop or notebook computer, and/or computer workstation, whether used in a standalone fashion or as part of larger computer network that is needed by the processing operating system or application program. The storage device for the file resources may be on a remote storage device of a CCE accessible over the Internet or on a local storage disk attached to the user's computer system or to a server in the server room or in a data center in the user's organization. A user does not need to know whether a storage device is remote or local. A remote storage device of a CCE is referred from now on as a CCE virtual storage.

The systems and methods of the present embodiments of disclosures include several programs or components of programs. It may be viewed as one large program with several smaller components depending upon how structured such component may run in a largely autonomous manner or may be more closely coupled or integrated with the other components.

Figure 1:
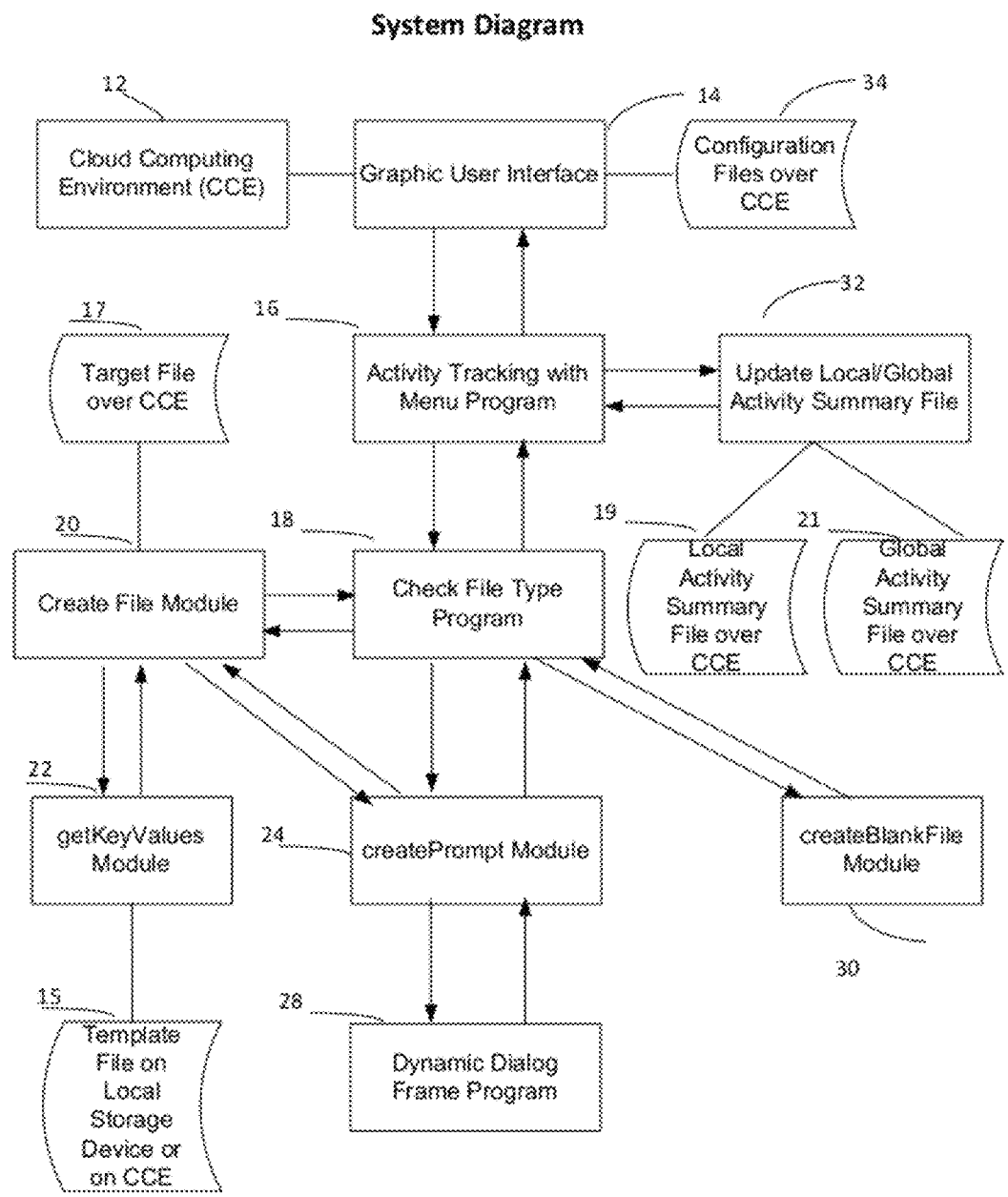
FIG. 1 illustrates an example system diagram.

FIG. 1 illustrates the system diagram for the computing environment in which the following four programs and four modules will be run. They are Graphics User Interface Program (block 14), Activity Tracking with Menu Program (block 16), Check File Type Program (block 18), Dynamic Dialog Frame Program (block 28), createFile module (block 20), getKeyValues module (block 22), createPrompt module (block 24), and createBlankFile module (block 30). These four programs and four modules implement the major components of the systems and methods in the embodiments.

Figure 2:
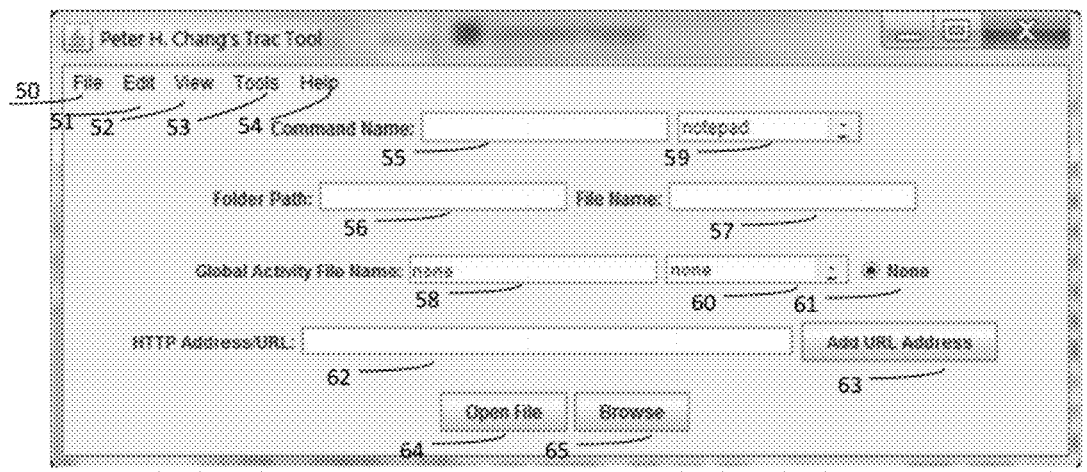
FIG. 2 illustrates an example screen image.

FIG. 2 illustrates the main screen displayed by the Graphics Users Interface Program (GUI Program). The GUI Program displays five menus: File (box 50), Edit (box 51), View (box 52), Tools (box 53), and Help (box 54) in the menu bar. It also displays four text boxes for command name (box 55), folder path (box 56), target file name (box 57), and name of global activity summary (logging) file (box 58) that accept users' input. In addition the GUI Program reads the list of names of operating system commands and application programs from a configuration file over the CCE (box 34 in FIG. 1) and displays a drop down box (box 59) containing these names. If a user selects a program name from this drop down box, then the GUI Program displays the name in the command name box on box 55. The GUI Program also reads the list of names of global activity summary files from the same configuration file (box 34 in FIG. 1) and displays a drop down box (box 60) containing these names. If a user selects a name of a global activity summary file from this drop down box, then the GUI Program displays the name in the global activity summary box on box 58. If a user selects the radio button in box 61, the user indicates that no global activity summary file is needed for the processing of the target file. Box 62 contains the HTTP/URL address or Web address of a Web page. The command button named Open File in box 64 opens the target file identified in box 57 by using the command specified in box 55. As will be shown in FIG. 28, by using the Automenu tool selected as a menu item in the Tools menu in box 53, a user can push the processed target file to the CCE. The command button named Browse in box 65 brings up a Web browser to display the Web page identified in Box 62. The File menu in box 50 contains but not limited to the menu item: Open. If a user wants to select a target file to be processed by a command, the user can click on the File menu and click the Open menu item to bring up a File Dialog Window, which is depicted in FIG. 3 whose description is followed next.

Figure 3:
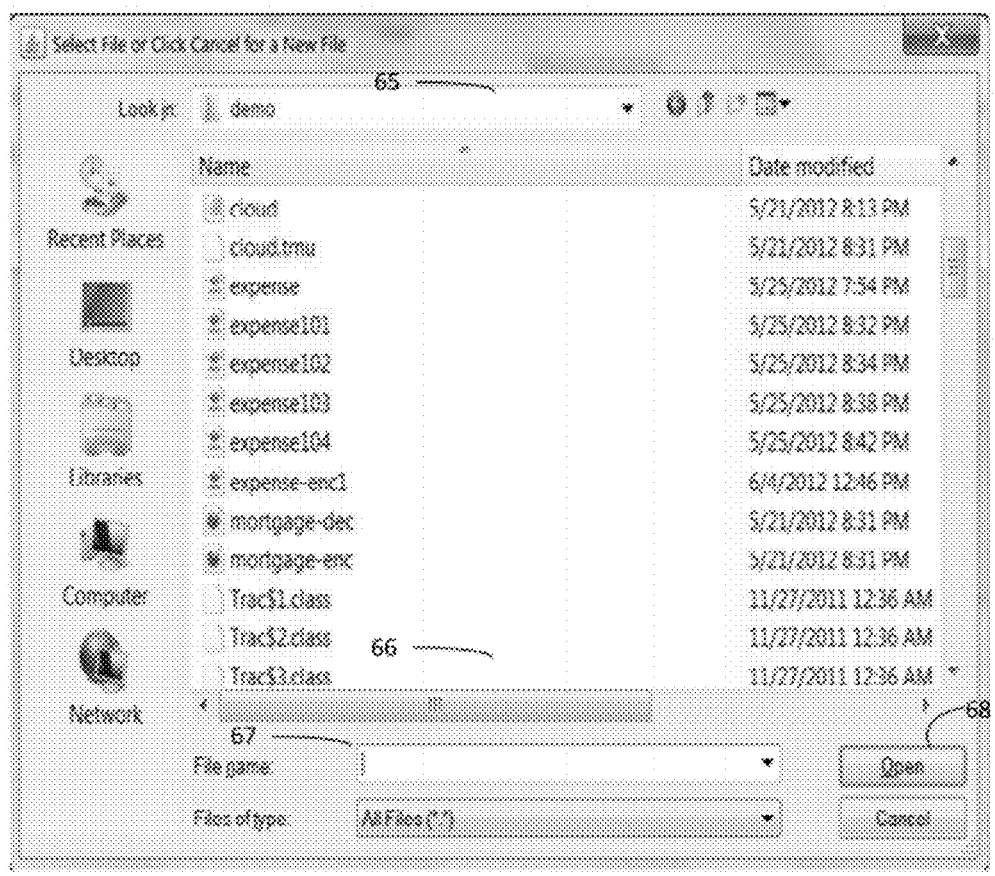
FIG. 3 illustrates an example dialog window for opening files.

FIG. 3 illustrates the File Dialog Window. A user can select a folder (directory) in which to create a new target file or select an existing target file. Box 65 displays the path name of the folder. Box 66 displays the sorted list of all the files and subfolders (subdirectories) of the selected folder. If the user wants to create a new target file, then the user types in the name of the target file in box 67. If the user wants to select an existing target file in the list displayed in box 66 to process, then the user clicks the name of the target file to get it displayed in box 67. After the user fills the box 67 with the name of the target file, then the user clicks the Open button to confirm to the GUI Program of the selection the target file name. The GUI Program then fills the box of the target file name, box 57 of FIG. 2, with the user selected target file name. The user next fills the box 55 of FIG. 2 with the name of the program that is to process the target file. If the user wants to track (log) the processing of the target file, then the user also fills the box 58 of FIG. 2 with the name of a global activity summary file. For a more comprehensive coverage, for the rest of this document, it is assumed that box 58 of FIG. 2 is filled with the name of a global activity summary file because the methods for the case of not tracking the processing of the target files form a subset of the methods for the case of tracking the processing of the target files. After the user clicks the command button named Open File in box 64 of FIG. 2, the GUI Program starts the Activity Tracking with Menu Program, which is depicted in FIG. 4 whose description is followed next. As will be shown in FIG. 28, by using the Automenu tool selected as a menu item in the Tools menu in box 53 of FIG. 2, a user can push the processed target file to the CCE. The target file may contain filled contents of placeholders for temporary changeable fields such as encryption result.

For an ease of discussions, the storages of template files and target files for the three programs and four modules stated in the in reference to FIG. 1: Activity Tracking with Menu Program (block 16), Check File Type Program (block 18), Dynamic Dialog Frame Program (block 28), createFile module (block 20), getKeyValues module (block 22), createPrompt module (block 24), and createBlankFile module (block 30) can be either local on the host computer of the programs and modules or over CCE. Also for an ease of the discussions, the changeable fields referred in these three programs, illustrated by FIGS. 4, 5, and 7, respectively, and in these four modules, illustrated by FIGS. 10, 9, 6, and 12, respectively, are persistent of type 1.

Figure 4A:
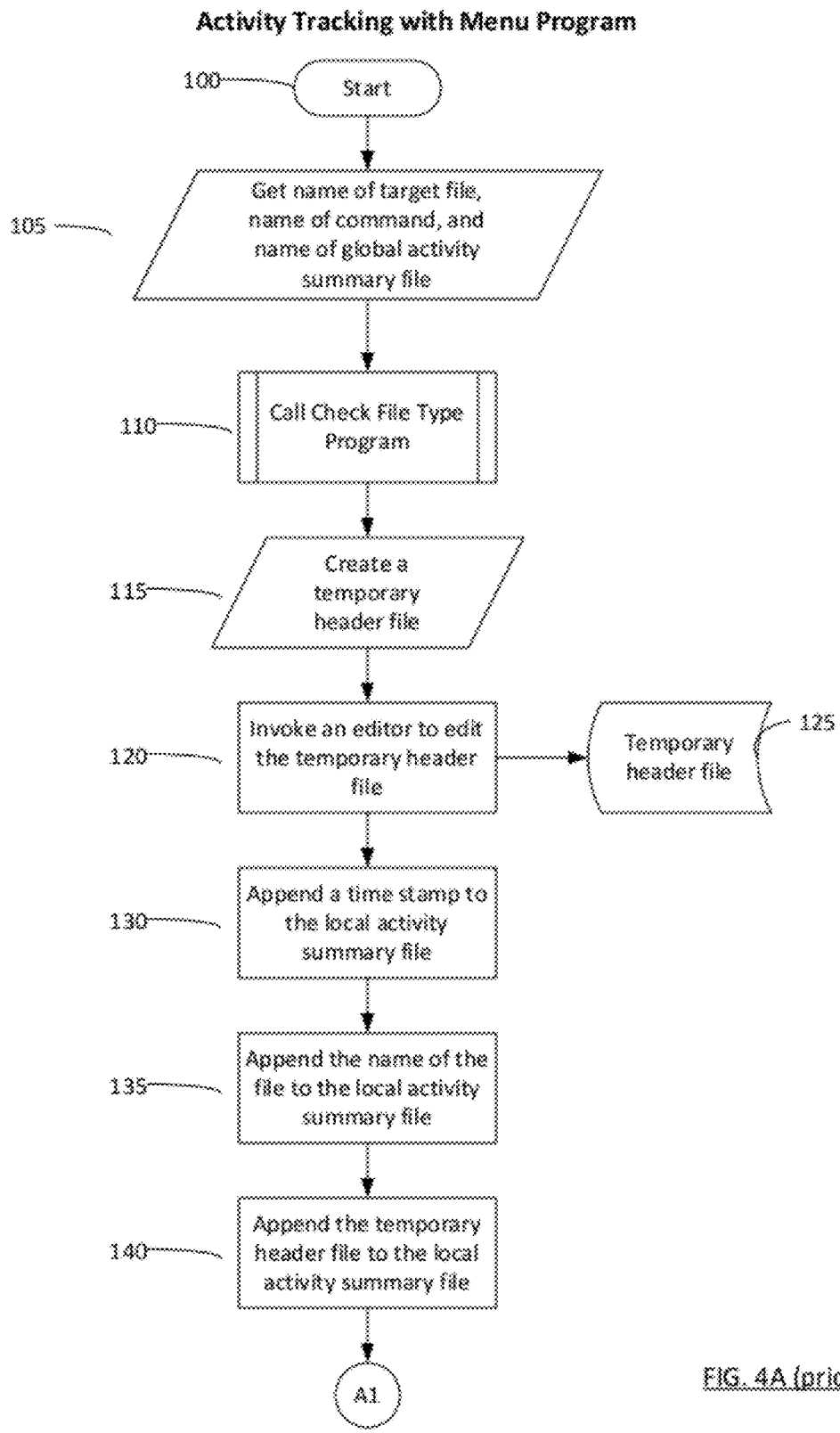
FIG. 4 is a flow chart that illustrates an example of steps of the activity tracking with menu program. A computer program that implements the method starts the tracking of the processing of a file resource by an application program.
Figure 4B:
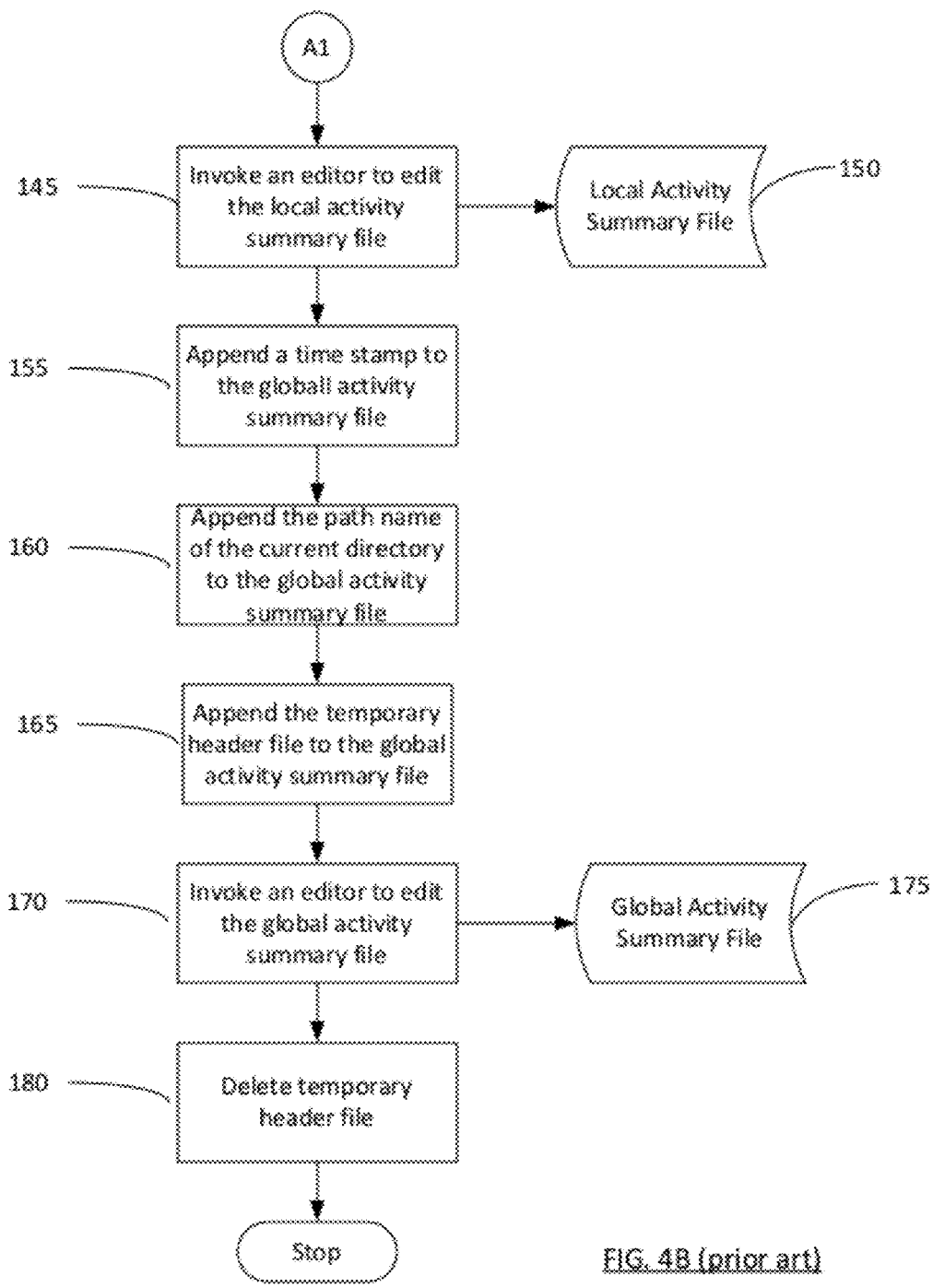

FIG. 4, comprised of FIG. 4A and FIG. 4B, illustrates the Activity Tracking with Menu Program (ATWM Program). At block 105, the ATWM Program receives from the GUI Program the name of the target file, the name of the command (program) that is to process the target file, and the name of the global activity summary file. The processing of the target file includes but not limited to creation, or editing, or viewing. At block 110, it calls the Check File Type Program. If the target file is an existing file, the Check File Type Program invokes the corresponding command to process it. After the call to the Check File Type Program is returned, in blocks 115 to 180 the ATWM Program logs the processing of the target file to the local activity summary file and the global activity summary file; or local activity summary table and global activity summary table if Relational Database Management System (RDBMS) is used. For each target file the folder that contains it corresponds to exactly one local activity summary file (or local activity summary table). As are shown in boxes 58 and 60 of FIG. 2, there are many global activity summary files (or global activity summary tables) that can be selected. An object class model diagram drawn in the Unified Modeling Language (UML) that prescribes the rules of the design and implementation of local activity summary tables and global activity summary tables in RDBMS will be described in FIG. 14. The description of how the Check File Type Program handles the case that the target file is new is followed next.

Figure 5A:
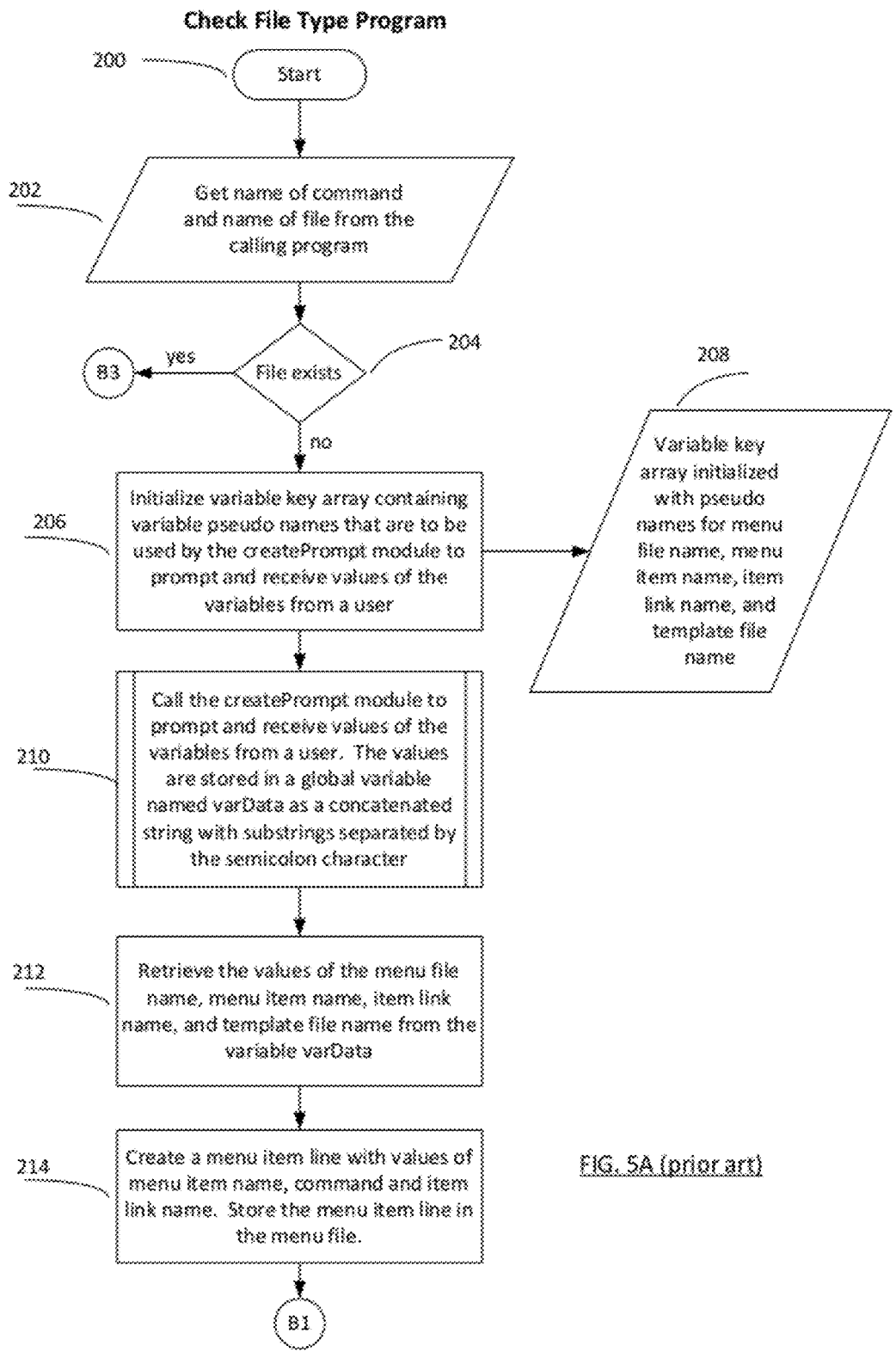
FIG. 5 is a flow chart that illustrates an example of the steps of the check file type program. A computer program that implements the method performs tasks or calls other modules in generating target files from template files and invokes a user-selected application program to process the new target file.
Figure 5B:
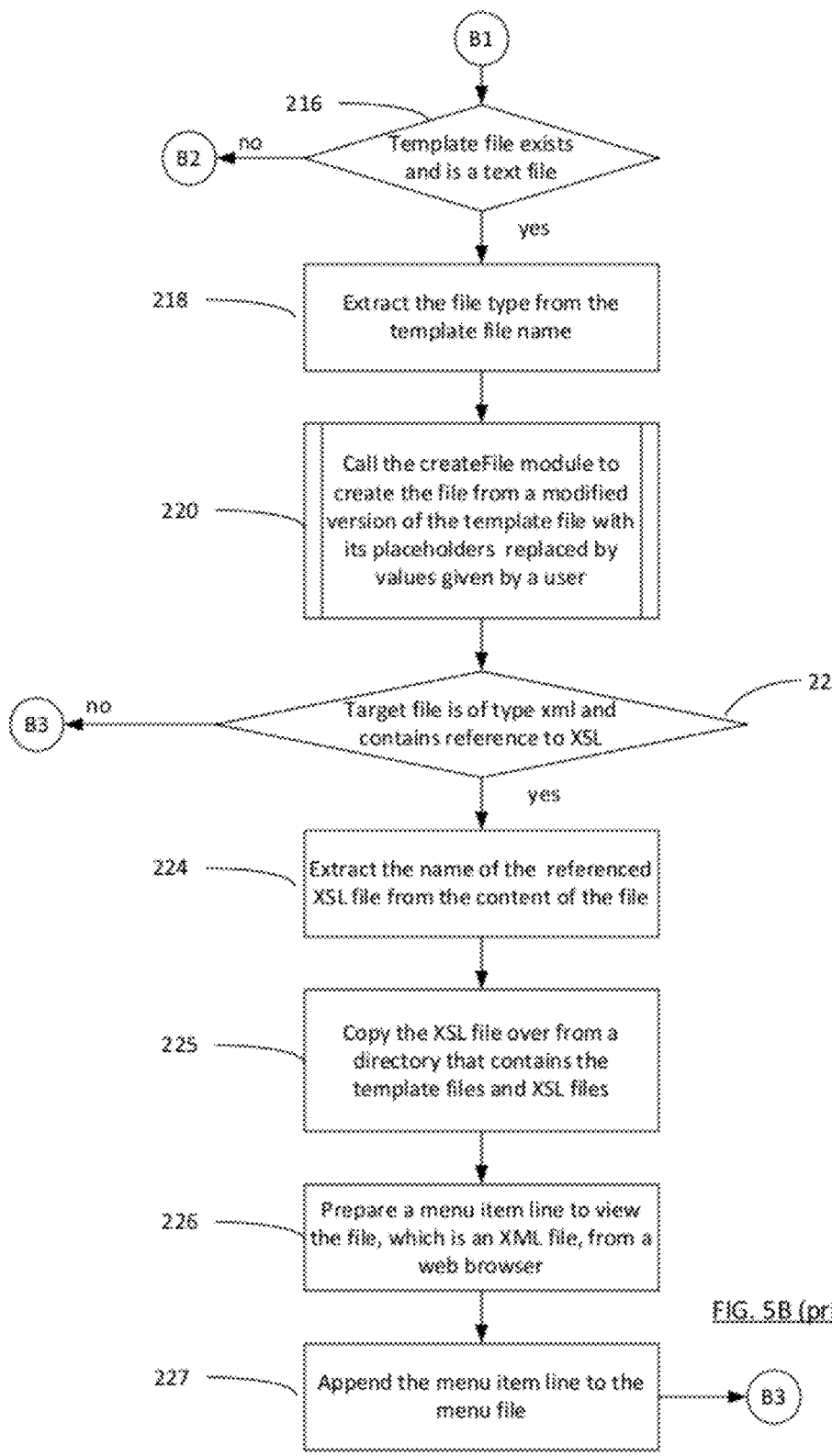

FIG. 5 illustrates the Check File Type Program (CFT Program). At block 202, the CFT program receives the name of the target file and the name of the command from the ATWM Program. At block 204, it determines whether the target file exists or note. If the target file exists, at block 234 the CFT Program invokes the command to process the file. If the target file is a new file and thus does not exist, at block 206 the CFT Program initializes a variable key array containing variable pseudo names that are to be used by the createPrompt module to prompt and receive values of the variables from a user. As is illustrated in block 208, the CFT Program initializes the variable key array with pseudo names for menu file name, menu item name, item link (reference) name, and template file name. At block 210, it calls the createPrompt module to prompt and receive values of the variables from a user. The values are stored in a global variable named varData as a concatenated string with substrings separated by the semicolon character. At block 212, the CFT Program retrieves the string values of the menu file name, menu item name, item link name, and template file name from the variable varData. At block 214, the CFT Program appends a line that consists of string of the name of the menu item, the string of the name of the processing command concatenated with the string of the target file name as its argument, and the string of the link name to the end of the Menu Configuration file.

At block 216, the CFT Program determines whether the template file exists and is a text file. If the template file does not exist or is not a text file, at block 228 it checks whether the template file exists and is not a text file. If yes, then it copies the template file to the target file at block 230 and invokes the command to process the target file at block 234. If no, which implies that the template file does not exist, at block 232 it calls the createBlankFile Module to optionally copy a suitable default file to the target file and invokes the command to process the target file at block 234. Depending on the type of the target file, examples of the default file include but not limited to empty word processing file, spreadsheet file, and presentation file. If the template file exists and is a text file, at block 218 the CFT Program extracts the file type from the template file name. At block 220, the CFT Program calls the createFile module to create the target file from a modified template file with its placeholders replaced by values given by a user. At block 222, the CFT Program checks whether the target file is of the type XML and the target file contains a reference to XSL. If it is not the case, at block 234 the CFT Program invokes the command to process the target file. If it is the case, at block 224 it extracts the name of the referenced XSL file from the content of the target file. At block 225, it copies the XSL file over from a predetermined default folder that contains the XSL file. At block 226, the CFT Program prepares a menu item line to view this XML file from a web browser. At block 227 it appends this menu item line to the menu file identified at block 212. At block 234, the CFT Program invokes the command to process this XML file. After considering all cases, at block 236 the CFT Program checks whether the target file is a WML file. If it is, at block 238 the CFT Program copies the target file to the virtual document directory of the web server to be viewed by wireless devices and returns to the calling ATWM Program. If it is not, the CFT Program returns directly to the calling ATWM Program.

In the ATWM Program, after the call to the CFT Program is returned for the case that the target file is new, in blocks 115 to 180 the ATWM Program logs the processing of the target file to the local activity summary file and the global activity summary file; or local activity summary table and global activity summary table if Database Management System (DBMS) is used As was described previously the first module that the CFT Program calls is the createPromt module if the target file does not exist. FIG. 6, comprised of FIG. 6A, FIG. 6B, and FIG. 6C illustrates the createPrompt module. The cratePrompt module receives from the calling program or module a variable key array that it will use to create a program that displays a dialog window to prompt a user to enter inputs for the variables identified in the variable key array. Examples of such variable key arrays include but not limited to that described in block 208 of FIG. 5. In this case, the variable key array is initialized in the CFT Program with pseudo names for menu file name, menu item name, item link name, and template file name. An optional array element that represents a pseudo name such as "only copying template file" indicating whether the template file should be directly copied to the target file or not may be added to the end of the variable key array. The createPrompt module creates a program that will display a dialog window to prompt a user to enter input values for menu file name, menu item name, item link name, and template file name. In general, at block 302, the createPrompt module opens the Dialog Frame Pseudo Program file for input. As is described in block 304, the Dialog Frame Pseudo Program is an incomplete software program containing placeholders for variable names, number of window panels, and height of window frame, respectively. Examples of programming languages that can be used to implement the software program include but not limited to Java, C#, or C++. An example, implemented in Java, for a line that contains placeholders for variable names is String label#varName#Str="#varName#".replace('_', ' ');

where #varName# is the placeholder for variable name. At block 306, the createPrompt module opens the Dynamic Dialog Frame Program file for output. As is described in block 308, if the Dynamic Dialog Frame Program file exists, then it will be overwritten. An execution of the resulting Dynamic Dialog Frame Program will display a dialog window to prompt users for inputs and to collect them and return them to the calling module. At block 310, the createPrompt module calculates the value of the len variable as the size of the variable key array plus 1 (counting the OK button object at the bottom of the dialog frame). At block 312, it calculates value of the height variable as the product of the len variable with a preset height for a dialog panel.

From block 314 to block 332, the createPrompt module contains a program loop that reads the file of the Dialog Frame Pseudo Program line by line, makes changes to each line if necessary or makes no change, and appends the changed or unchanged line to the file of the Dynamic Dialog Frame Program. At block 314, the createPrompt module reads the first line of the Dialog Frame Pseudo Program. At block 316, it checks whether the end of the Dialog Frame Pseudo Program file is reached. If yes, then at block 334 it invokes the compiler command from the operating system platform to compile and link the Dynamic Dialog Frame Program file to an executable program file. If no, then at block 318, the createPrompt module checks whether the input line from file of the Dialog Frame Pseudo Program contains placeholders for the variable name. If the input line contains one, then at block 320 the createPrompt module replaces the placeholders by the corresponding value of the element of the variable key array and appends the new lines to the Dynamic Dialog Frame Program file, and at block 332 it reads the next line of the Dialog Frame Pseudo Program file and returns to block 316 for the next iteration in the loop. As was described earlier, an example, implemented in Java, for a line that contains placeholders for variable names is String label#varName#Str="#varName#".replace('_', ' ');

where #varName# is the placeholder for variable name. Examples of the new lines resulted from replacing the placeholders by corresponding value of the element of the variable key array are String labelMenu_File_NameStr="Menu_File_Name".replace('_', ' ');
String labelMenu_Item_NameStr="Menu_Item_Name".replace('_', ' ');
String labelLink_NameStr="Link_Name".replace('_', ' ');
String labelTemplate_File_NameStr="Template_File_Name".replace('_', ' ');
String labelOnly_Copying_Template_FileStr="Only_Copying_Template_File".replace('_', ' ');

If the input line contains no placeholder for the variable name, at block 322 the createPrompt module checks whether the line contains a placeholder for the number of window panels. If the input line contains one, then at block 324 the createPrompt module replaces the placeholder by the value of the len variable and appends the new line to the Dynamic Dialog Frame Program file, and at block 332 it reads the next line of the Dialog Frame Pseudo Program file and returns to block 316 for the next iteration in the loop. An example, implemented in Java, for a line that contains a placeholder for the number of window panels is container.setLayout(new GridLayout(#varCount#, 1));

where #varCount# is the placeholder for the number of window panels. An example of the new line resulted from replacing the placeholder by the value of the len variable is container.setLayout(new GridLayout(6, 1));

If the input line contains no placeholder for the number of window panels, at block 326 the createPrompt module checks whether the line contains a placeholder for the height of the window frame. If the input line contains one, then at block 328 the createPrompt module replaces the placeholder by the value of the height variable and appends the new line to the Dynamic Dialog Frame Program file, and at block 332 it reads the next line of the Dialog Frame Pseudo Program file and returns to block 316 for the next iteration in the loop. An example, implemented in Java, for a line that contains a placeholder for the height of the window frame is setSize(350, #1stHeight#);

where #1stHeight# is the placeholder for the height of the window frame. An example of the new line resulted from replacing the placeholder by the value of the height variable is setSize(350, 210);

If the input line contains no placeholder for the height of the window frame, at block 330 the createPrompt module appends the input line without any change to the Dynamic Dialog Frame Program file, and at block 332 it reads the next line of the Dialog Frame Pseudo Program file and returns to block 316 for the next iteration in the loop. After all the lines of the Dialog Frame Pseudo Program file are read with corresponding changed or unchanged lines appended to the Dialog Frame Pseudo Program file, the Dialog Frame Pseudo Program file becomes a complete program file. At block 334 the createPrompt module invokes the compiler command from the operating system platform to compile and link the Dynamic Dialog Frame Program file to an executable program file. At block 336, it executes the executable program file and stores the output in the global variable named varData. As is described in block 338, this output contains a string of the user input for all text field objects on the dialog frame window created by the execution of the executable Dynamic Dialog Frame Program file. In the string, the user's input for two adjacent text field objects are separated by a delimiter character such as but not limited to the semicolon character. A more detailed description of the Dynamic Dialog Frame Program is followed next.

Figure 7A:
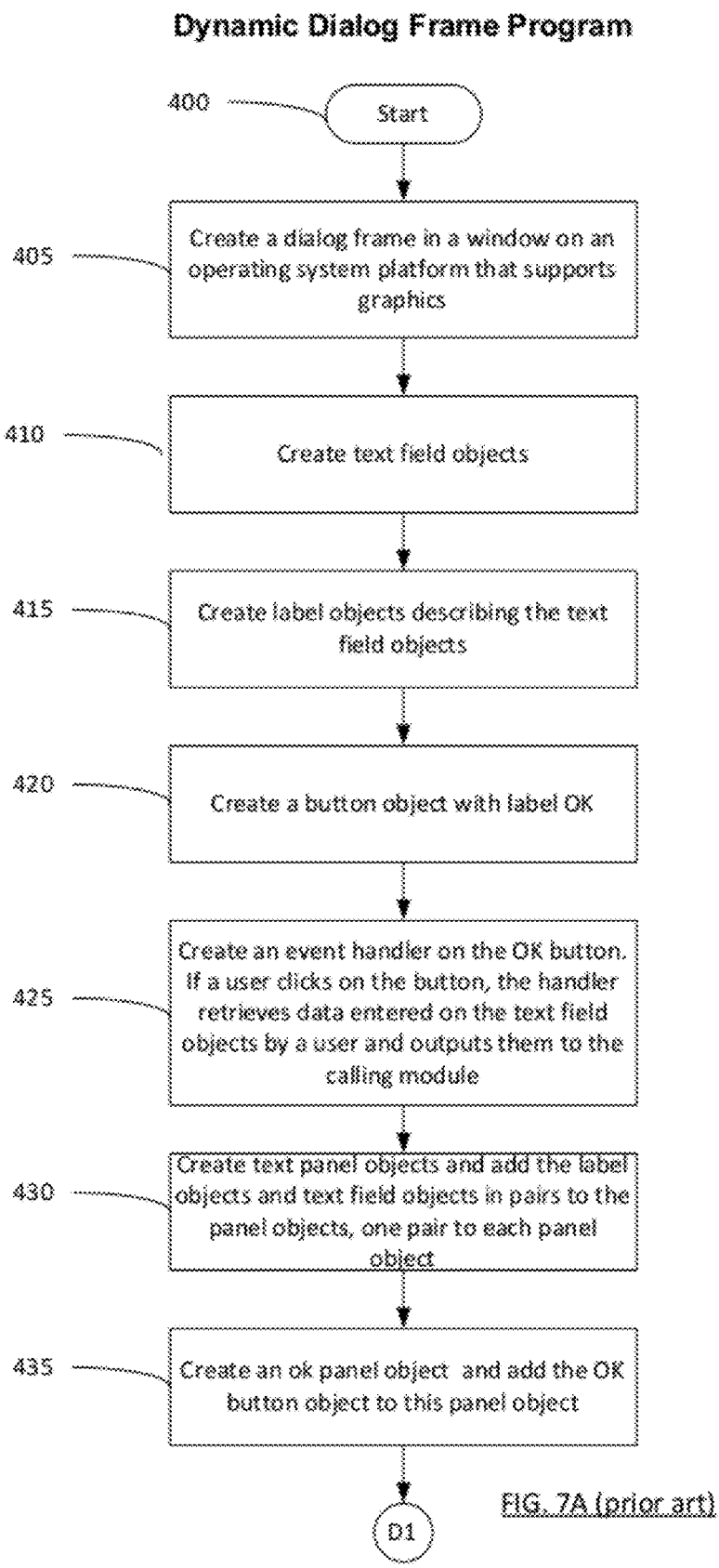
FIG. 7 is a flow chart that illustrates an example of the steps of the dynamic dialog frame program. A computer program that implements this method generates a dialog frame window on an operating system platform that supports graphics. The dialog frame prompts a user to enter values for its text field objects.
Figure 7B:
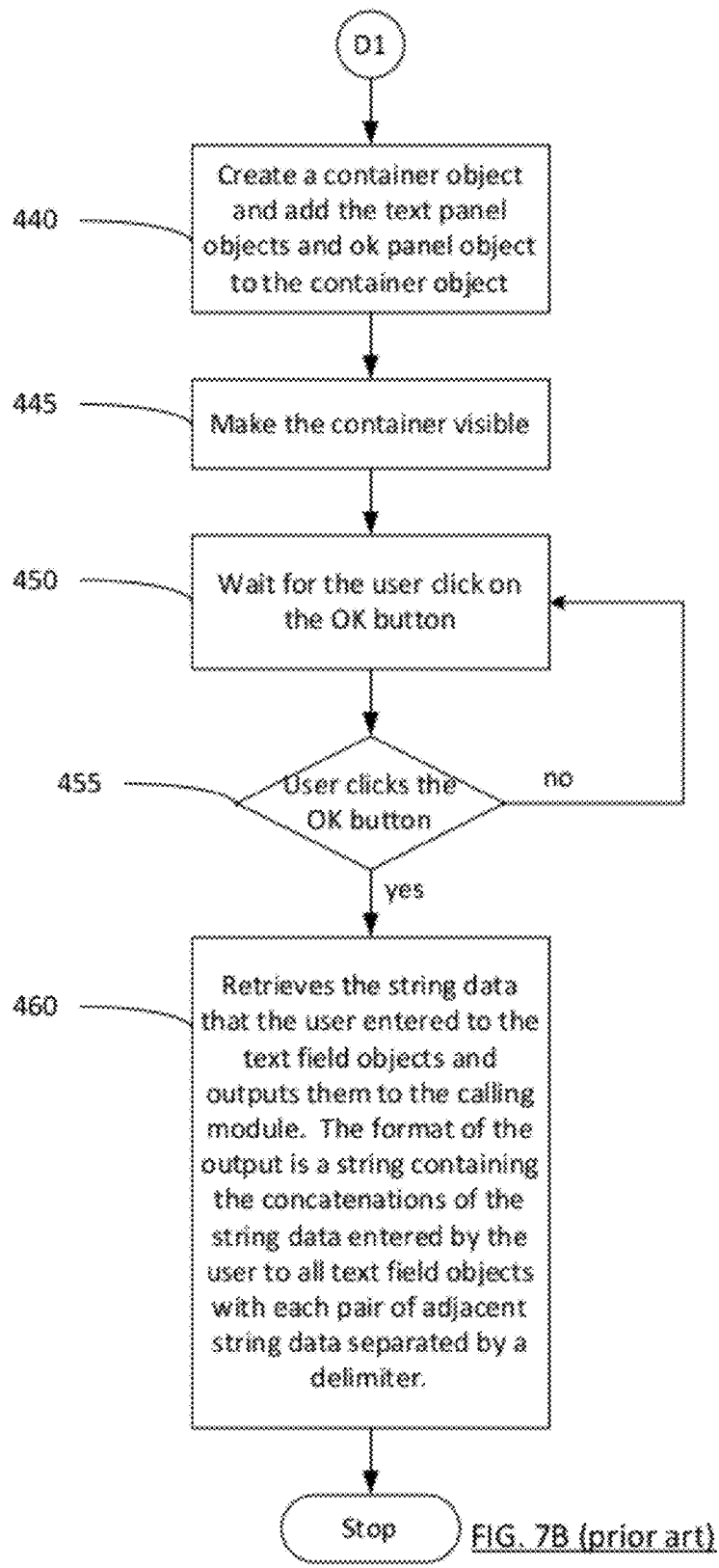

As was described previously the main function of the createPrompt module is to generate an executable Dynamic Dialog Frame Program file, execute it to display a dialog window to collect users' input, and store them in the global variable named varData. FIG. 7, comprised of FIG. 7A and FIG. 7B, illustrates the Dynamic Dialog Frame Program (DDF Program). At block 405, the DDF Program creates a dialog frame window on an operating system platform that supports graphics. At block 410, it creates text field objects. At block 415, it creates label objects describing the text field objects. At block 420, it creates a button object with label OK. At block 425, the DDF Program creates an event handler on the OK button such that if a user clicks on the button, this event handler retrieves data entered on the text field objects by a user and outputs them to the calling module. At block 430, it creates text panel objects and adds the label objects and text field objects in pairs to the panel objects, one panel object for each pair. At block 435, it creates an ok panel object and adds the OK button object to this panel object. At block 440, the DDF Program creates a container object and adds the text panel objects and ok panel object to the container object. At block 445, it makes the container object visible. At blocks 450 and 455, it waits for the user to enter data to the text field objects and clicks the OK button. After the user clicks the OK button, at block 460 the DDF Program retrieves the string data that the user entered to the text field objects and outputs them to the calling module. The format of the output is a string containing the concatenations of every string data entered by the user to each text field object with each pair of adjacent string data separated by a delimiter such as but not limited to the semicolon character.

Figure 8:
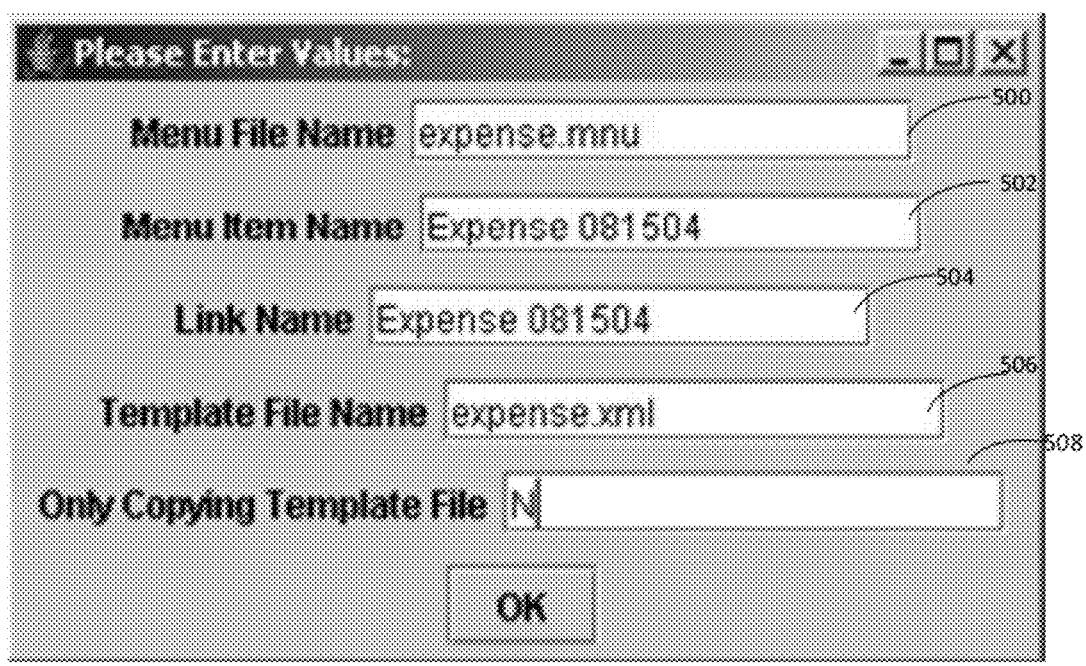
FIG. 8 illustrates an example screen image of a dialog frame window created by executing a dynamic dialog frame method for the purpose of prompting for and collecting user input for menu related information and optionally for the name of a template file.

As was described previously, at block 210 of FIG. 5, the CFT Program calls the createPrompt module to prompt a user to enter string values for the menu file name, menu item name, item link name, and template file name. At block 336 of FIG. 6 the createPrompt module in turn executes the executable DDF Program file and stores the user's inputs for the string values in the global variable named varData. At block 212 of FIG. 5, the CFT Program retrieves the string values of the menu file name, menu item name, item link name, and template file name from the string value of the global variable varData. As was discussed previously an optional prompt message for "only copying template file" that requests the user to answer with Y (yes) or N (no) indicating whether the template file should be directly copied to the target file or not may be added to the dialog window displayed by the execution of an executable DDF Program file, which is generated at block 336 of FIG. 6, and the user's answer is added to the end of the string value for the variable varData. FIG. 8 illustrates such a dialog window. At block 500, the DDF Program displays the text field object for the menu name. At block 502, it displays the text field object for the menu item name. At block 504, it displays the text field object of the item link name. At block 506, the DDF Program displays the text field object of the template file name. At block 508, it displays the text field object that receives the user's answer to the prompt "Only Coping Template File". If the user enters N. which means no, a user interface will be generated to receive the user's input for generating the target file; if the user enters Y, which means yes, then the template file is copied to the target file.

Figure 9A:
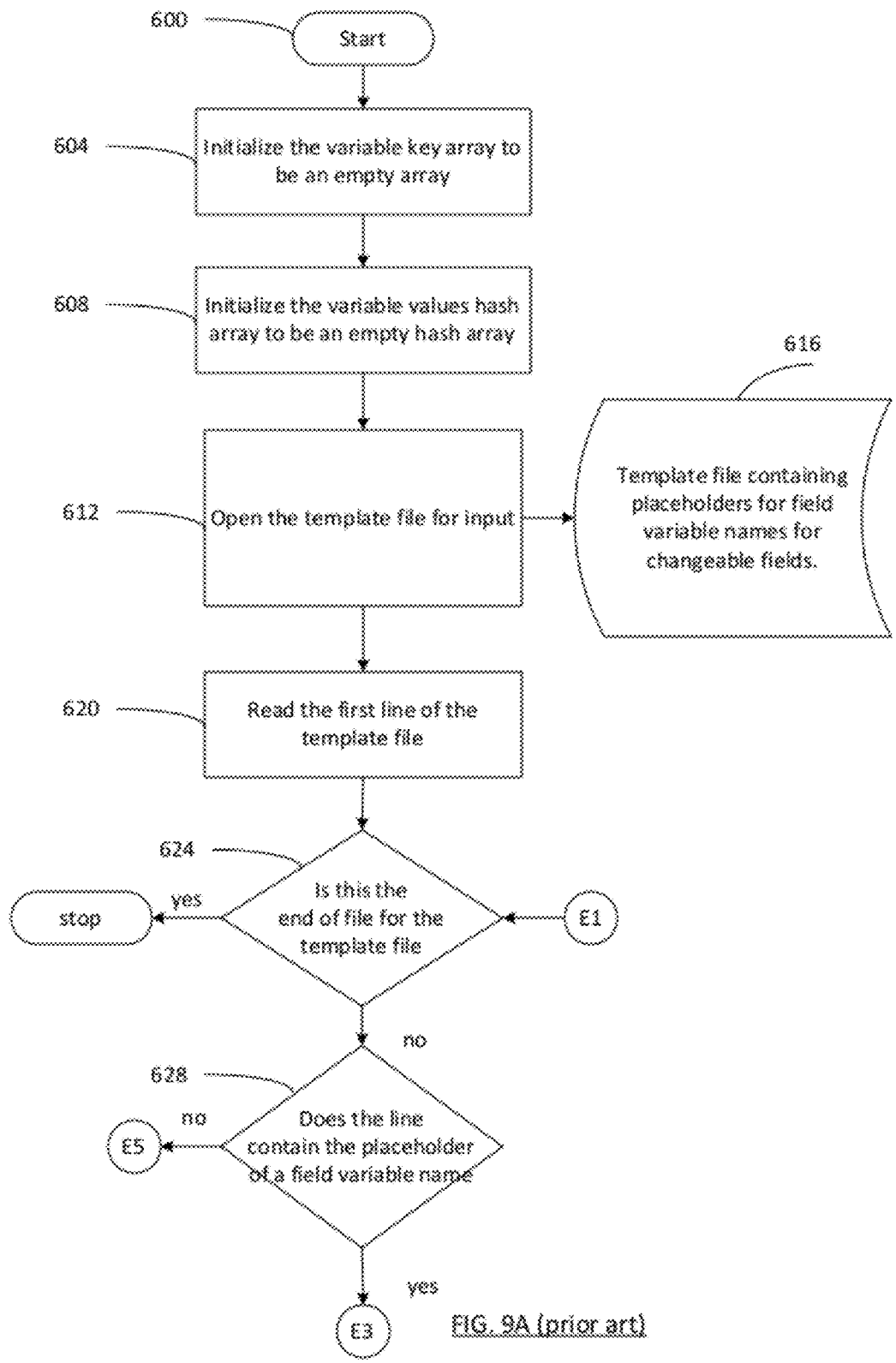
FIG. 9 is a flow chart that illustrates an example of the steps of the getKeyValues module. The module extracts field variable names (or identifications) from the placeholders in a template file.
Figure 9B:
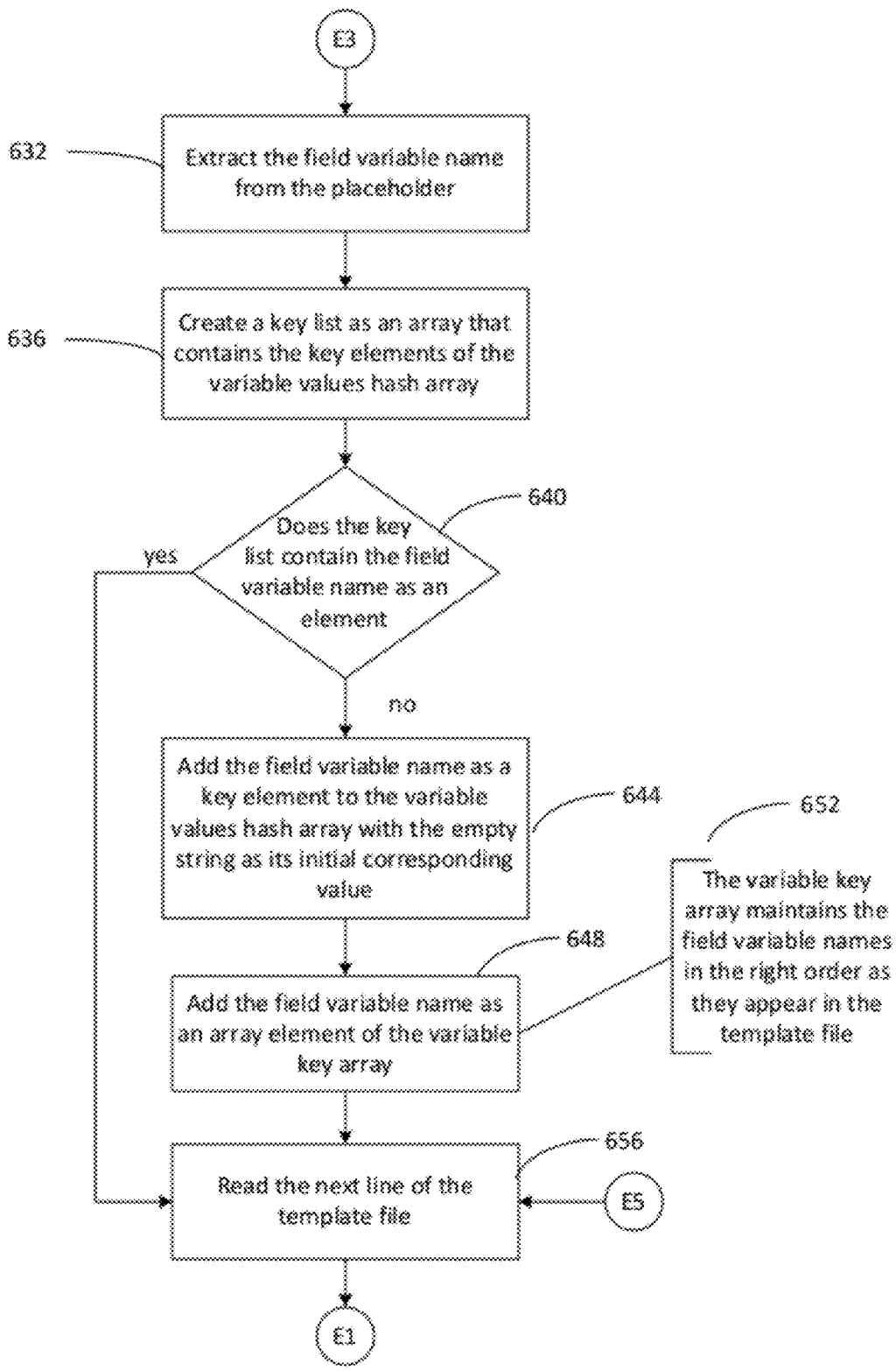

As was discussed in the description for FIG. 5, the second module that the CFT Program calls is the createFile module if the target file does not exist and if the template file exists and is a text file. As is shown in boxes 20 and 22 of FIG. 1, the only module that the createFile module calls is the getKeyValue module. At this point, the description of the getKeyValue module is presented next and the description of the createFile module will be presented following it. FIG. 9, comprised of FIG. 9A and FIG. 9B, illustrates the getKeyValue module. In block 604, the getKeyValue module initializes the global variable key array to be an empty array. In block 608, it initializes the global variable values hash array to be an empty hash array. As is shown in boxes 22 and 15 of FIG. 1, and in block 612, the getKeyValue module opens the template file for input. As is described in box 616, the template file contains placeholders with field variable names (or identifications) for changeable fields. Before the further description of the getKeyValue module, changeable fields and placeholders in a template file are described in more details next.

As discussed before, a changeable field of a template file is named from an internal point of view. It has a field variable name used in an implementation and identifies a field location in the template file. All changeable fields need to be replaced to transform the template file to a real document. A placeholder of a template file is named from an external point of view. Placeholders are ways to represent the changeable fields so that a computer program can be developed to detect them and replace them. The following is an example of a template file in its simplest form for a travel expense report:

| Employee | %name% |
| Date | %date% |
| Client | %client name% |
| Meals | %meals cost% |
| Gas | %gas cost % |

The five fields on the left side are unchangeable fields. They represent the static structure of the document in the form of but not limited to plain alphanumerical strings. For example, static tag names of XML or WML may also appear on the left side. The five fields on the right side are changeable fields. They identify the field locations that need to be replaced. Placeholders are ways of representing changeable fields. Here there are five placeholders on the right side, representing the filed variable names (or identifications) preceded by but not limited to % and trailed by %. For example, % name % is a placeholder and name is a field variable name. There are other ways to represent the five fields such as using==instead of %. Placeholder values (or fill-in values) are the user input values that replace the changeable fields to transform the template file to a real document, which represents the initial target file. A more complex example of a template file such as but not limited to XML file format may contain a line with static tag and placeholder like:

<empName value="% var % Name % evar %"/>

In the above example, the field variable: Name (or identifications) is preceded by the character string "% var %" as the head tag and followed by the character string "% evar %" as the end tag. The character string "% var % Name % evar %" is the placeholder. FIG. 16 provides a more general view of placeholders.

From blocks 620 to 656 of FIG. 9A and FIG. 9B, respectively, the getKeyValue module contains a program loop that reads the template file line by line. At block 620, it reads the first line. At block 624, it checks whether the end of the template file is reached. If yes, then it returns to the caller. If no, then at block 628 it checks whether the line contains the placeholder of a field variable name (or identification). If the line does not contain any placeholder, then at block 656 the getKeyValue module reads the next line of the template file. If the line contains the placeholder of a filed variable name, then at block 632 the getKeyValue module extracts the string value of the field variable name from the placeholder on the line. (The discussion here is for at most one placeholder per line. But the approach of the method is not limited to it.) At block 636 it creates a key list as an array that contains the key elements of the variable values hash array. At block 640 it checks whether the key list contains the string value of the field variable name as an element. If yes, then at block 656 it reads the next line of the template file. If no, then at block 644 it adds the string value of the field variable name as a key index element to the variable values hash array with the empty string as its initial corresponding value. At block 648 the getKeyValue module adds the string value of the field variable name as an array element of the variable key array. As is commented in box 652, the variable key array contains the string values of the filed variable names (or identifications) as its array elements in the right order as they appear in the template file. At block 656, getKeyValue module reads the next line in the template file.

Figure 10A:
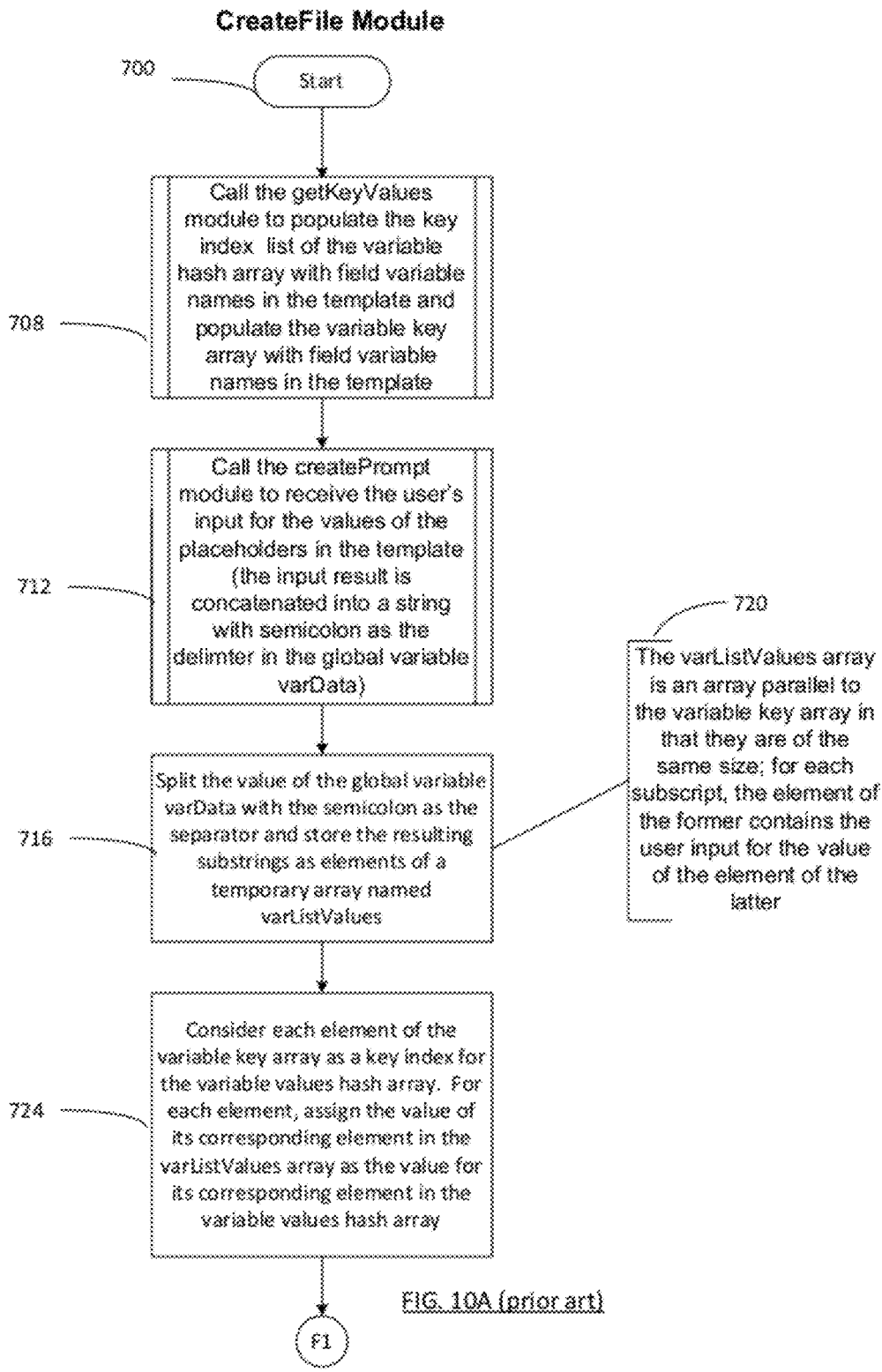
FIG. 10 is a flow chart that illustrates an example of the steps of the createFile module. The module performs the task of generating the target file from a template file and from input data entered by a user on a dynamically generated dialog frame window.
Figure 10B:
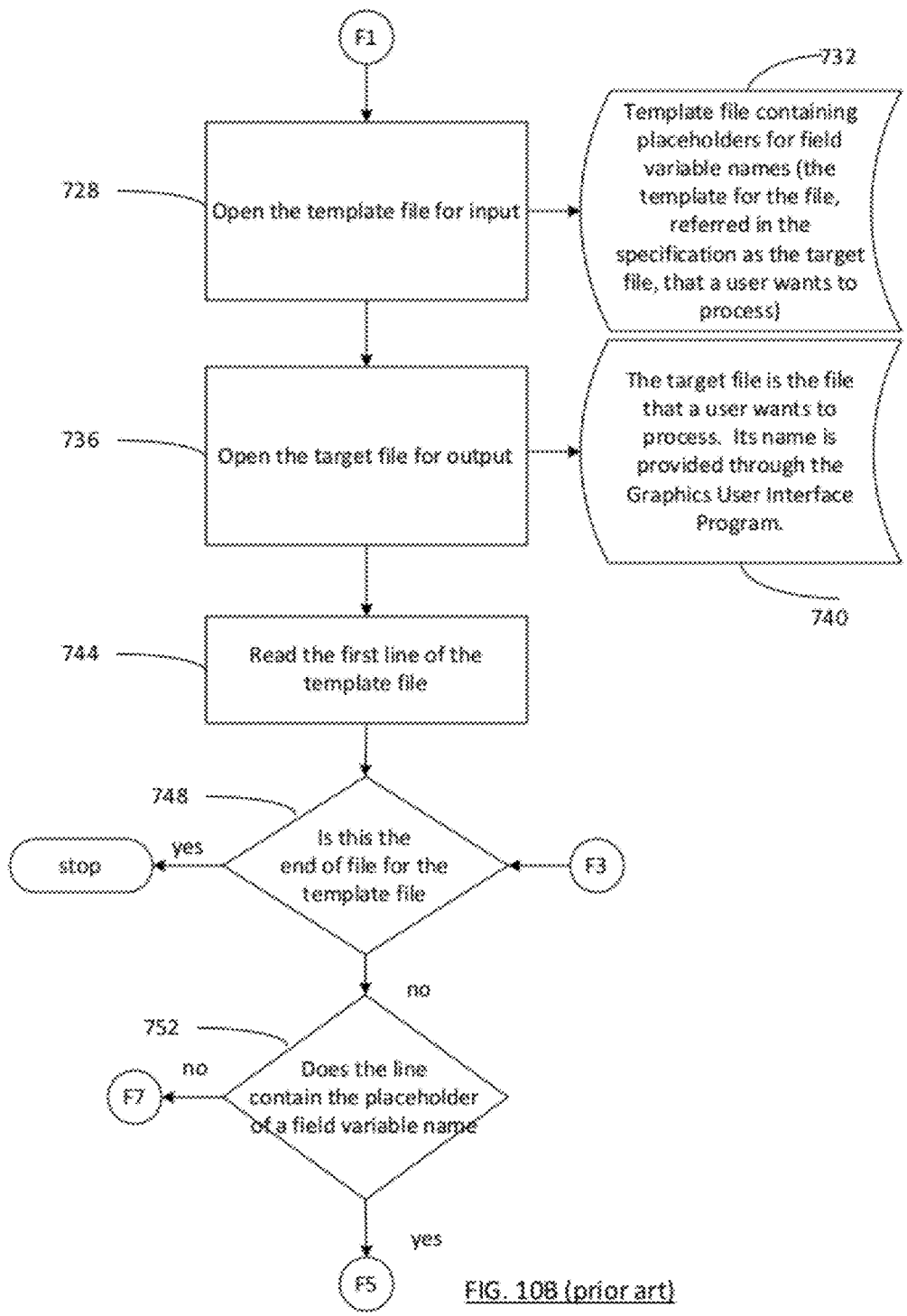
Figure 10C:
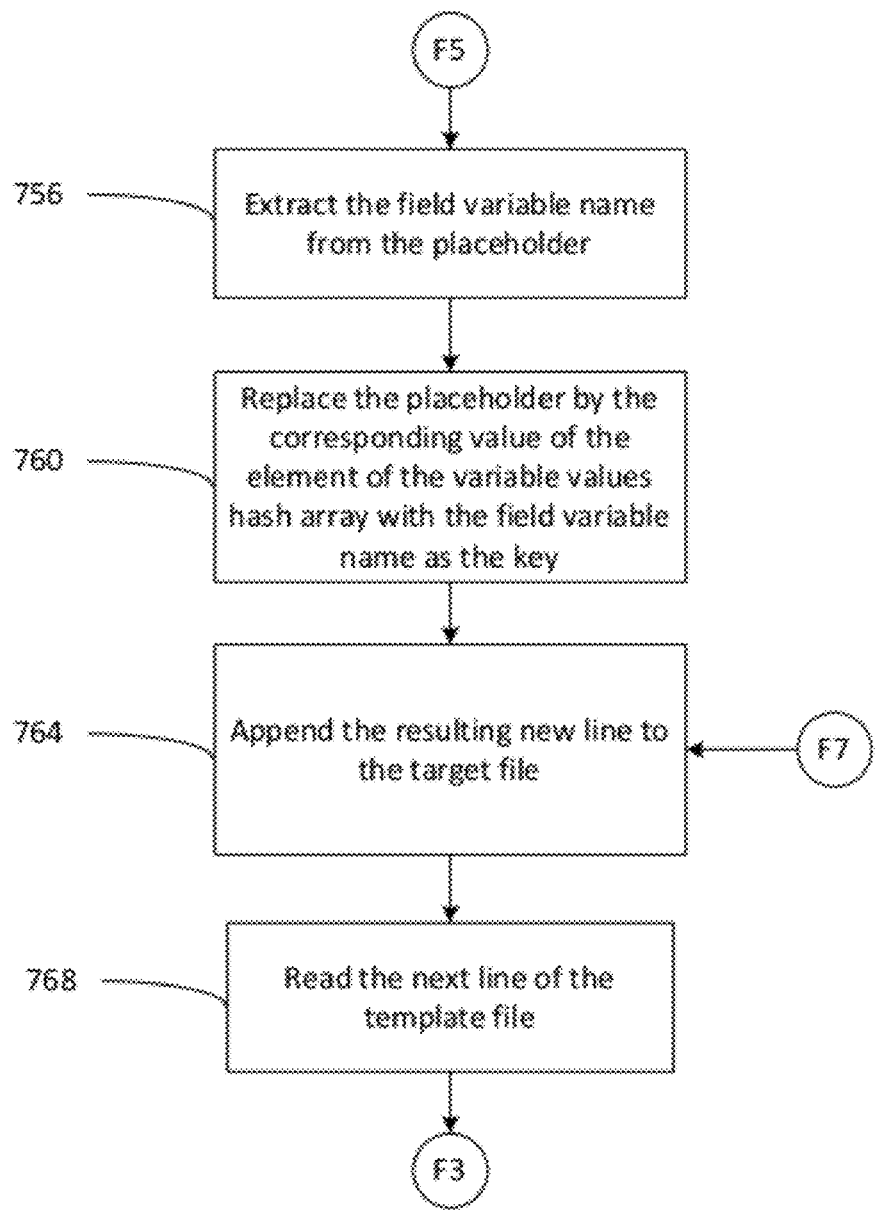

As was discussed before, the second module that the CFT Program calls is the createFile module if the target file does not exist and if the template file exists and is a text file. As was also discussed before, the description of the createFile module follows the description of the getKeyValue module, which was just presented. FIG. 10, comprised with FIG. 10A, FIG. 10B, and FIG. 10C, illustrates the createFile module. At block 708 the createFile module calls the getKeyValues module to calls the getKeyValues module to populate the key index element list of the variable hash array with the string values of the filed variable names (or identifications) in the template and populate the variable key array with the same string values of the filed variable names (or identifications) in the template. At block 712 it calls the createPrompt module to display a dialog window with the string values of the filed variable names (or identifications) as labels and prompt for and receive the user's input for the placeholders' values in the template. It concatenates the placeholders' values into a single string with each pair of adjacent placeholder values (or fill-in values) being separated by a delimiter character such as the semicolon character ";" in the global variable varData. At block 716 the createFile module splits the value of the global variable varData with the semicolon character ";" as the separator and stores the resulting substrings as elements of a temporary array named varListValues. As is commented in the box 720, the varListValues array is an array parallel to the variable key array, which, as can be recalled, was populated with string values of the template file's filed variable names (or identifications) as its array elements by the getKeyValue module, in that they are of the same size. For each subscript, the element of the varListValues array contains the user input value for the value of the placeholder in the template file that corresponds to the element of the variable key array, which is the string value of a variable key name. At block 724, the createFile module considers each element of the variable key array as a key index for the variable values hash array. For each element of the variable key array, it assigns the value of its corresponding element in the varListValues array as the value for its corresponding element in the variable values hash array. Thus the variable values hash array contains the key-value pairs in that each key index contains the string value of a field variable name and that the corresponding value is the user's input value that replaces the placeholder at the location of the field variable in the template file.

At block 728, the createFile module opens the template file for input. As was discussed in the description for FIG. 9 for the getKeyValue module at box 616 and as is commented in box 732, the template file contains placeholders at the locations of filed variable names (or identifications) representing changeable fields. At block 736, the createFile module opens the target file for output. As is commented in box 740, the target file is the file that a user wants to process. Its name is provided through the Graphics User Interface Program. From block 744 to block 768, the createFile module contains a program loop that reads the template file line by line. At block 744, it reads the first line of the template file. At block 748, it checks whether the end of the template file is reached. If yes, then it returns to the calling module. If no, then at block 752, it checks whether the line contains the placeholder of a field variable name. If the line does not contain the placeholder of a field variable name, then at block 764 it appends the line unchanged to the target file. At block 768 it reads the next line from the template file and returns to block 748 to check whether the end of the template file is reached. If the line does contain the placeholder of a field variable name, then at block 756 the createFile module extracts the field variable name from the placeholder. At block 760 it creates a new line by replacing the placeholder by the corresponding value of the element of the variable values hash array with the extracted field variable name as the key index. At block 764 it appends this new line to the target file. At block 768 it reads the next line from the template file and returns to block 748 to check whether the end of the template file is reached.

Figure 11:
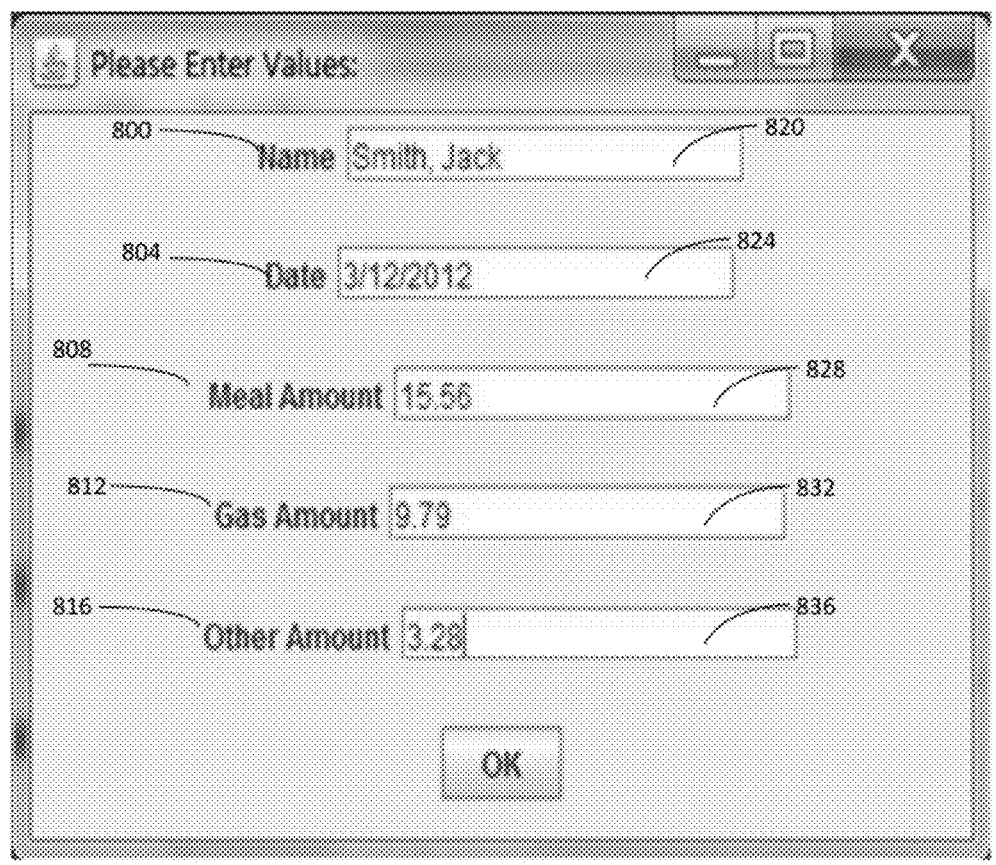
FIG. 11 illustrates an example screen image of a dialog frame window created by executing a dynamic dialog frame method that is generated from using the extracted field names from placeholders of persistent type 1 in an XML based template file as labels in the dialog frame window.

An example of a dialog window generated as a result of the calls to the getKeyValue module at block 708 and to the createPrompt module at block 712 is illustrated in FIG. 11 with the template file in XML format that is described below.

```
<?xml version="x.x"?>
<?xml:stylesheet type="text/xsl" href="expense.xsl"?>
<!--Expense Template-->
<expense>
   <empName value="% var % Name % evar %"/>
   <expDate value="% var % Date % evar %"/>
   <item amount="% var % Meal_Amount % evar %">
      <name>Meal</name>
      <description>
         Meal expense
      </description>
   </item>
   <item amount="% var % Gas_Amount % evar %">
      <name>Gas</name>
      <description>
         Gasoline expense
      </description>
   </item>
   <item amount="% var % Other_Amount % evar %">
      <name>Other Expense for % var % Name % evar %</name>
      <description>
         Other expense
      </description>
   </item>
</expense>
```

In this file, the string values of the variable names are Name, Date, Meal_Amount, Gas_Amount, and Other_Amount. The corresponding placeholders are the strings of the format: % var % variable name % evar, where variable name is one of these five string values. The getKeyValue module stores these five string values as key index values of the variable values hash array. It also stores them as elements of the variable key array. The createPrompt module displays the dialog window in FIG. 11. It creates the label Name from converting the string value of the first element of the variable key array, which is the string "Name", and displays this label at 800. It creates the label Date from converting the string value of the second element of the variable key array, which is the string "Date", and displays this label at 804. It creates the label Meal Amount from converting the string value of the third element of the variable key array, which is the string "Meal_Amount", and displays this label at 808. It creates the label Gas Amount from converting the string value of the fourth element of the variable key array, which is the string "Gas_Amount", and displays this label at 812. It creates the label Other Amount from the value of the five element of the variable key array, which is the string "Other_Amount", and displays this label at 816. After the user inputs the values for the five fields: "Smith, Jack" at 820, "Mar. 12, 2012" at 824, "15.56" at 828, "9.79" at 832, and "3.28" at 836, respectively, the createPrompt module coverts the input values into a single string "Smith Jack;3/12/2012;15.56;9.79;3.28" and stores it in the global variable varData. At blocks 716 and 724 of FIG. 10, the createFile module splits the string value of the variable varData and populates the variable values hash array with the following key-value pairs: "Name"-"Smith, Jack", "Date"-"Mar. 12, 2012", "Meal_Amount"-"15.56", "Gas_Amount"-"9.79", and "Other_Amount"-"3.28". At blocks 756 and 760 of FIG. 10, for a line of the template file that contains a placeholder, the createFile module creates a new line in the target file by extracting the field variable name from the placeholder and replacing the placeholder by the value corresponding the key index that has the string value of the field variable name. For example, from the line in the template file:

<empName value="% var % Name % evar %"/> the following line is generated for the target file:

<empName value="Smith, Jack"/>

From block 744 to block 768 of FIG. 10, the program loop of the createFile module generates from the template file the complete target file with the following content:

```
<?xml version="x.x"?>
<?xml:stylesheet type="text/xsl" href="expense.xsl"?>
<!--Expense Template-->
<expense>
    <empName value="Smith, Jack"/>
    <expDate value="Mar. 12, 2012"/>
    <item amount="15.56">
        <name>Meal</name>
        <description>
          Meal expense
        </description>
    </item>
    <item amount="9.79">
        <name>Gas</name>
        <description>
          Gasoline expense
        </description>
    </item>
    <item amount="3.28">
        <name>Other Expense for Smith, Jack</name>
        <description>
          Other expense
        </description>
    </item>
</expense>
```

Figure 5C:
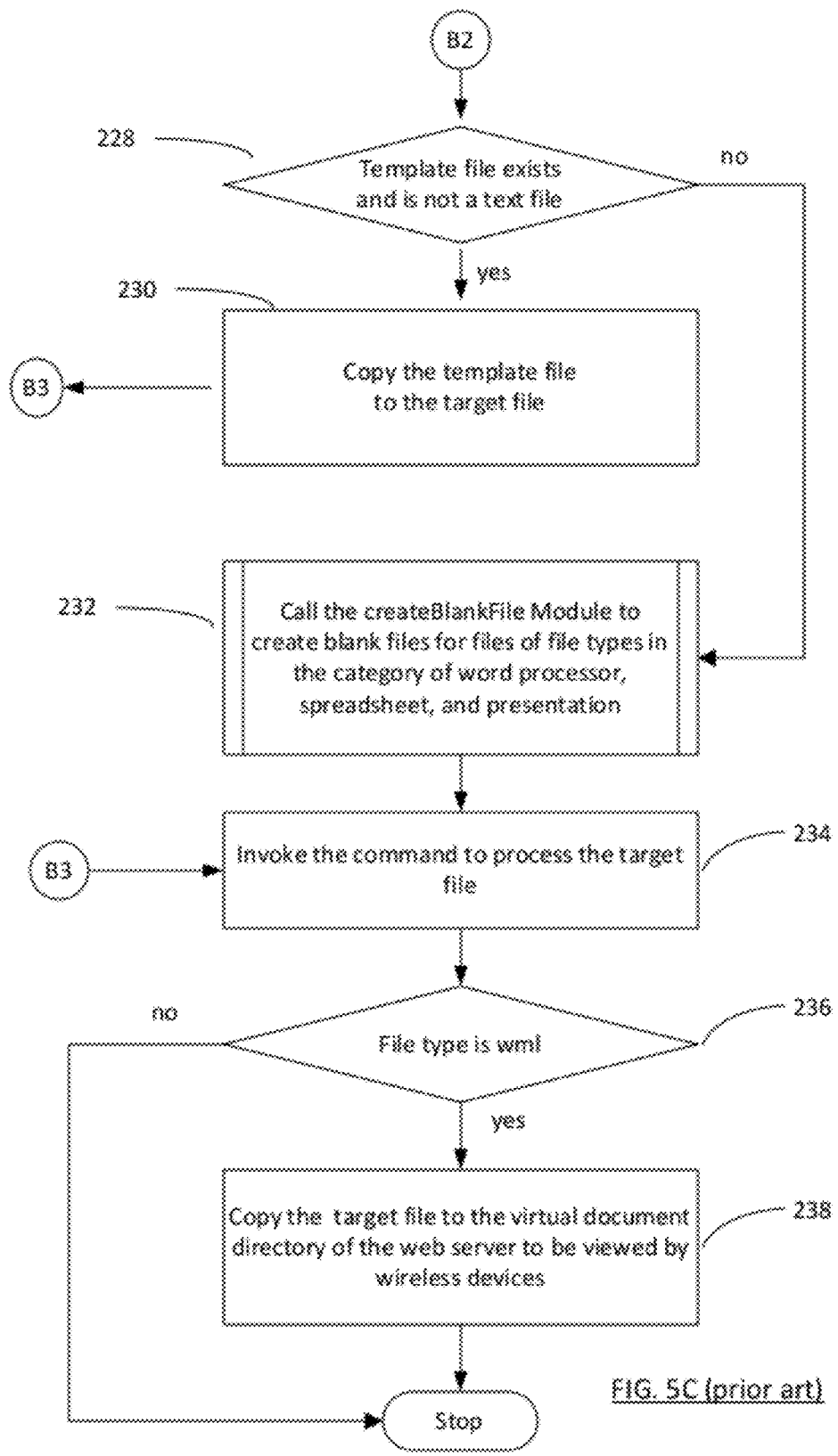
Figure 6A:
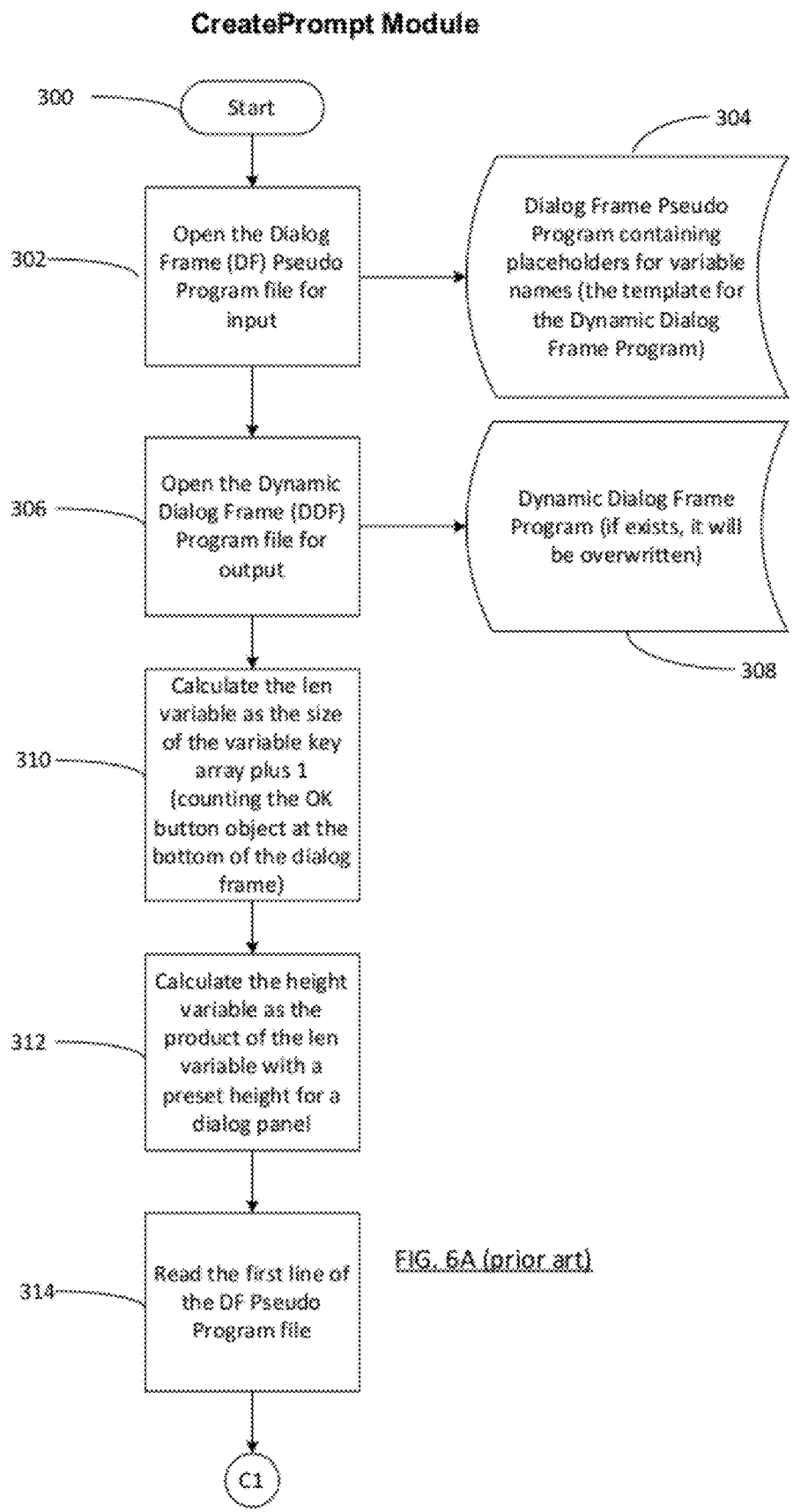
FIG. 6 is a flow chart that illustrates an example of the steps of the createPrompt module. This module receives from the calling program or calling module prompting information that if will use to create a program that displays a dialog window to prompt for and to collect inputs from a user.
Figure 6B:
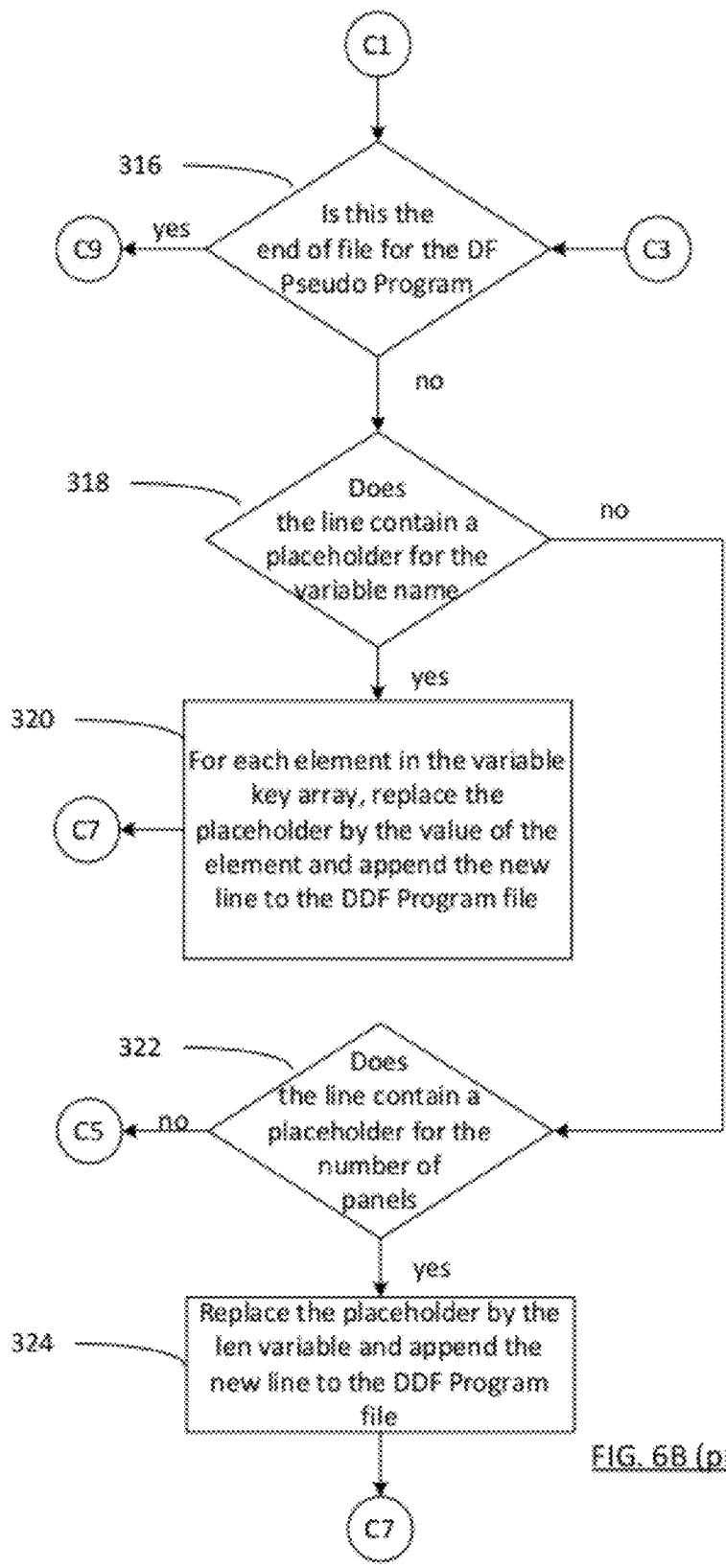
Figure 6C:
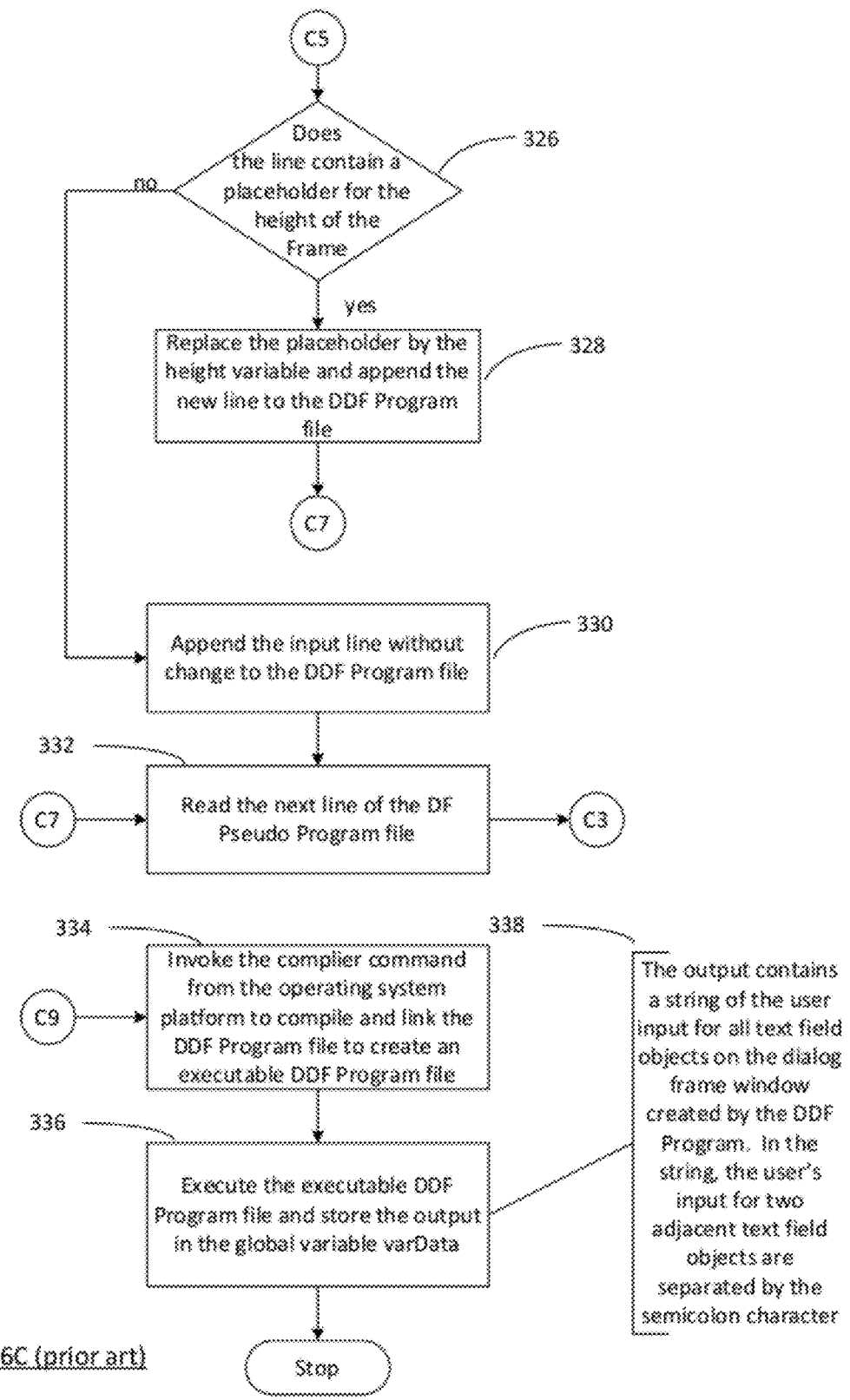
Figure 12:
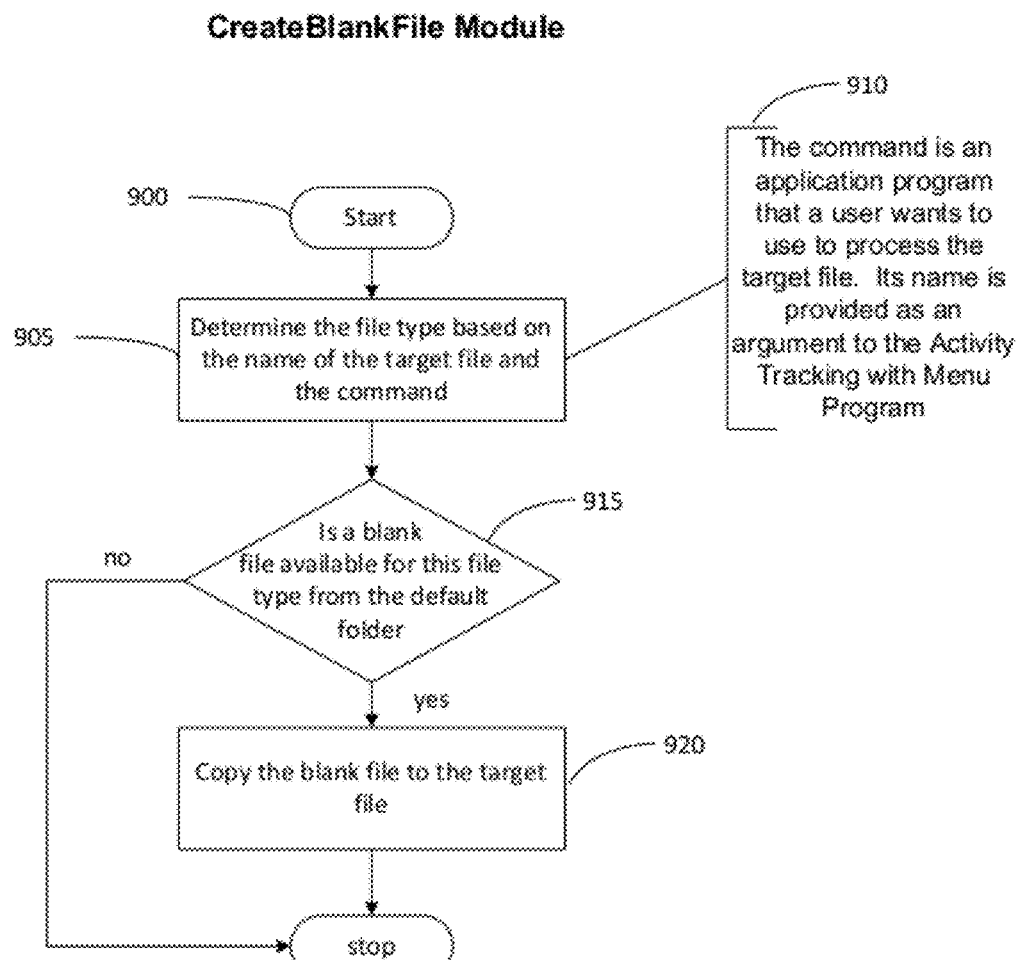
FIG. 12 is a flow chart that illustrates an example of the steps of the createBlankFile module. The module creates an empty new target file, of which the file type is in the category of certain file types, to drop the warning messages for some application programs if the target files that they are to process do not exist.

As was illustrated at boxes 18 and 30 of FIG. 1 and at block 232 of FIG. 5C, the Check File Type Program (CFT Program) calls the createBlankFile module. As was discussed previously for Figure and the CFT Program, the createBlankFile module is called if the template file does not exist. FIG. 12 illustrates the createBlankFile module. The createBlankFile module creates an empty new target file, of which the file type is in the category of certain file types, to drop warning messages for some application programs if the target files that they are to process do not exist. At block 905, it determines the file type of the target file based on name of the target file and on the command, the application program that is to process the target file. At block 915, it checks whether a blank file is available for this file type in the default folder that contains blank files of various types; for example, word processing file, spreadsheet file, and presentation file and so on. If no, then it returns to the calling program, which is the CFT Program. If yes, then it copies the blank file to the target file and returns to the CFT Program.

Figure 13:
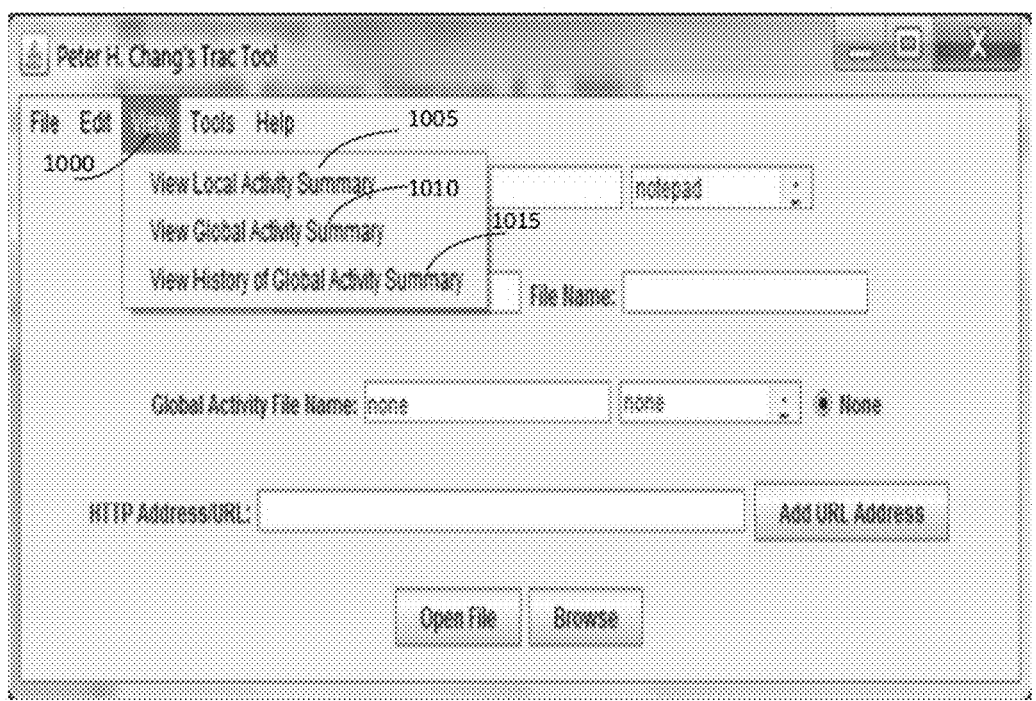
FIG. 13 illustrates example menu items if a user clicks on the View menu at box 51 of FIG. 2 or box 1000 of FIG. 13.

As is described in box 52 of FIG. 2, the Graphics User Interface Program (GUI Program) displays the View menu on the menu bar. FIG. 13 illustrates the menu items if a user clicks on the View menu at 1000. Three menu items are displayed: View Local Activity Summary at 1005, View Global Activity Summary at 1010, and View History of Global Activity Summary at 1015, respectively. If the user clicks the View Local Activity Summary menu item, the GUI Program displays in a new window the local activity summary file located in the folder where the last target file was processed. If the user clicks the View Global Activity Summary menu item, the GUI Program displays in a new window the Global Activity Summary file whose file name was selected by the user and is displayed at box 58 of FIG. 2. If the user clicks the View History of Global Activity Summary menu item, the GUI Program displays in a new window the names of the Global Activity Summary files that have been modified by the ATWM Program and the timestamps of the events of these modifications. Both the Local Activity Summary files and Global Activity Summary files can be used as forms of audit trail in the generation of target files from template files.

Figure 14:
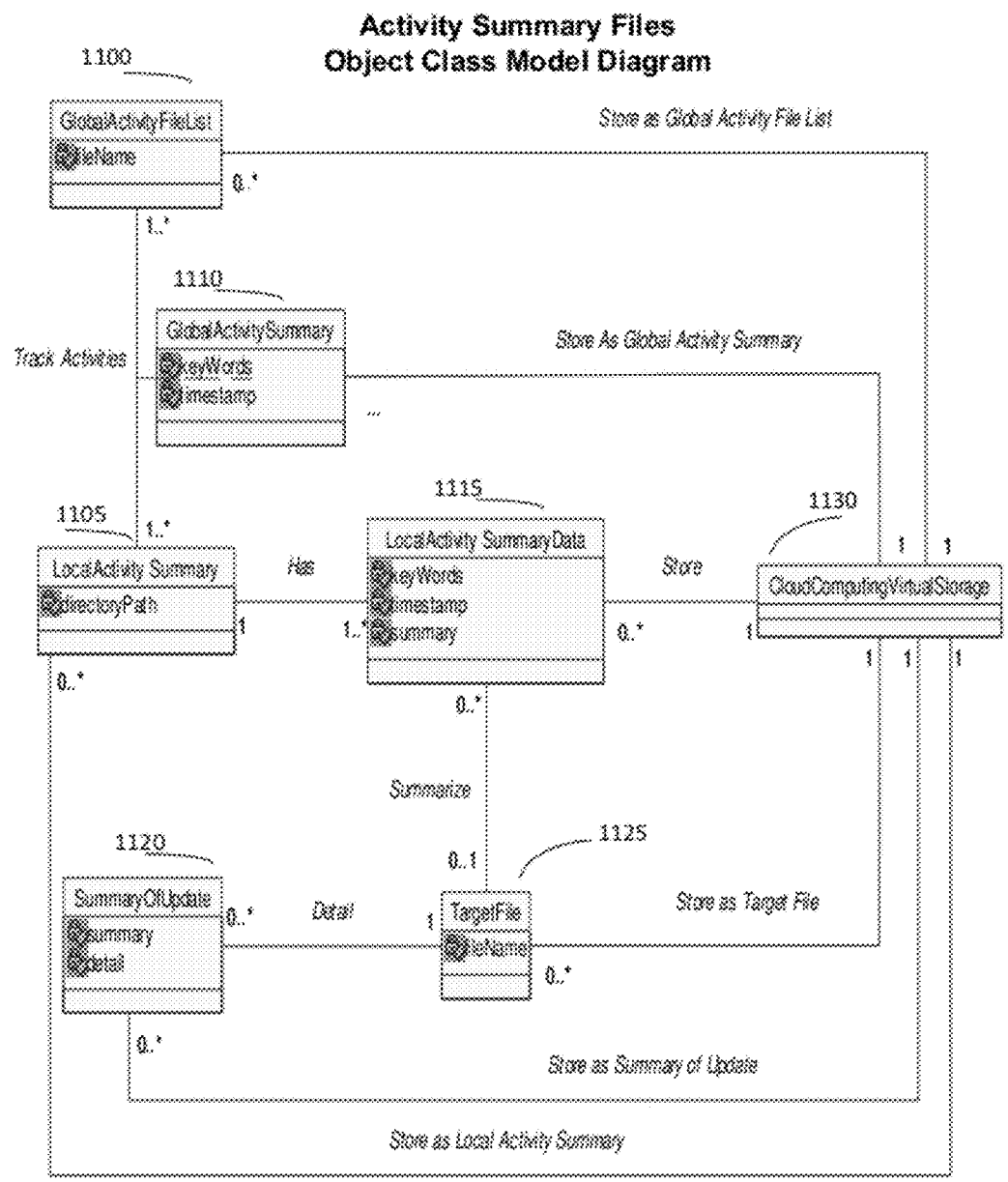
FIG. 14 illustrates an example database object modeling diagram that guides a design and implementation of a database that contains local activity summary tables and global activity summary tables. This is the case that if a Relational Database is used instead of files to store data for local activity summary and for global activity summary. The storage options of the files and database can be local on premise of the user environment or on a CCE virtual storage environment.

As was discussed for the ATWM Program illustrated by FIG. 4, the local activity summary file and global activity summary file may be replaced by local activity summary table and global activity summary table, respectively, if Relational Database Management System (RDBMS) is used. FIG. 14 illustrates an Object Class Diagram in the Unified Modeling Language (UML) that guides a design and implementation of a database that contains local activity summary tables and global activity summary tables. At box 1100, the object class GlobalActivityTableList represents the names of all global activity summary tables. At box 1105, the object class LocalActivitySummary represents the directory (folder) paths corresponding to local activity summary tables. In object-oriented modeling methodology, there is a many-to-many association between the two object classes: GlobalActivityTableList and LocalActivitySummary and thus the association becomes an association class named as GlobalActivitySummary, which, shown at box 1110, represents the logging of processing of target files globally. At box 1115, the object class LocalActivitySummaryData represents the logging of processing of target files locally. There is a one-to-many association between the two classes: LocalActivitySummary and LocalActivitySummaryData. At box 1125, the object class TargetFile represents the names of all target files that were processed before. There is a one-to-many association between the two classes: TargetFile and LocalActivitySummaryData. At box 1120, the object class SummaryOfUpdate represents the summaries and optional details of the processing of the target files. There is a one-to-many association between the two classes: TargetFile and SummaryOfUpdate. This object model illustrated in FIG. 14 specifies that in the implementation to RDBMS, all the six classes represented by boxes 1100 to 1125 should be implemented as database tables. At box 1130, the object class CloudComputingVirtualStorage has a one to many associations with all the six classes. This means that data records represented by object instances of these six classes can be stored in CCE. If they are stored in database tables, then the database can be stored in CCE.

Figure 15:
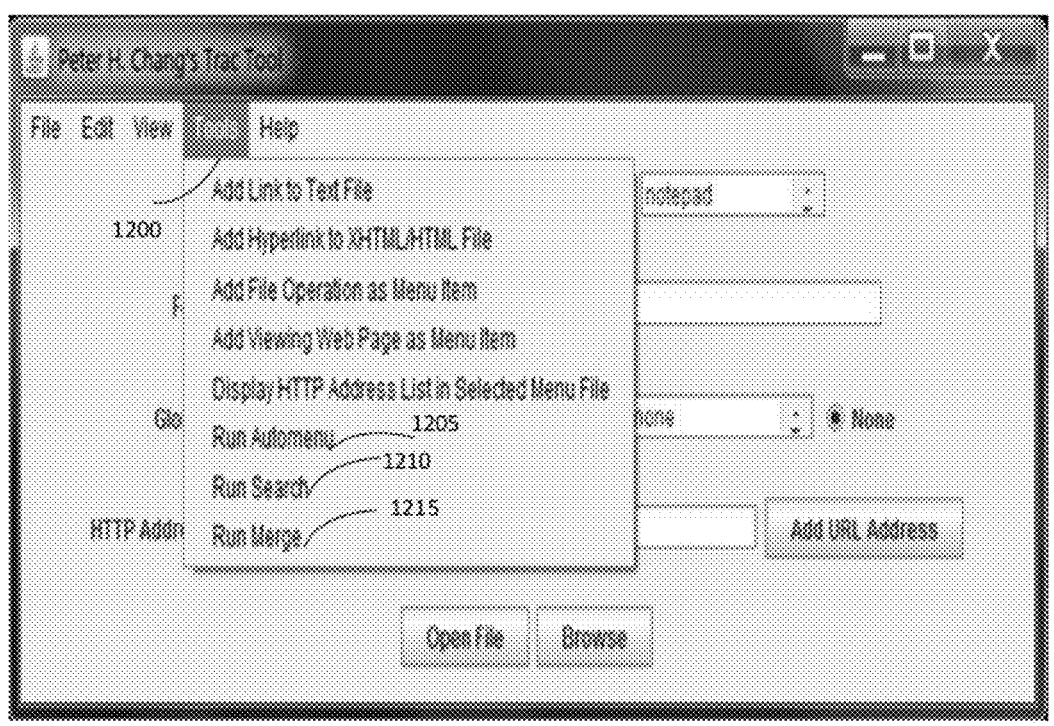
FIG. 15 describes an example drop down menu when a user clicks on the Tools menu on the menu bar at 53 of FIG. 2 or at 1200 of FIG. 15.

FIG. 15 describes the drop down menu when a user clicks on the Tools menu on the menu bar at box 53 of FIG. 2 or at 1200 of FIG. 15. The drop down menu contains three menu items: Run Automenu, Run Search, and Run Merge shown at boxes 1205, 1210, and 1215, respectively. The menu item:

Run Automenu starts the user driven menu program of the UDMGS system. A menu file such as but not limited to that shown at box 500 of FIG. 8 may be used as the menu configuration file for this user driven menu program. The menu item: Run Search starts a search program. The menu item: Run Merge starts a merge program.

As mentioned, for an ease of discussion, the changeable fields involved in previous discussions for the three programs and four modules in reference to FIG. 1: Activity Tracking with Menu Program (block 16), Check File Type Program (block 18), Dynamic Dialog Frame Program (block 28), createFile module (block 20), getKeyValues module (block 22), createPrompt module (block 24), and createBlankFile module (block 30) are restricted to persistent changeable field of type 1. The same discussions can be applied to persistent changeable field of type 2.

FIG. 16 illustrates the placeholders of a persistent changeable field (of either type 1 or 2) in box 1300, a temporary changeable field in box 1305, and a persistent changeable field (of either type 1 or 2) nested within a temporary changeable field in box 1310, respectively. The string "PH_" in these three boxes is the abbreviation of the string "Placeholder_". The ellipsis . . . in box 1300 means that placeholders for other persistent changeable fields (of either type 1 or 2) may follow the previous one. This is included in the specifications of the syntax rules to be discussed at the end of this paragraph. By automatically detecting and extracting information of the placeholders of persistent type 1, the embodiments of disclosures dynamically prompt users to enter values for the changeable fields, as shown in FIG. 11, and then generates the target document over the local host computer or over the CCE. By automatically detecting and extracting information of the placeholders of persistent type 2, it dynamically updates security information such as audit trail logging information or access control list. By automatically detecting placeholders of temporary type, it dynamically generates a security measure such as encryption to scramble the original content of the field. The position for these placeholders can be recursive or repetitive as shown in the following specification of syntax rules in Backus-Naur Form (BNF):

<PH_Temporary_Changeable_Field>::=
<Temporary_Changeable_Field_Head_Tag>Content
|<PH_Persistent_Changeable_Field><Temporary_Changeable_Field_End_Tag>
<PH_Persistent_Changeable_Field>::=
<Persistent_Changeable_Field_Head_Tag>GUI_Label_of_Field
<Persistent_Changeable_Field_End_Tag>|{<PH_Persistent_Changeable_Field>}

Here PH stands for Placeholder and GUI stands for Graphical User Interface. In these rules, a persistent changeable field can be either of type 1 or 2. Both rules specify that a placeholder of a changeable field starts with a head tag and ends with an end tag. The scope of the specification of the first rule includes that the placeholder of a temporary changeable field may contain either a content or the placeholder of a persistent changeable field. The scope of the specification of the second rule includes that the placeholder of a persistent changeable field can be followed by a sequence of 0 or many other placeholders of persistent changeable fields. For an ease of discussion from now on, the first rule will be referred as the Syntax-Rule 1 and the second rule will be referred as the Syntax-Rule 2.

An example for a placeholder for the persistent changeable field of type 1 was discussed before in reference to FIG. 11. An example containing placeholders for both the persistent changeable fields of types 1 and 2 is the following XML file; those fields of type 1 contain regular content and those of type 2 contain audit trail information.

```
<?xml version="x.x"?>
<?xml:stylesheet type="text/xsl" href="expense.xsl"?>
<!--Expense Template-->
<expense>
  <empName value="% var % Name % evar %"/>
  <expDate value="% var % Expense_Date % evar %"/>
  <social security number value="% var % Social_Security_Number % evar %"/>
  <item amount="% var % Meal_Amount % evar %">
    <name>Meal</name>
    <description>
      Meal expense
    </description>
  </item>
  <item amount="% var % Gas_Amount % evar %">
    <name>Gas</name>
    <description>
      Gasoline expense
    </description>
  </item>
  <item amount="% var % Other_Amount % evar %">
    <name>Other Expense for % var % Name % evar %</name>
    <description>
      Other expense
    </description>
  </item>
  <!--Audit Trail-->
  <Date of Entry value="% var % Date_of_Entry % evar %"/>
  <Time of Entry value="% var % Time_of_Entry % evar %"/>
  <Entered by value="% var % Entered_By % evar %"/>
</expense>
```

Figure 17:
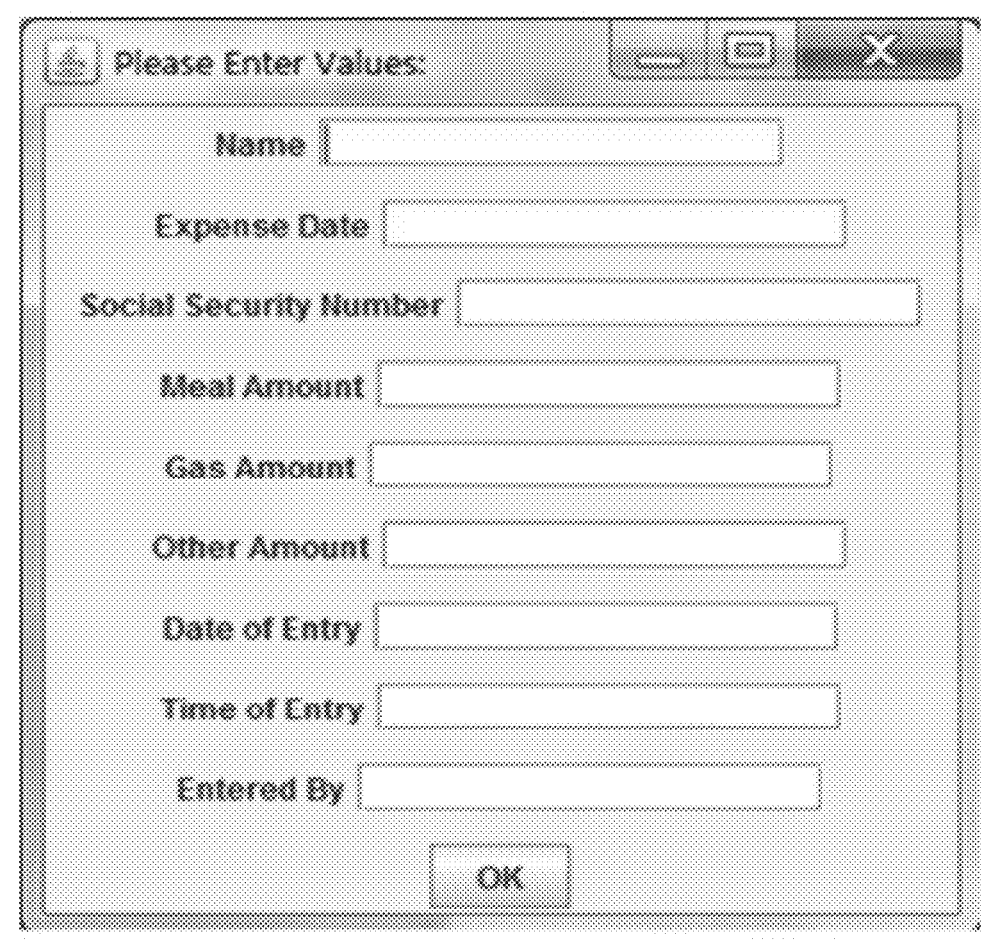

In the above file, the head tag is % var %; the end tag is % evar %; the placeholders for the persistent changeable fields are those enclosed by the strings % var % and % evar %; the persistent changeable fields of type 1 are Name, Expense_Date, Social_Security_Number, Meal_Amount, Gas_Amount, and Other_Amount; the persistent changeable fields of type 2, which contain audit trail information, are Date_of_Entry, Time_of_Entry, and Entered_By. These placeholders follow the Syntax-Rule 2. After parsing the above file, the embodiments generate a dialog frame window containing the GUI prompting labels as shown in FIG. 17.

Two examples of for placeholders of the temporary changeable field type are introduced below. The first example is the following line of a Web page of the XHTML file format.

<a href="http://www.#var#URI_Scheme_Specific_Part#-evar#.com">Source Anchor</a> which is an XHTML anchor tag and URI is the acronym of Universal Resource Identifier, which is a unique string in a network of an enterprise environment or in the internet that uniquely identifies a resource in the network. In the above line, the head tag is #var#; the end tag is #evar#; the placeholder for the temporary changeable field is the string enclosed by the strings #var# and #evar#, which follows the Syntax-Rule 1. For example, if the URI_Scheme_Specific_Part is the string placeholder_example_for_temporary_changeable_field, which means that the URI is the string http://www.placeholder_example_for_temporary_changeable_field.com, the placeholder: #var#placeholder_example_for_temporary_changeable_field#evar# in the above line can be encrypted to the following by using the encryption algorithm to be presented.

```
<a href="http://www.-)~"%,)!"/|"5~*-)"*-J~/6|%~+$"~)
"|#&")!.com">Source Anchor</a>
```

As will be discussed about the encryption algorithm, the encryption result will change each time the encryption algorithm is executed because the associated encryption key number is randomly generated each time the encryption algorithm is executed; the encryption key numbers are saved in a secured file. For example, if the encryption algorithm is executed the second time on the above unencrypted placeholder for the temporary changeable field: #var#placeholder_example_for_temporary_changeable_field#evar#, the resulting line is the following:

```
<a    href="http://www.KG<>@CJG?@M:@S<HKG
    @:AJM:O@HKJM<MT:>C<IB@<=G@:A
    D@G?.com">Source Anchor</a>
```

The second example is the template file in the following.

```
<?xml version="x.x"?>
<?xml:stylesheet type="text/xsl" href="expense.xsl"?>
<!--Expense Template-->
<expense>
    <empName value="% var % Name % evar %"/>
    <expDate value="% var % Date % evar %"/>
    <empID value="#var#% var % Employee_ID % evar %#evar#"/>
    <item amount="% var % Meal_Amount % evar %">
        <name>Meal</name>
        <description>
            Meal expense
        </description>
    </item>
    <item amount="% var % Gas_Amount % evar %">
        <name>Gas</name>
        <description>
            Gasoline expense
        </description>
    </item>
    <item amount="% var % Other_Amount % evar %">
        <name>Other Expense for % var % Name % evar %</name>
        <description>
            Other expense
        </description>
    </item>
</expense>
```

Figure 18:
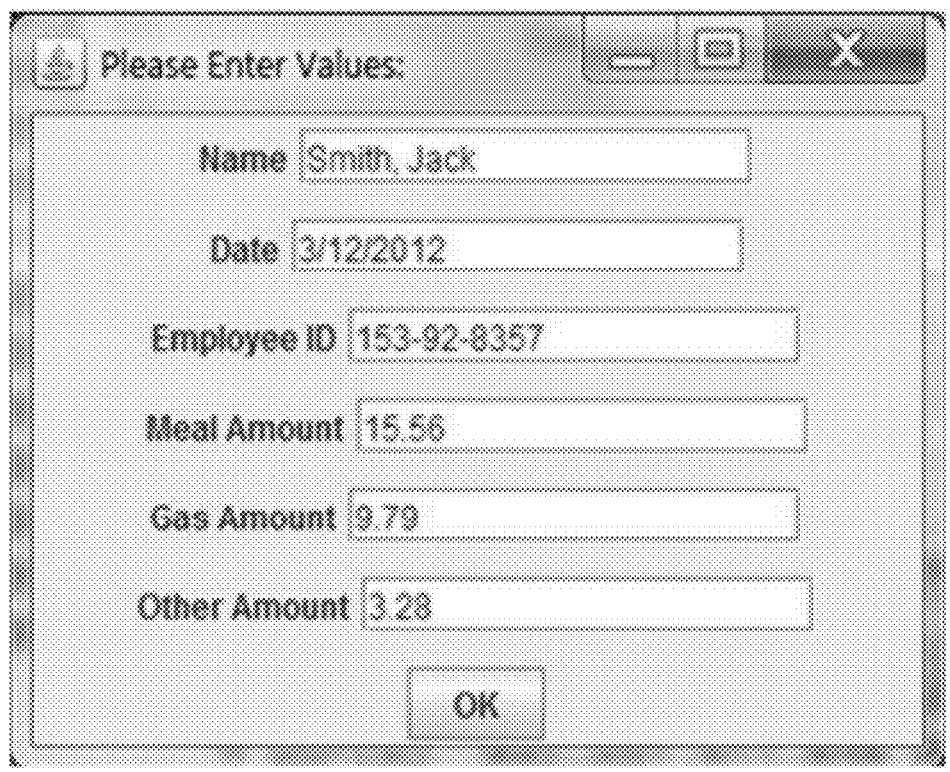
FIG. 18 illustrates an example screen image of a dialog frame window created by executing a dynamic dialog frame method that is generated from using the extracted field names from placeholders of persistent types 1 and a placeholder of temporary type in an XML based template file as labels in the dialog frame window.

In the above file, the strings % var % and % evar % are the head tag and end tag, respectively, of the placeholders of persistent changeable fields, which follow the Syntax-Rule 2. The strings #var# and #evar# are the head tag and end tag, respectively, of the placeholders of temporary changeable fields, which follow the Syntax-Rule 1. The embodiments first generate a dialog frame window and the user enters data as shown in FIG. 18 and then generates the target file in the following.

```
<?xml version="x.x"?>
<?xml:stylesheet type="text/xsl" href="expense.xsl"?>
<!--Expense Template-->
<expense>
    <empName value="Smith, Jack"/>
    <expDate value="Mar. 12, 2012"/>
    <empID value="#var#153-92-8357#evar#"/>
    <item amount="15.56">
        <name>Meal</name>
        <description>
            Meal expense
        </description>
    </item>
    <item amount="9.79">
        <name>Gas</name>
        <description>
            Gasoline expense
        </description>
    </item>
    <item amount="3.28">
        <name>Other Expense for Smith, Jack</name>
        <description>
            Other expense
        </description>
    </item>
</expense>
```

In the above file, the element name: empID stands for employee ID. It may need to be secured since some organization may use the social security number as employee ID. Therefore the field containing its value may need to be encrypted before its transmission over a network such as the Internet. As shown in the above file, this field is considered as a temporary changeable field and is enclosed by the head tag #var# and end tag #evar#. The encryption algorithm to be discussed next can be used to encrypt this field inside the above file as shown in the following.

```
<?xml version="x.x"?>
<?xml:stylesheet type="text/xsl" href="expense.xsl"?>
<!--Expense Template-->
<expense>
    <empName value="Smith, Jack"/>
    <expDate value="Mar. 12, 2012"/>
    <empID value="uywq}vq|wy{"/>
    <item amount="15.56">
        <name>Meal</name>
        <description>
            Meal expense
        </description>
    </item>
    <item amount="9.79">
        <name>Gas</name>
        <description>
            Gasoline expense
        </description>
    </item>
    <item amount="3.28">
        <name>Other Expense for Smith, Jack</name>
        <description>
            Other expense
        </description>
    </item>
</expense>
```

Figure 19:
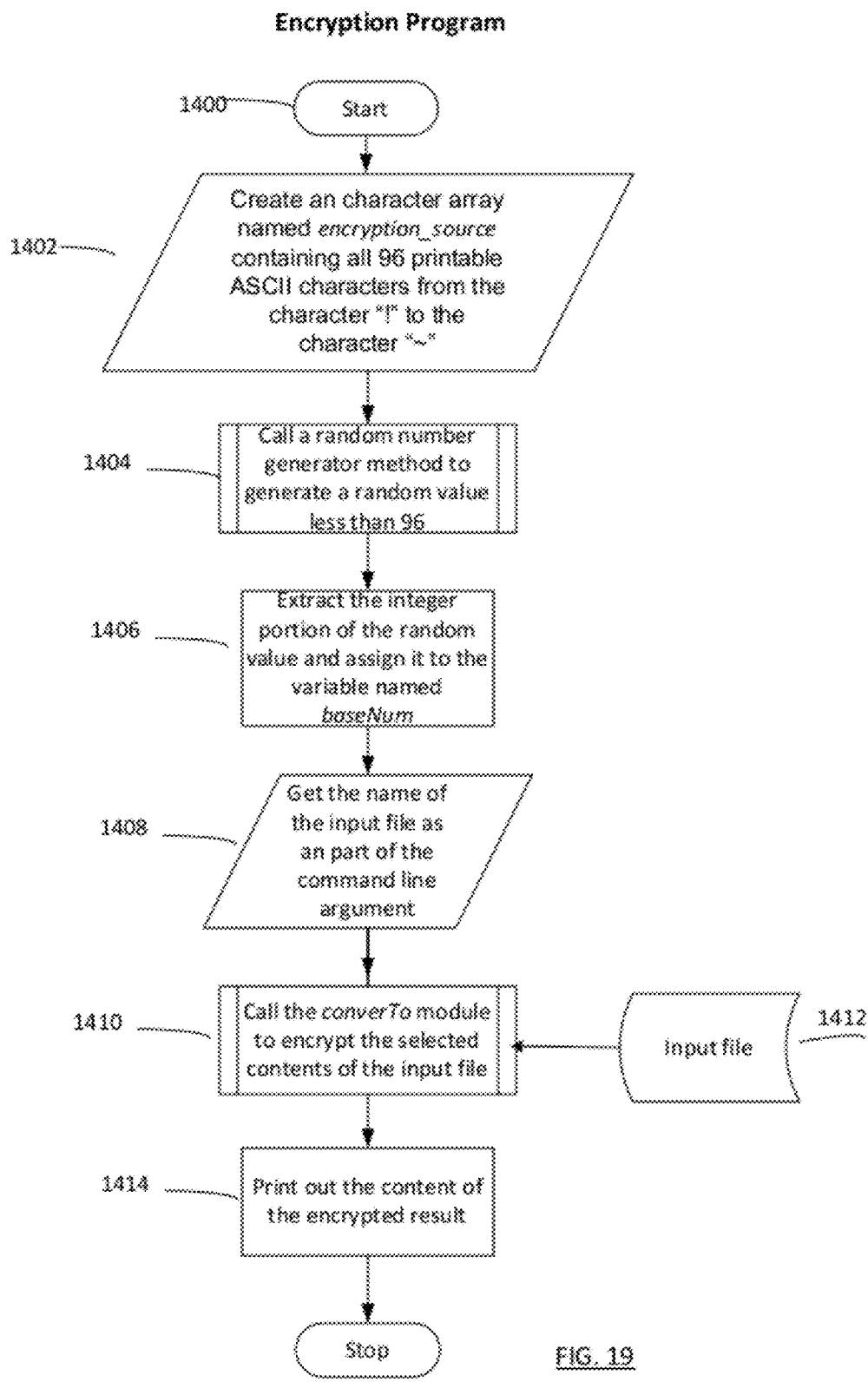
FIG. 19 is a flow chart that illustrates an example of the steps of an encryption method. A computer program that implements this method prepares an array of printable characters as an encryption source and calls the converTo module to perform the encryption task.
Figure 20A:
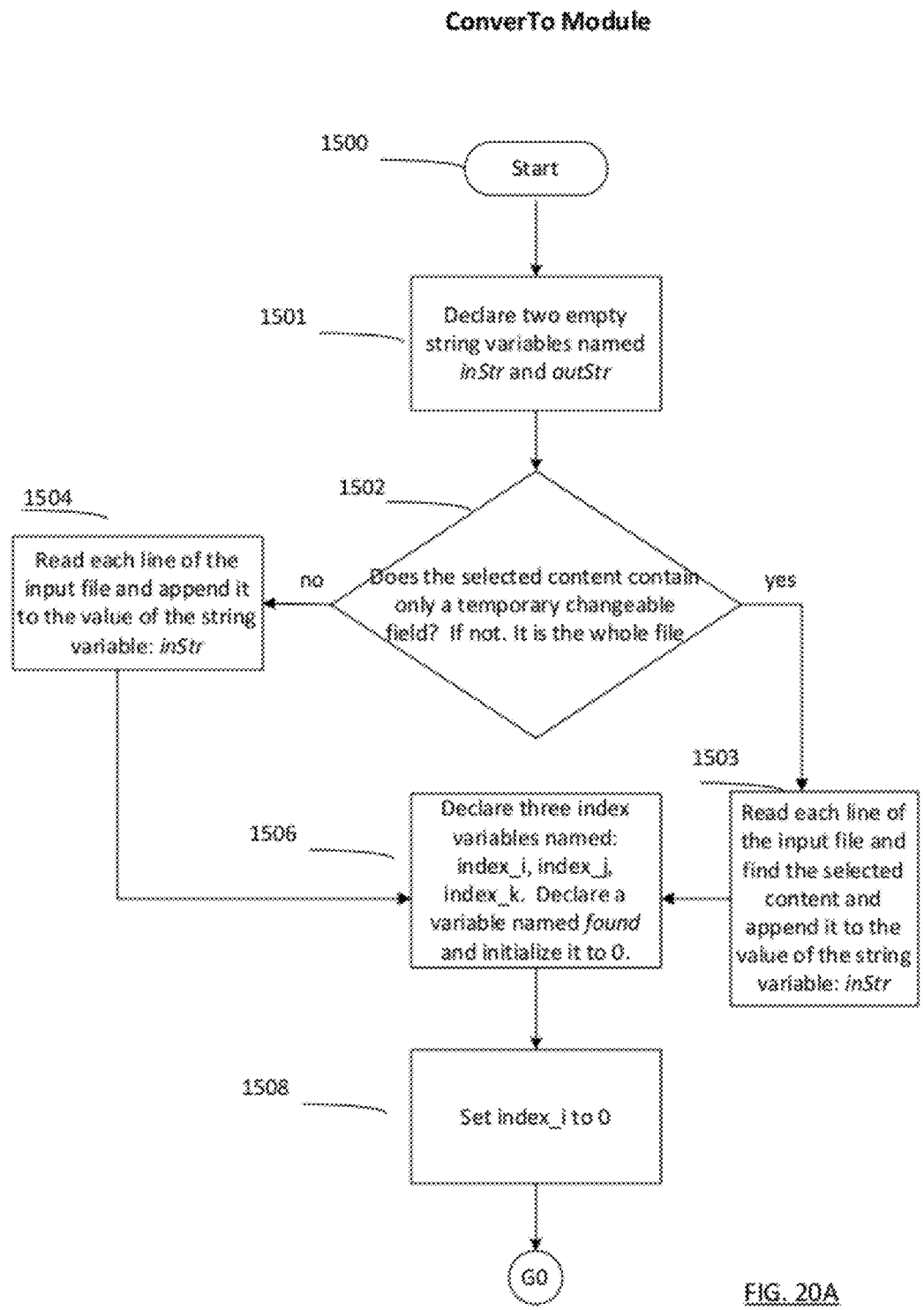
FIG. 20 is a flow chart that illustrates an example of the steps of an converTo module.
Figure 20B:
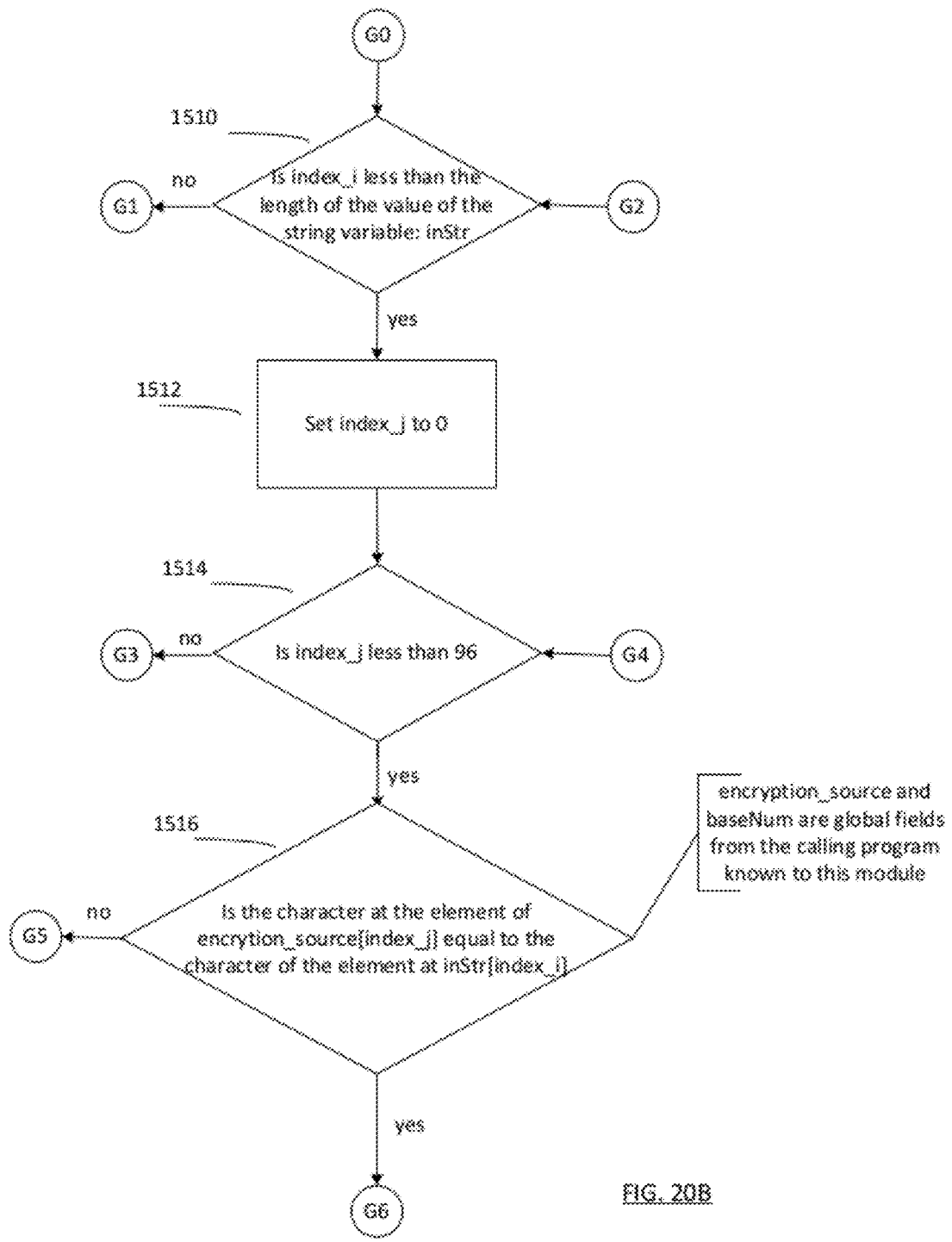
Figure 20C:
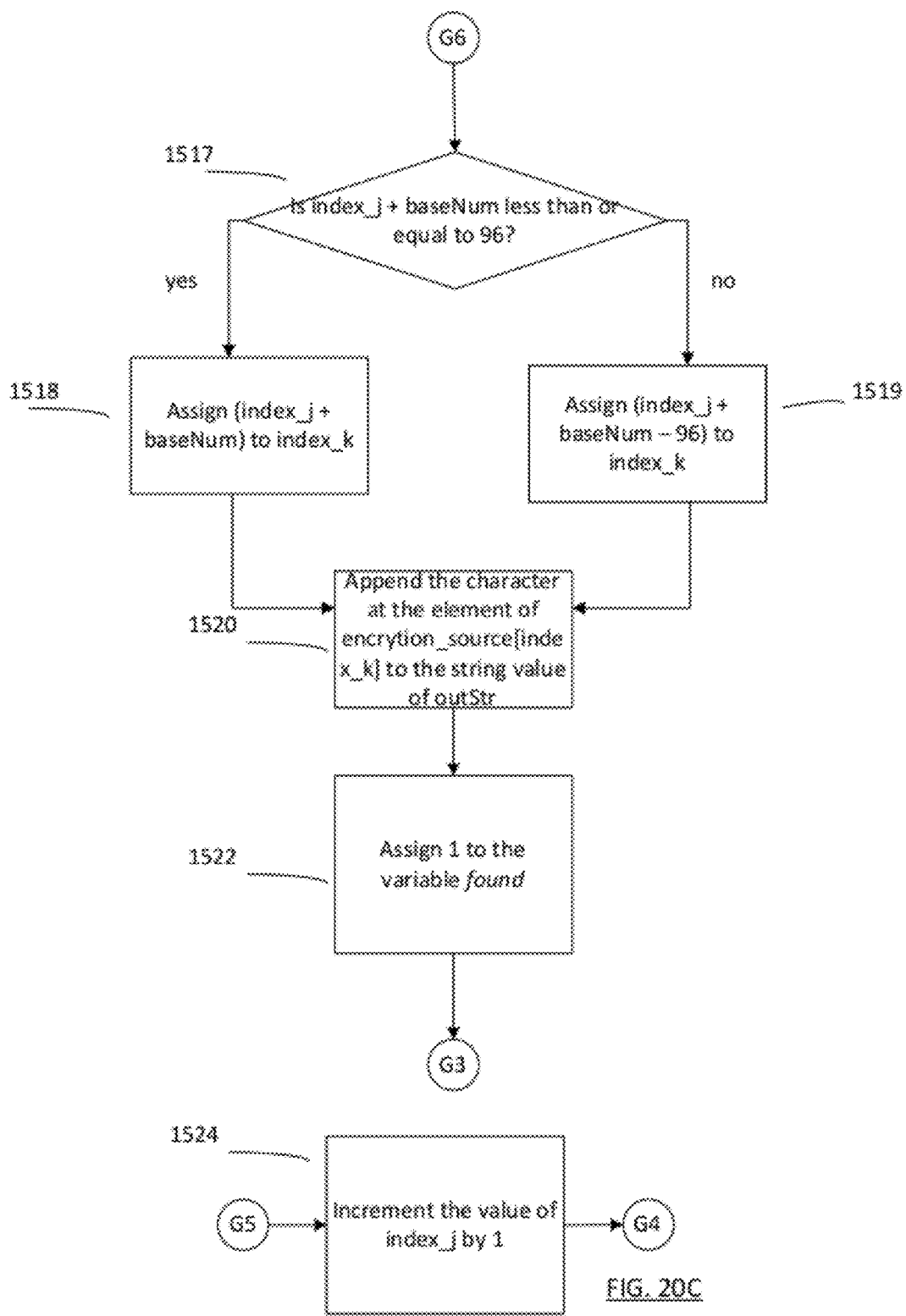
Figure 20D:
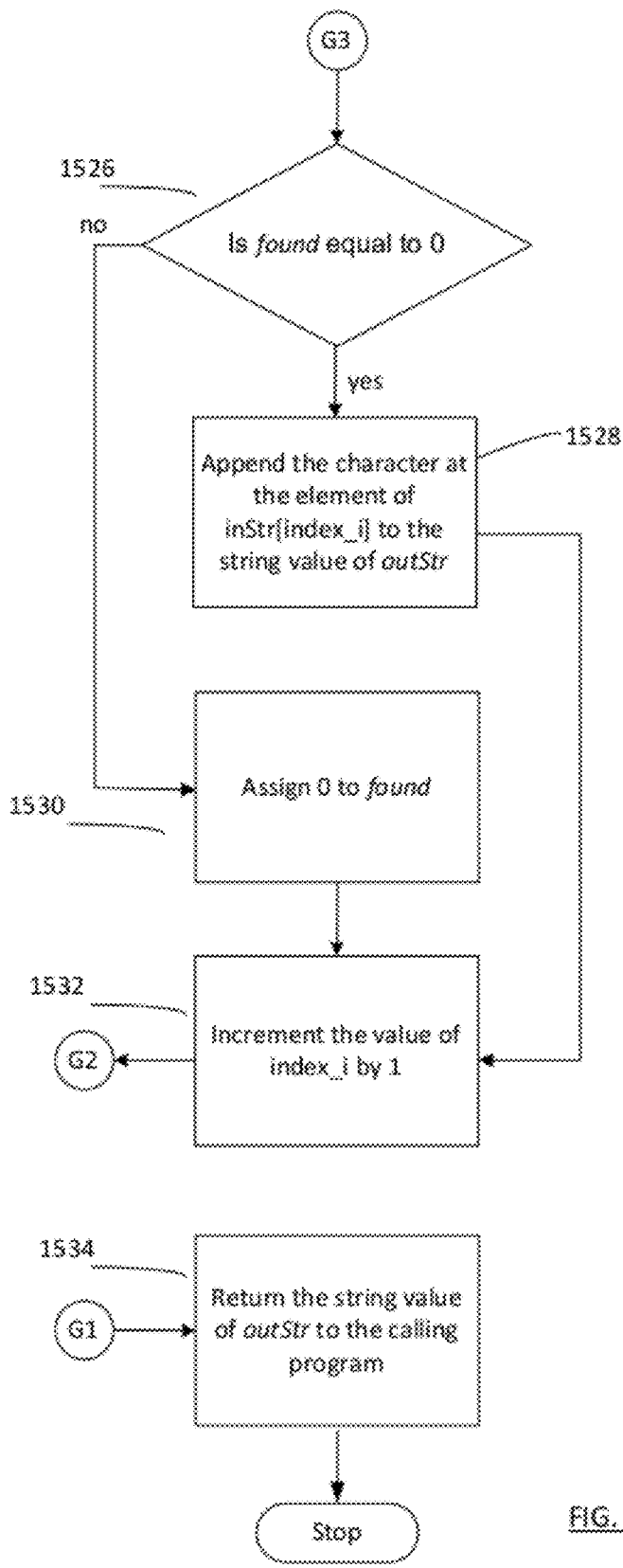

An algorithm to encrypt the placeholder or the whole file is depicted in FIGS. 19 and 20. Encryption key number is randomly generated and its time and date of generation and the filename of the file where its temporary placeholders are encrypted will be stored in a password protected file accessible only by the owner of the file and those users whom are authorized by the owner to access the file. The encrypted file may be sent through an unsecured network such as the Internet. The password protected file is securely stored on the server. It is up to the owner of the file to release the encryption key number information to those who are authorized to access the file. In FIG. 19, block 1402 creates an character array named encryption_source containing all 96 printable American Standard Code for Information Interchange (ASCII) characters from the character "!" to the character "~", which include the 62 alphanumerical characters (26 upper case letters, 10 integers from 0 to 9, and 26 lower case letters), the line feed character, the space character, and 32 other printable characters such as punctuation marks. The following displays 94 of the 96 characters.

! " # $ % & ' ( ) * +, - . / 0 1 2 3 4 5 6 7 8 9 : ; < = > ? @ A B C D E F G H I J K L M N O P Q R S T U V W X Y Z [ ]ˆ _ a b c d e f g h i j k l m n o p q r s t u v w x y z {|} ~

As discussed, the two other characters that are included are the line feed character and the space character. Block 1404 calls a random number generator library function to generate a random value less than 96. Block 1406 extracts the integer portion of the random value and assign it to the variable named baseNum, which is the encryption key number for the encryption algorithm. Block 1408 gets the name of the input file as an part of the command line argument. Block 1410 calls the converTo module to encrypt the selected contents of the input file, identified by block 1412; a selected content may be a temporary changeable field that is to be encrypted or the content of the whole input file. Block 1414 prints out the result of the encryption.

FIG. 20 illustrates the converTo module. Block 1501 declares two empty string variables named in Str and outStr. Block 1502 checks whether the selected content contains only temporary changeable fields. If yes, block 1503 reads each line of the input file and finds the selected content and appends the selected content to the value of the string variable: in Str. If no, the selected content is the whole file; block 1504 reads each line of the input file and append it to the value of the string variable: in Str. Block 1506 declares three index variables named: index_i, index_j, and index_k, respectively. It also declares a variable named found and initialize it to 0. Block 1508 starts a loop with index_i as its index and initializes index_i to 0. Block 1510 checks whether index_i is less than the length of the value of the string variable: in Str. If no, it branches to block 1534. If yes, it continues to block 1512. Block 1512 starts an inner loop with index_j as its index and initializes index_j to 0. Block 1514 checks whether index_j is less than 96. If no, it branches to block 1526. If yes, it continues to block 1516. which checks whether the character at the element of encrytion_source[index_j] equal to the character of the element at in Str[index_i]. If no, it branches to block 1524. If yes, it continues to block 1517. Block 1517 checks whether (index_j+baseNum) is less than or equal to 96. If yes, block 1518 assigns (index_j+baseNum) to index_k. If no, block 1519 assignes (index_j+baseNum−96) to index_k. Block 1520 appends the character at the array element of encryption_source[index_k] to the string vaue of outStr. Blocks 1516 to 1520 form the central part of this encryption algorithm, which will be discussed in more details later. Block 1522 assigns 1 to the variable found and branches to block 1526. Block 1524 increments the value of index_j by 1 and branches to block 1514. Block 1526 checks whether the value of the variable: found is 0. If no, it branches to block 1530. If yes, it continues with block 1528. Block 1528 appends the character of the array element of in Str[index_i] to the string value of outStr and branches to block 1532. Block 1530 resets the value of the variable: found to 0. Block 1532 increments of the value of index_i by 1 and branches to block 1510. Block 1534 returns the string value of outStr to the calling encryption program depicted in FIG. 19.

Sometimes it may be necessary to encrypt the whole file. This may be because the owner of the file does not want any part of the file to be visible in its original content to an intruder who intercepted it during its transmission over the Internet.

The following is the content of an XML file, referred hereafter as the first XML file, before encryption.

<?xml version="1.0"?>
<?xml:stylesheet type="text/xsl" href="expense.xsl"?>
<!--Expense Template-->
<expense>
  <empName value="Smith, Jack"/>
  <expDate value="Mar. 12, 2012"/>
  <empID value="153-92-8357"/>
  <item amount="15.56">
    <name>Meal</name>
    <description>
      Meal expense
    </description>
  </item>
  <item amount="9.79">
    <name>Gas</name>
    <description>
      Gasoline expense
    </description>
  </item>
  <item amount="3.28">
    <name>Other Expense for Smith, Jack</name>
    <description>
      Other expense
    </description>
  </item>
</expense>

The following is the resulting encrypted file, referred hereafter as the first encrypted file, by using the above encryption algorithm with the baseNum value of 29. As was referred to earlier, the baseNum is referred as the encryption key number.

Y\5*)<3"/0&,+<z<?NKM?\[=Y\5*)W016)"0%""1<16-
"<Z<?1"51L50)?<%/"#<Z<?"5-
"+0"K50)?\[==Y>JJ<b5-"+0"<q"*-)~1"<<<<<<<<<JJ
[==Y"5-"+0"[=<<<Y"*-
k~*"<3~)2"Z?p*&1% Ig~
(?<L[=<<<Y"5-a~1"<3~)2"Z?PLNOLOMNO?<L
[=<<<Y"*-
fa<3~)2"Z?NRPJVOJUPRT?<L[=<<<Y&1"*<~*,2+
1<Z<?NRKRS ?[=<<<<<<<Y+~*"[j"~)Y
L+~*"[=<<<<<<<=<<<<<<Y!"0
/&-1&,+[=<<<<<<<<<j"~)<"5-"+0"=<<<<<<<YL!"0
/&-
1&,+[=<<<YL&1"*[==<<<Y&1"*<~*,2+1<Z<?VKTV?
[=<<<<<<<Y+~*"[d~0YL+~*"[==<<<<<<<Y!"0
/&-1&,+[=<<<<<<<<<d~0,)&+"<"5-"+0"<=<<<<<<<YL!"0
/&-1&,+[=<<<YL&1"*[==<<<Y&1"*<~*,2+
1<Z<?PKOU?[=<<<<<<<Y+~*"[11%"/<b5-
""0"<#,/<p*&1% I<g~
(YL+~*"[==<<<<<<<Y!"0
/&-1&,+[=<<<<<<<<<11%"/<"5-"+
0"<<<<<<<<<<=<<<<<<<YL!"0
/&-1&,+[=<<<YL&1"*[==YL"5-"+0"[

The central part of the encryption algorithm discussed above is described by the blocks of block 1516 to block 1520 of FIG. 20. Using the notations index_j, index_k, and baseNum in FIG. 20, This central part can be described mathematically by a function of a variable x over the interval [0, 96), where x is index_j if x is an integer; f(x) is index_k if f(x) is an integer; b is the baseNum.

$$f(x) = \begin{cases} x+b, 0 <= x < 96-b \\ x+b-96, 96-b <= x < 96 \end{cases}$$

Figure 21:
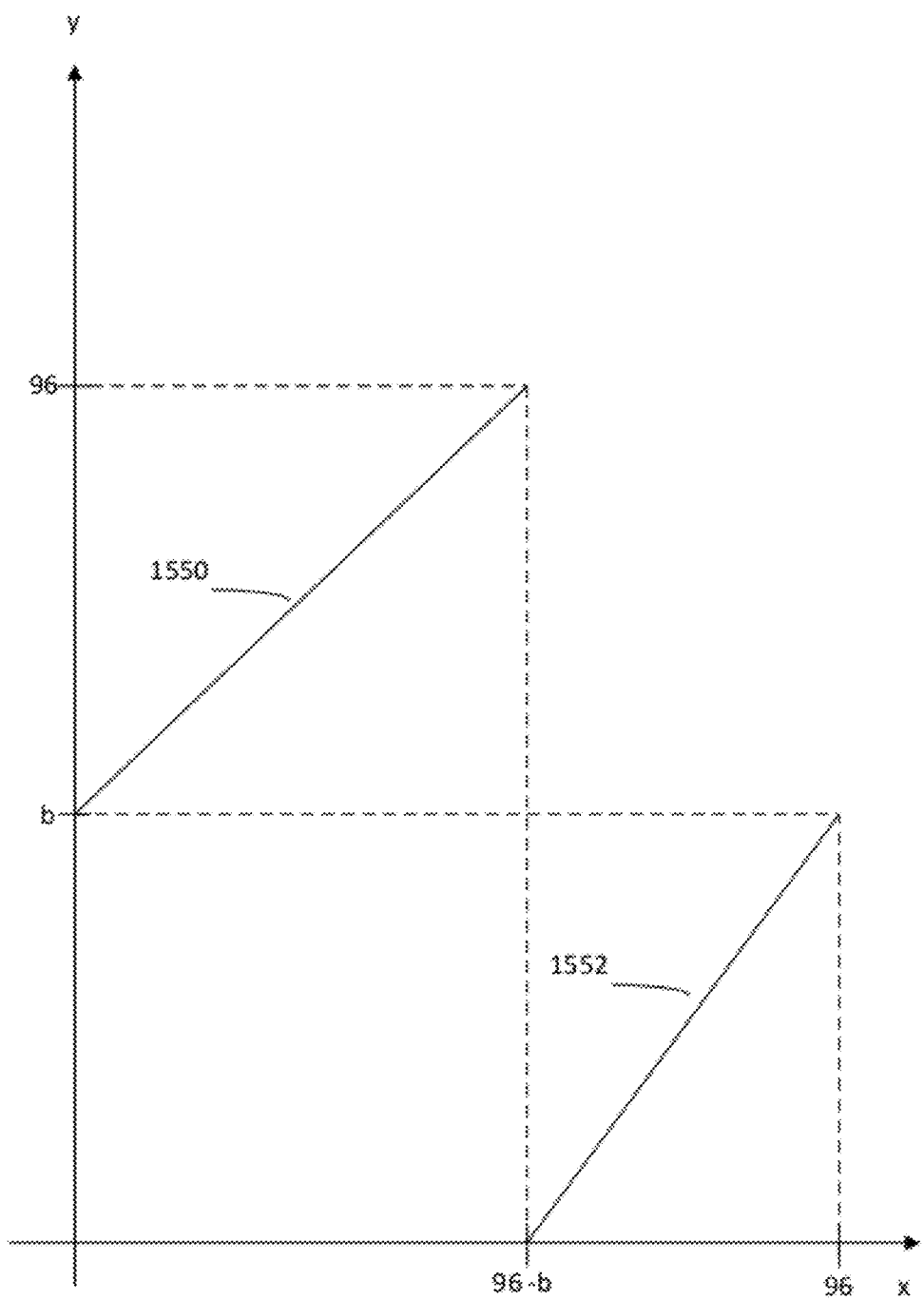
FIG. 21 illustrates an example graph of two line segments of slopes 1. The two linear functions describing the two line segments are used as the basis of the encryption algorithmic formula for the encryption in reference to FIGS. 19 and 20.

FIG. 21 displays the graph of this function, where box 1550 describes the line segment with the geometric equation y=x+b over the interval [0,96−b) and box 1552 describes the line segment with the geometric equation y=x+b−96 over the interval [96−b, 96). The function $f(x)$ is a one to one function, which has the interval [0, 96] as both its domain and range. It's inverse function exists and is defined in the following.

$$f^{-1}(y) = \begin{cases} y-b+96, 0 < y <= b \\ y-b, b <= y <= 96 \end{cases}$$

The inverse function is used to develop the decryption algorithm to be described next.

Figure 22:
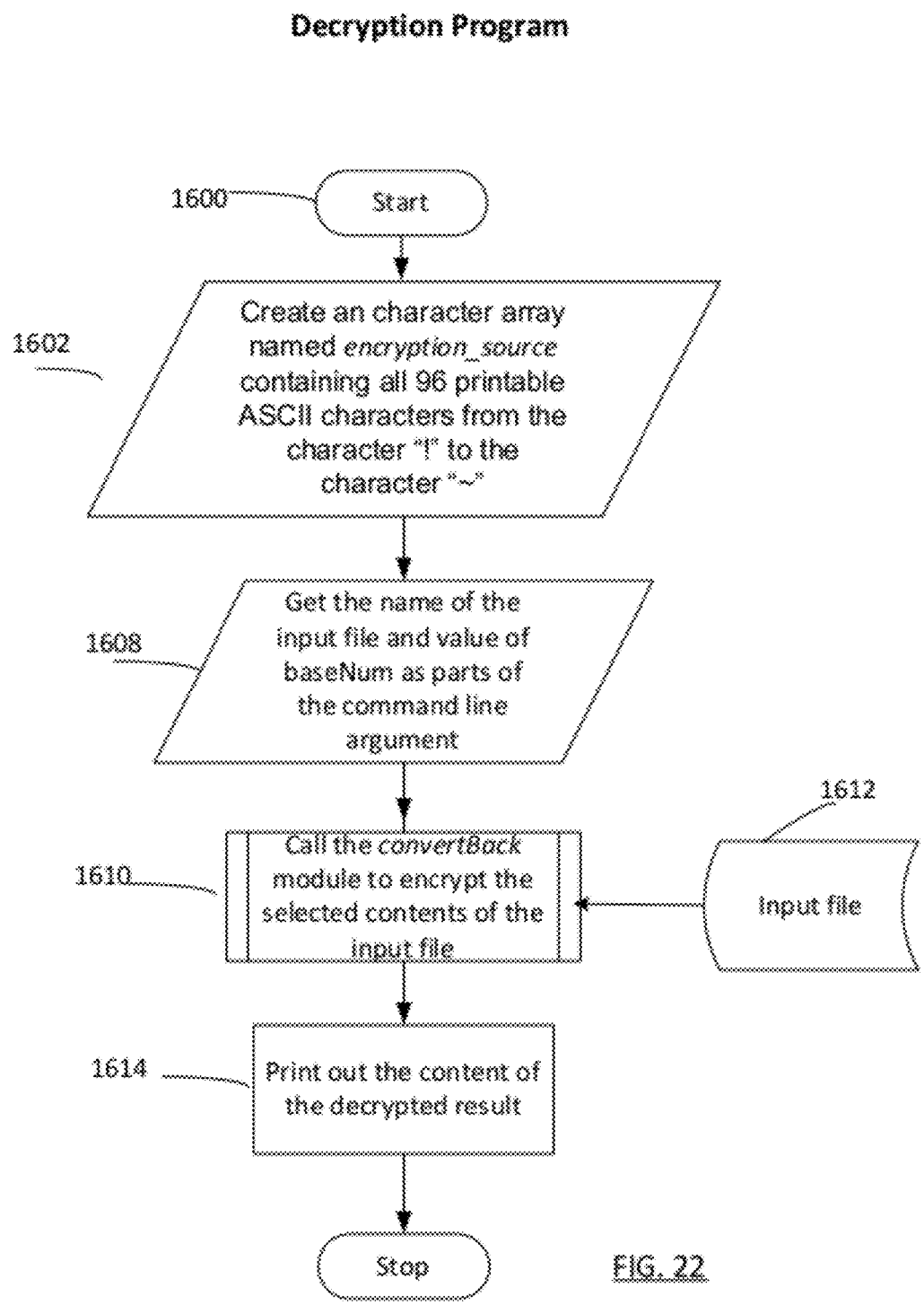
FIG. 22 is a flow chart that illustrates an example of the steps of a decryption method that decrypts the encrypted result, which is based on the encryption algorithm in reference to FIGS. 19 and 20, to its original unencrypted form. A computer program that implements this method prepares an array of printable characters as an encryption source and calls the convertBack module to perform the decryption task.
Figure 23A:
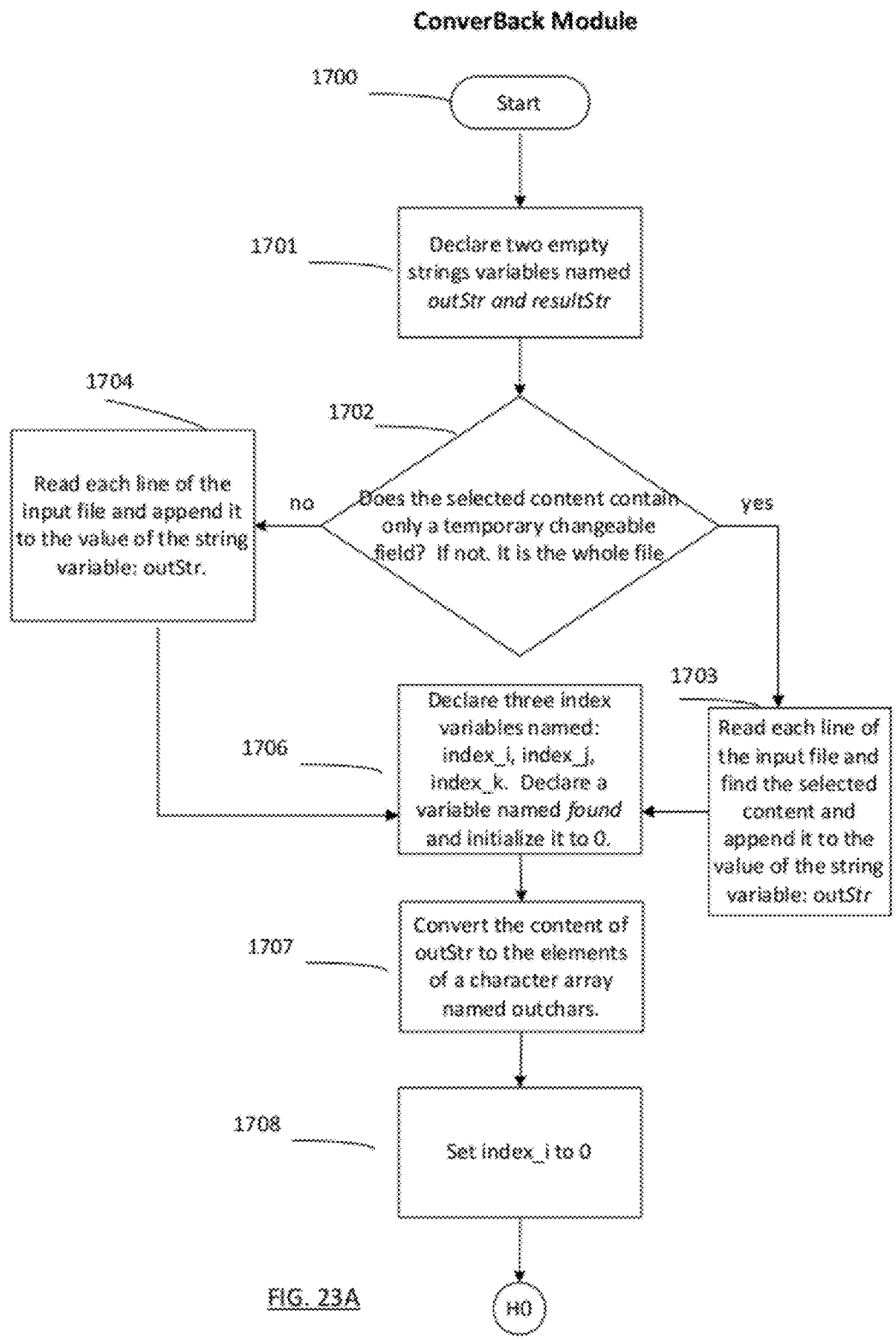
FIG. 23 is a flow chart that illustrates an example of the steps of an convertBack module.
Figure 23B:
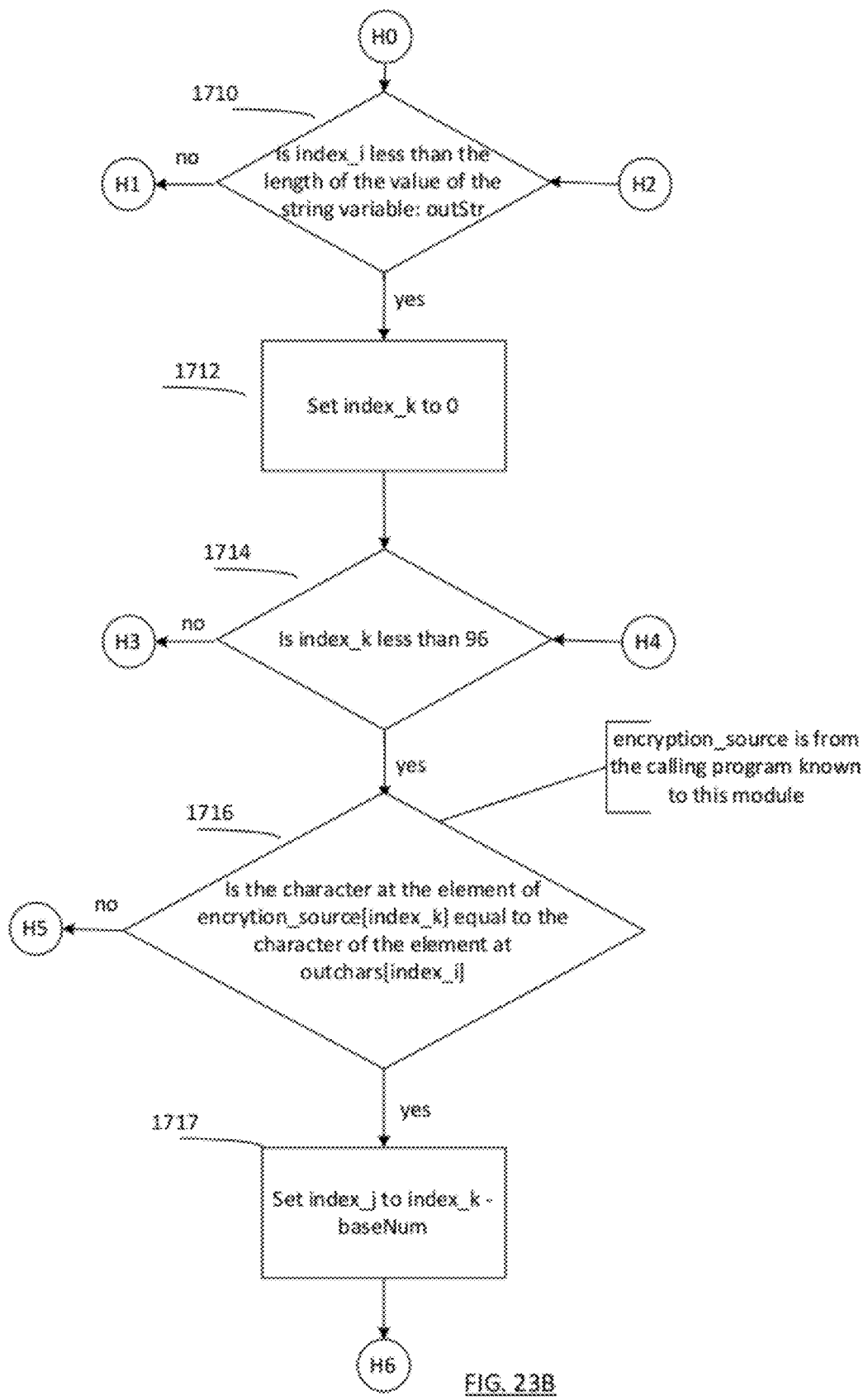
Figure 23C:
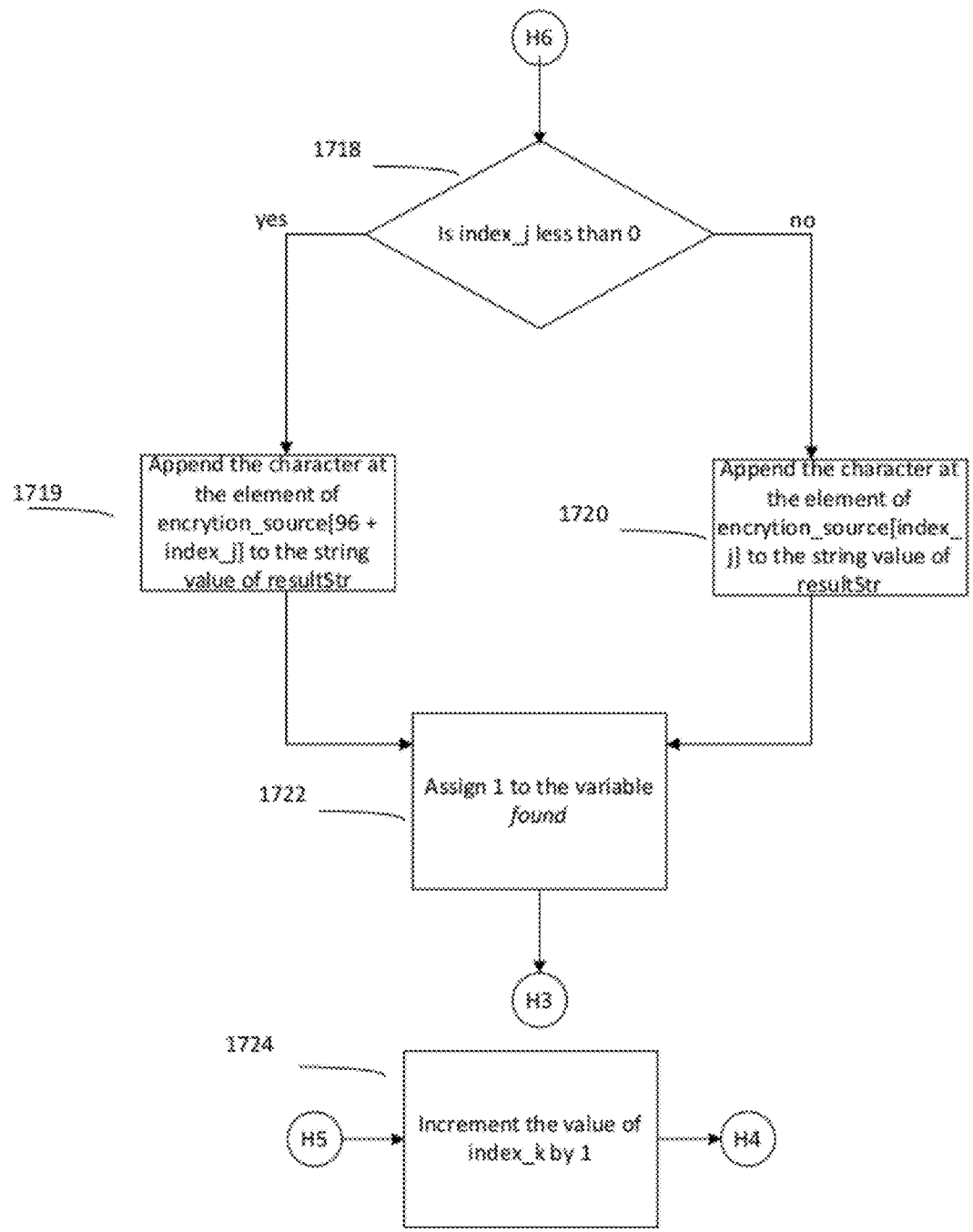

An algorithm to decrypt an encrypted placeholder or an encrypted file is depicted in FIGS. 22 and 23. In FIG. 22, block 1602 creates an character array named encryption_source containing all 96 printable ASCII characters as was described above. As was commented before the encryption key number of the encryption, referred as baseNum in the figure, is kept in a secured file and can be retrieved with an authorization by the owner of the file. Block 1608 gets the name of the encrypted input file and the value of baseNum as parts of the command line argument. Block 1610 calls the converBack module to decrypt the selected contents of the input file, identified by block 1612; a selected content may be an encrypted result of a temporary changeable field or an encrypted content of a whole file. Block 1614 prints out the result of the decryption.

FIG. 23 illustrates the converBack module. Block 1701 declares two empty string variables named outStr and resultStr. Block 1702 checks whether the selected content contains only an encrypted temporary changeable field. If yes, block 1703 reads each line of the input file and finds the selected content and appends the selected content to the value of the string variable: outStr. If no, the selected content is the whole file; block 1704 reads each line of the input file and append it to the value of the string variable: outStr. Block 1706 declares three index variables named: index_i, index_j, and index_k, respectively. It also declares a variable named found and initialize it to 0. Block 1707 converts the content of outStr to the elements of a character array named outchars. Block 1708 starts a loop with index_i as its index and initializes index_i to 0. Block 1710 checks whether index_i is less than the length of the value of the string variable: outStr. If no, it branches to block 1734. If yes, it continues to the block 1712. Block 1712 starts an inner loop with index_k as its index and initializes index_k to 0. Block 1714 checks whether index_k is less than 96. If no, it branches to block 1726. If yes, it continues to the block 1716. which checks whether the character at the element of encrytion_source[index_k] equal to the character of the element at outchars[index_i]. If no, it branches to block 1724. If yes, it continues to the block 1717, which set index_j=index_k−baseNum. Block 1718 whether index_j is less than 0. If yes, it branches to block 1719; if no, it branches to block 1720. Block 1719 appends the character at the element of encrytion_source[96+index_j] to the string value of resultStr. Block 1720 appends the character at the element of encrytion_source[index_j] to the string value of resultStr. Blocks 1716 to 1720 forms the central part of the decryption algorithm that is being discussed here. These blocks implement the algorithm specified by the inverse function $f^{-1}(y)$ defined above. Block 1722 assigns 1 to the variable found and branches to block 1726. Block 1724 increments the value of index_k by 1 and branches to block 1714. Block 1726 checks whether the value of the variable: found is 0. If no, it branches to block 1730. If yes, it continues with block 1728, which appends the character of the array element of outchars[index_i] to the string value of resultStr. Block 1730 resets the value of the variable: found to 0. Block 1732 increments of the value of index_i by 1 and branches to block 1710. Block 1734 returns the string value of resultStr to the calling decryption program depicted in FIG. 22.

A decryption computer program written in a programming language such as Java, C++, or Perl can be developed to implement the decryption algorithm described above in reference to FIGS. 22 and 23. For example such a decryption program can decrypt the above encrypted file back to the original form of the first XML file displayed above.

As discussed the blocks 1516 to 1520 of FIG. 20 form the central part of the encryption algorithm discussed above in reference to FIGS. 19 and 20. As also discussed this central part can be described mathematically by the following function of a variable x over the interval [0, 96), where b is an encryption key number with an integer value greater than 0 and less than 96.

$$f(x) = \begin{cases} x+b, 0 <= x < 96-b \\ x+b-96, 96-b <= x < 96 \end{cases}$$

Figure 24A:
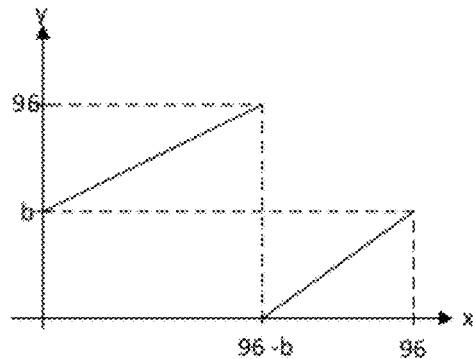
FIG. 24A is identical to FIG. 21 for a comparison purpose. The two linear functions describing the two line segments for each of the remaining four graphs are used as the basis of the encryption algorithmic formula for a new encryption.
Figure 24B:
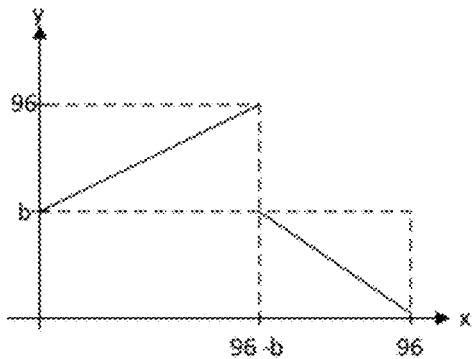
FIG. 24 illustrates five example graphs; each graph consists of two line segments of slopes with absolute value 1. Graph

As stated, FIG. 21 displays the graph of this function. FIG. 24A repeats the display of the same graph. For an ease of discussion, a function of this type that is used in an encryption algorithm is referred from now on an encryption algorithmic formula. The graph of a general linear function is a line. The formula of a general linear function, which describes a line, in slope-intercept form is the following.

$$f(x)=mx+c$$

where m is the slope of the line and c is the y-intercept. Or equivalently it can be stated that the geometric equation of a line is y=mx+c. The characteristics of the above encryption algorithmic formula include the following. The graph contains two line segments and for each of the two line segments, the absolute value of its slope is 1 and the value of c is an integer greater than 0 and less than 96; the closure of the union of the domains of the two linear functions describing the two line segments is the interval [0, 96] and each of the two linear functions maps an integer value to itself at most one time; the range of these two linear functions do not intersect and the closure of the union of the ranges is [0, 96]. In mathematics, the closure of an interval I is the smallest closed interval that contains I. There are four other possible encryption algorithmic formulas whose graphs are described in FIGS. 24B, 24C, 24D, and 24E, respectively. These four formulas are described as follows.

FIG. 24B:

$$f(x) = \begin{cases} x+b, 0 <= x < 96-b \\ 96-x, 96-b <= x < 96 \end{cases}$$

Figure 24C:
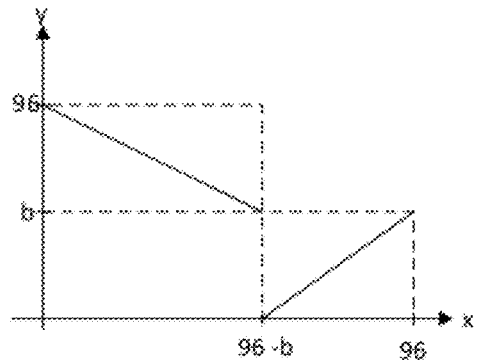
Figure 24D:
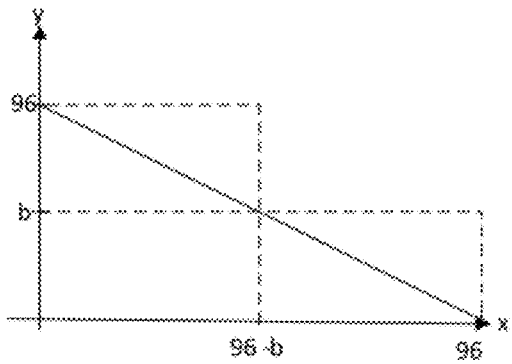

FIG. 24C $$f(x) = \begin{cases} 96-x, 0 <= x < 96-b \\ x+b-96, 96-b <= x < 96 \end{cases}$$

FIG. 24D:

f(x)=96−x, 0<=x<96

Figure 24E:
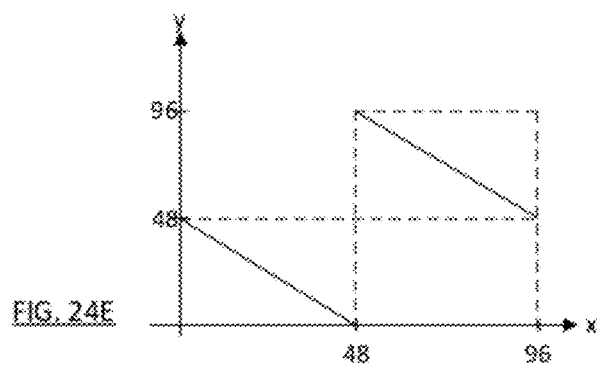

FIG. 24E (the encryption key number: b is 48):

$$f(x) = \begin{cases} 48-x, 0 <= x < 48 \\ 141-x, 48 <= x < 96 \end{cases}$$

For example, if the function illustrated in FIG. 24C is used as the encryption algorithmic formula over the first XML file and the same encryption key number 29 is used as the value of b, then the content of the resulting encrypted file, referred hereafter as the second encrypted file, is the following.

fc5*)<3"/0&,+<e<
qtr
cd=fc5*)h016)"0%""1<16-"<e<
1"51s50)
<%/"#<e<
"5-"+0"t50)
cd==fuu<]5-"+0"<N"*-)A1"<<<<<<<<<uud==f"5-"+
    0"d=<<<f"*-TA*"<3A)2"e
O*&1% v<XA?(
<sd=<<<f"5-^A1"<3A)2"e
osqpsprqp
<sd=<<<f"*-Y^<3A)2"e
qmouipujomk
<sd=<<<f&1"*<A*,2+1<e<
qmtml
d=<<<<<<<f+A*"dU"A)fs+A*"d=<<<<<<<<=<<<<<<f!"0"/
    &-1&,+d=<<<<<<<<<U"A)<"5-
"+0"=<<<<<<<fs!"0?/&-1&,+
    d=<<<fs&1"*d==<<<f&1"*<A*,2+1<e<
itki
d=<<<<<<<f+A*"d[A0fs+A*"d==<<<<<<f!"0?/&-1&,+
    d=<<<<<<<<<[A0,)&+"<"5-
"+0"<=<<<<<<fs!"0?/&-1&,+
    d=<<<fs&1"*d==<<<f&1"*<A*,2+1<e<
otpj
d=<<<<<<<f+A*"dS1%"/<]5-"+0"<#,/<O*&1% v<XA?(fs+
    A*"d==<<<<<<f!"0?/&-
1&,+d=<<<<<<<<<S1%"/<"5-"+
    0"<<<<<<<<<<<=<<<<<<fs!"0?/&-
1&,+d=<<<fs&1"*d==fs"5-"+0"d This second encrypted file is different from the first encrypted file, where FIG. 24A is used as the encryption algorithmic formula and the encryption key number is the same value: 29.

Figure 25:
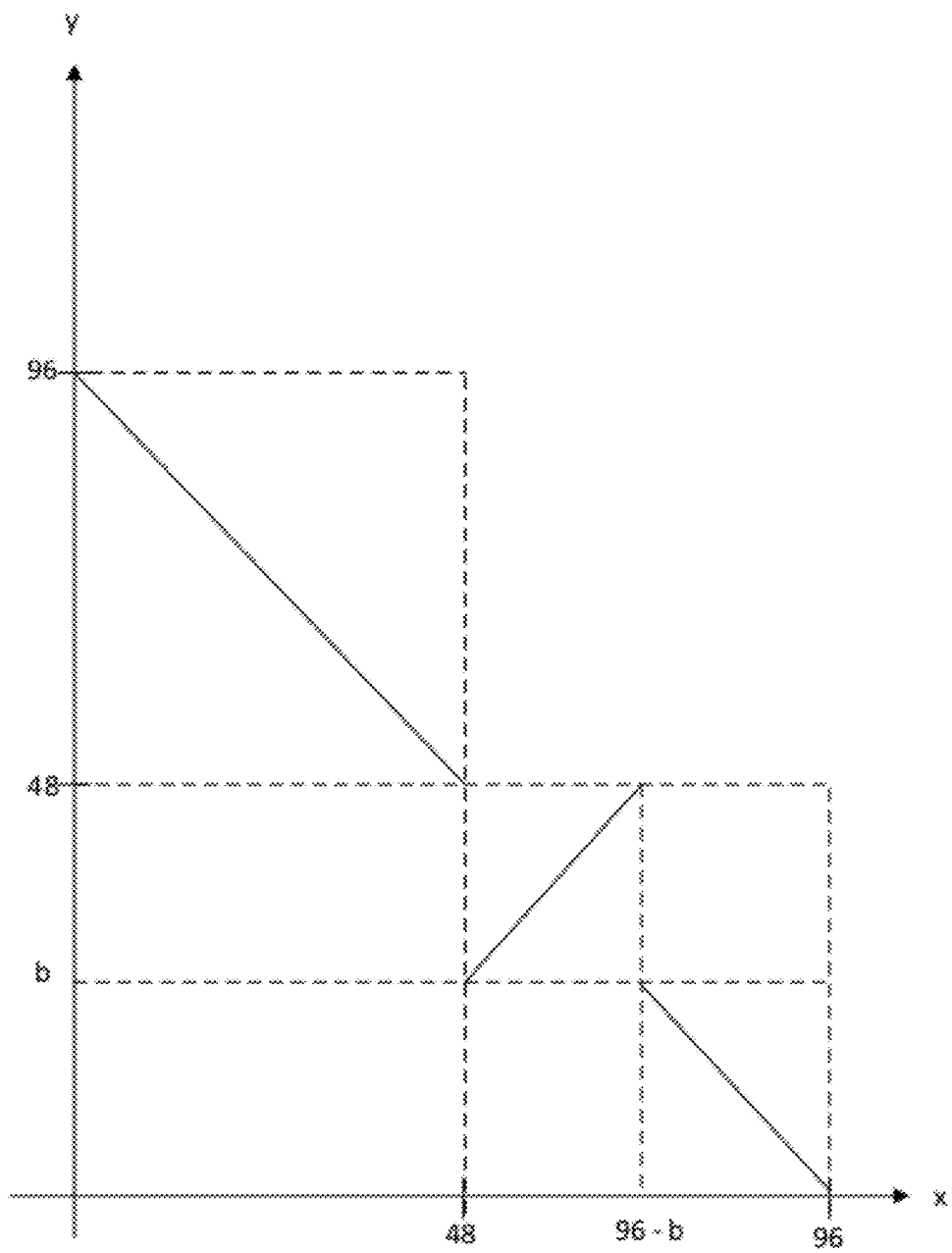
FIG. 25 illustrates an example graph of three line segments of slopes with absolute value 1. The three linear functions describing the three line segments are used as the basis of the encryption algorithmic formula for a new encryption.

The graph of each of the five formulas in FIG. 24 consists of two line segments. The same method can be extended to three line segments. For example, the graph in FIG. 25 consists of three line segments defined by the following.

$$f(x) = \begin{cases} 96 - x, & 0 <= x < 48 \\ x - 48 + b, & 48 <= x < 96 - b \\ 96 - x, & 96 - b <= x < 96 \end{cases}$$

where b is an encryption key number greater than 0 and less than 48. If this is used as the encryption algorithmic formula over the XML file displayed above and the same encryption key number 29 is used as the value of b, then the encrypted file, referred hereafter as the third encrypted file, is the following.

fc*56#,=0/934#e#
qtr
cd"fc*56h/.)6=/:==.#.)2=#e#
.=*.s*/6
:0=<#e#
=*2=4/=t*/6
cd""fuu#]*2=4/=#A=526N.=#########uud""f=*2=4/
    =d""###f=52TN5=#,N6-=e
@59.:v#XNP7
sd"###f=*2^N.=#,N6-=e
osqpsprqp
sd"###f=52Y^#,N6-=e
qmouipujomk
sd"###f9.=5#N53-4.#e#
qmtml
d"######f4N5=dU=N6fs4N5=d"######"######f>=/
    P092.934d"########U=N6#=*2=4/=
"######fs>=/P092.934d"###fs9.=5d""###f9.=5#N53-
    4.#e#
itki
d"######f4N5=d[N/fs4N5=d""######f>=/
    P092.934d"########[N/3694=#=*2=4/=#"#####
fs>=/P092.934d"###fs9.=5d" "###f9.=5#N53-4.#e#
otpj
d"######f4N5=dS.:=0#]*2=4/=#<30#@59.:
    v#XNP7fs4N5=d""######f>=/P092.934d"####
S.:=0#=*2=4/=#########"######fs>=/
    P092.934d"###fs9.=5d""fs=*2=4/=d This third encrypted file displayed above is different from the first encrypted file displayed above, where FIG. 24A is used as the encryption algorithmic formula and the encryption key number is the same value: 29. It is also different from the second encrypted file, where FIG. 24C is used as the encryption algorithmic formula and the encryption key number is the same value: 29

As discussed, the general formula for a linear function describing a line is f(x)=mx+c, where m is the slope of the line and c is the y-intercept of the line. From the above discussions, a general encryption algorithm using one or more line segments can be described in the following set of rules, referred hereafter as Encryption Algorithm Rules Set 1 (EARS-1).

The domain of the function describing the encryption algorithmic formula is an one-dimensional interval with 0 and its low endpoint and a positive integer as its high endpoint; the graph of the function contains one or more line segments and for each of these line segments, the absolute value of its slope is 1 and the value of the y-intercept is an integer; the domains of the linear functions describing these line segments are mutually disjoint and the closure of the union of the domains of these linear functions equals to the closure of the union of the ranges of these linear functions, and each of these linear functions maps an integer value to itself at most one time; the ranges of these linear functions are mutually disjoint; computer programs that implement encryptions by using algorithms developed from these rules can repeatedly use them to further encrypt encrypted results unlimited number of times.

As was stated a linear function can be described by the formula f(x)=mx+c. A linear function that describes a line segment used for encryption discussed above has a characteristic that it maps two consecutive integers in its domain to two consecutive integers in its range. This is derived from the rule in EARS-1 about the line segment: the absolute value of the slope m is 1 and the value of c is an integer. For example, consider the linear function $f(x)=x+29$, which has slope 1 and c value 29. This function maps the consecutive integers 1 and 2 to the two consecutive integers 30 and 31, respectively. As discussed in reference to FIG. 19 and FIG. 20, the content of a file to be encrypted is mapped to an array, referred as source array hereafter and encryption result is stored in a new array, referred as encrypted array hereafter. As was described in blocks 1518 and 1519 of FIG. 20, two linear functions such as f(x)=x+baseNum and f(x)=x+baseNum−96, where baseNum is an encryption key number, are used to map the indices of elements of the source array to the indices elements of the encrypted array over two disjoint sets of consecutive integer values of indices of the source array, respectively.

A linear function $f(x)=mx+c$, where the absolute value of m is not 1, does not map two consecutive integers to two consecutive integers. For example, the function $f(x)=3x+1$ maps 1 and 2 to 4 and 7, respectively. The integers 5 and 6 are not mapped to from any integer value of x. So there are gaps in the result of such a mapping. Any nonlinear function also does not map two consecutive integers to two consecutive integers. For example, the function $f(x)=x^2$ maps 2 and 3 to 4 and 9, respectively. The integers 5, 6, 7, and 8 are not mapped to from any integer value of x. There are gaps in the result of such a mapping. Out of this observation, the second set of rules, referred hereafter as Encryption Algorithm Rules Set 2 (EARS-2), is described in the following.

The domain of the function describing the encryption algorithmic formula is an one-dimensional interval with 0 as its low endpoint and a positive integer as its high endpoint; the range of the function is an one-dimensional interval with 0 as its low endpoint and a positive integer as its high endpoint; the closure of the domain of the function equals to the closure of the range of the function; the graph of the function contains a part consisting of only one or more points, with x coordinates and y coordinates in integer values, either on line segments whose slopes have integer values with absolute value not equal to 1 and whose y-intercepts have integer values or on curves describable by nonlinear functions with coefficients of integer values; the remaining parts of the graph that are left to be filled by line segments over the domain are filled by line segments whose slopes have absolute value 1 and whose y-intercepts have integer values and each of the linear functions describing these line segments maps an integer value to itself at most one time; the domains of the functions describing all the above parts are mutually disjoint; the ranges of the functions describing all the above parts are mutually disjoint; computer programs that implement encryptions by using algorithms developed from these rules can repeatedly use them to further encrypt encrypted results unlimited number of times.

Figure 26:
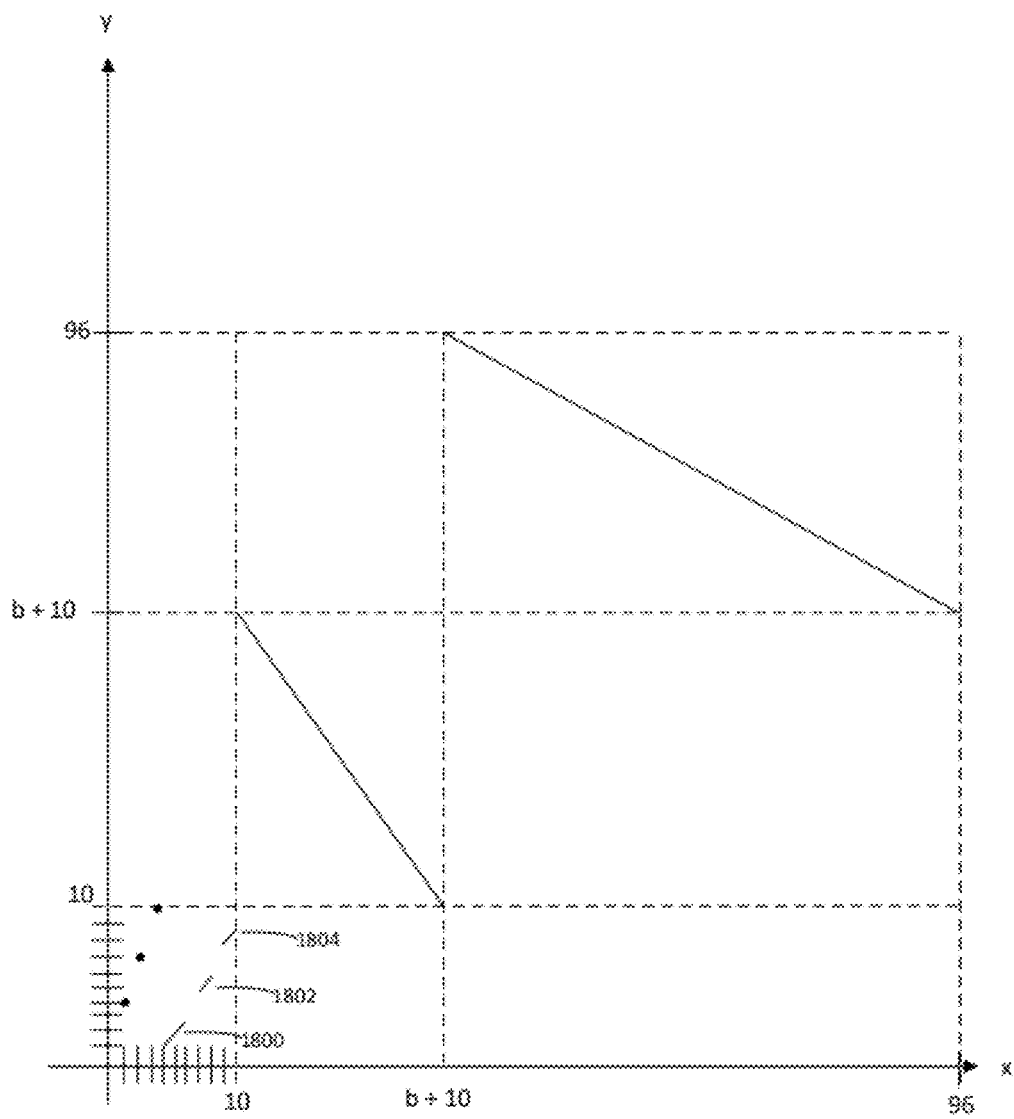
FIG. 26 illustrates an example graph of three points and five line segments. These three points are on a sixth line segment with slope not equal to 1. The coordinates of these three points and the five linear functions describing the first five line segments are used as the basis of the encryption algorithmic formula for a new encryption.

FIG. 26 describes an encryption algorithm satisfying the rule set of EARS-2, where points on a line having a slope with absolute value not equal 1 are included in the graph. The function of this algorithm is defined below.

$$f(x) = \begin{cases} 3x+1, x = 1, 2, 3 \\ x-3, 4 <= x <= 6 \\ x-2, 7 <= x <= 8 \\ x-1, 9 <= x <= 10 \\ b+20-x, 10 < x < b+10 \\ b+106-x, b+10 <= x < 96 \end{cases}$$

Three points on the line with the equation y=3x+1 are included in the graph. The coordinates of these three points are (1, 4), (2, 7), and (3, 10) as shown in FIG. 26. Block 1800 of FIG. 26 displays the line segment with the equation y=x−3 over the interval [4, 6]. Block 1802 displays the line segment with the equation y=x−2 over the interval [7, 8]. Block 1804 displays the line segment with the equation y=x−1 over the interval [9, 10]. The following displays the content of the file, referred hereafter as the fourth encrypted file, encrypted from the first XML file by using this algorithm with 29 as the encryption key number b.

74Q\]JSdWVZ[J6J % BEC %45I74Q\]9VUP] dVaddUJUPYdJ6J % UdQUDQV]% JaWdcJ6J % dQYd[VdEQV]%45II7FFJ.QYd[VdJud\Y]
 hUdJJJJJMFF5II7dQYd[Vd5IIJJJ7d\Y{h\dJSh]T d6% v\UaGJhf˜% JD5IJJJ7dQY/hUdJSh] Td6%@DBADACBA % JD5IJJJ7d\Y
/JSh]Td6% B>@F:AF;@><% JD5IJJJ7Ud\Jh\ZT[UJ6J % B>E>=%5IJJJJJJ7[h\d5|dh]7D[h\d5
 IJJJJJIJJJJJJ7edVfWYUZ[5IJJJJJJJ|dh]JdQYd [VdIJJJJJJ7DedVfWYUZ[5IJJJ7DUd\
5IIJJJ7Ud\Jh\ZT[UJ6J %:E<:%5IJJJJJJ7[h\d5,hV7D [h\d5IIJJJJJJ7edVfWYUZ[5IJJJJJJJJ,
hVZ][dJdQYd[VdJIJJJJJ7DedVfWYUZ [5IJJJ7DUd\5IIJJJ7Ud\Jh\ZT[UJ6J %@EA;%5I JJJJJJ7[h\d5zUadWJ.QYd[VdJcZWJv\UaGJ
hf˜7D[h\d5IIJJJJJJ7edVfWYUZ[5IJJJJJJJJzUadWJdQYd [VdJJJJJJJJJUJJJJJ7DedVfWY
UZ[5IJJJ7DUd\5II7DdQYd[Vd5

Figure 27:
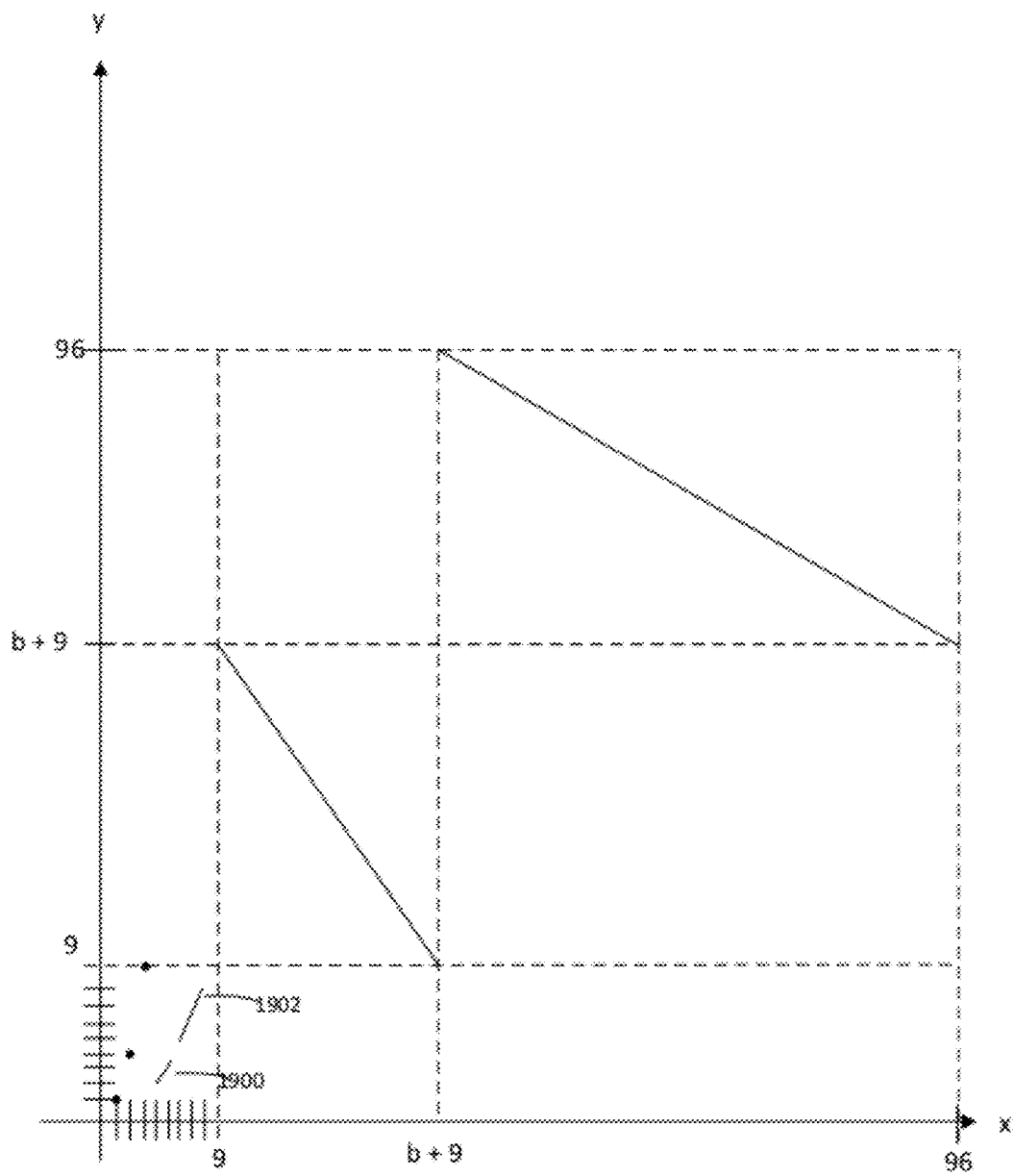
FIG. 27 illustrates an example graph of three points and four line segments. These three points are on a curve. The coordinates of these three points and the four linear functions describing the four line segments are used as the basis of the encryption algorithmic formula for a new encryption.

FIG. 27 describes an encryption algorithm satisfying the rule set of EARS-2, where points on a curve are included in the graph. The function of this algorithm is defined below.

$$f(x) = \begin{cases} x^2, x = 1, 2, 3 \\ x-2, 4 <= x <= 5 \\ x-1, 6 <= x <= 9 \\ b+18-x, 9 < x < b+9 \\ b+105-x, b+9 <= x < 96 \end{cases}$$

Three points on the curve with the equation $y=x^2$ are included in the graph. The coordinates of these three points are (1, 1), (2, 4), and (3, 9) as shown in FIG. 27. Block 1900 of FIG. 27 display the line segment with the equation: y=x−2 over the interval [4, 5]. Block 1902 display the line segment with the equation: y=x−1 over the interval [6, 9]. The following displays the content of the file, referred hereafter as the fifth encrypted file, encrypted from the first encrypted file, by using this algorithm with 29 as the encryption key number b.

252P[\IRcVU_YZI4I"@CA"23H52P [\7UTO\cUccTITOXcI4I"TcPTBPU\"IVcbI4I"cPXcZ
UcCPU\"23HH5DDI,PXcZUcItc [X\gTcIIIIIIIIDD3HH5cPXcZUc3HHIII5c[Xzg [cIRg\Sc4"u[
_TEI~ge]"IB3HIII5cPX- gTcIRg\Sc4">B@?B?A@?"IB3HIII5c[X
IRg\Sc4"@< >D8?D9><:"IB3HIII5_Tc[Ig[YSZTI4I"@< C<;"3HIIIII5Zg[c3{cg\5BZg[c3HIIIIIIHIIIII5dc
UeV_XT_YZ3HIIIIIIII{cg\IcPXcZUcHIIIII5Bdc UeV_XT_YZ3HIII5B_Tc[3H HIII5_Tc[Ig[YSZTI
4I"8C:8"3HIIIII5Zg[c3gU5BZg [c3HHIIIII5dcUeV_XT_YZ3HIIIIIIIgU
Y\_ZcIcPXcZUcIHIIIII5BdcUeV_XT_YZ3HIII5B_Tc [3HHIII5_Tc[Ig[YSZTI4I">C?9"3HII
IIII5Zg[c3yTcVI,PXcZUcIbYVIu[_TEI~ge]5BZg [c3HHIIIII5dcUeV_XT_YZ3HIIIIIIyT
cVIcPXcZUcIIIIIIIIIHIIIIII5BdcUeV_XT_YZ3HIII5B_Tc [3HH5BcPXcZUc3

As was stated earlier, computer programs that implement encryptions by using algorithms developed from the rule sets EARS-1 or EARS-2 can repeatedly use them to further encrypt encrypted results unlimited number of times to create higher security level in protecting the original source file. For example the last encrypted file, which is the result of encryption based on an encryption algorithm that follows the rule set EARS-2, can be further encrypted by using the algorithm described in FIG. 24C, which is the result of encryption based on an encryption algorithm that follows the rule set EARS-1, with 35 as the encryption key number. The following displays the content of the resulting encrypted file, referred hereafter as the sixth encrypted file.

```
pmpRGFYP&LM"IHYnY
b_a
poZmpRGFkMNSF&M#&&NYNSJ&YnY
N&RNRMF
Y#L&%YnY
&RJ&HM&_RMF
poZZm^^YvRJ&HM&Y7&GJF*N&YYYYYYYY^^o
    ZZm&RJ&HM&oZZYYYm&GJ=*G
&YP*FO&n
8G"N#]YA*(E
YoZYYYm&RJu*N&YP*FO&n
dbccabc
Y'oZYYYm&GJBuYP*FO&n
bfd^jc^idfh
Y'oZYYYm"N&GY*GIOHNYnY
bf_fg
oZYYYYYmH*G&o>&*FmH*G&oZYYYYYY
    ZYYYYYm'&M(L"JN"IHoZYYYY
YYYY>&*FY&RJ&HM&ZYYYYYm'&M(L"
    JN"IHoZYYYm"N&GoZZYYYm"N&G
Y*GIOHNYnY
j_hj
oZYYYYYmH*G&o*MmH*G&oZZYYYYYm'&M
    (L"JN"IHoZYYYYYYYY*MIF"H
&Y&RJ&HM&YZYYYYYm'&M
    (L"JN"IHoZYYYm"N&GoZZYYYm"N&GY*GIOH
NYnY
d_ci
oZYYYYYmH*G&o<N#&LYvRJ&HM&Y      %
    ILY8G"N#]YA*(EmH*G&oZZYYYYYY
m'&M(L"JN"IHoZYYYYYYYY<N#&LY&RJ&
    HM&YYYYYYYYYZYYYYYm'&M(L
"JN"IHoZYYYm"N&GoZZm&RJ&HM&o
```

The first to sixth encrypted files displayed above are encrypted from the first XML file based on six different encryption algorithms and are all different from each other. Based on the rule sets EARS-1 and EARS-2 and the discussions in reference to FIGS. 19, 20, 21, 24, 25, 26, and 27 there are at a minimum thousands of encryption algorithms that can be developed.

There are many ways to transfer and retrieve template files or target files to cloud virtual storages. They include but not limited to network programming methods such as C or C++ programming socket libraries, remote procedure calls, Web services, and automated file transfer through TCL/Expect scripts. The following is an example of TCL/Expect script that transfers a file to a cloud virtual storage site. The only difference between it and the content of an actual script is that the password field is hidden with a string of the asterisk character: *.

```
#!/bin/sh
#\
exec tclsh "$0" ${1+"$@"}
package require Expect
    spawn ftp www.peterhychang.com
    #1. Wait for a login prompt.
    expect -re "User" {
        #2. Login prompt received. Send user name to the cloud
            server.
        exp_send "peter75\n\r"
        exp_send_user "sent username\n"
    } eof {
        #3. No login prompt received. Display an error.
        exp_send_user "could not connect\n"
    }
    #4. Wait for a password prompt from the cloud server.
    expect "Password:" {
        #5. Password prompt received. Send the password.
        exp_send "********\r\n"
    }
    expect -re "ftp>" {
        #6. Change to the httpdocs directory.
        exp_send "cd httpdocs\r\n"
    }
    expect -re "ftp>" {
        #7. Set up binary mode.
        exp_send "bin\r\n"
    }
    expect -re "ftp>" {
        #8. Put file.
        puts "sending [lindex $argv 0]"
        exp_send "put [lindex $argv 0]\r\n"
    ]
    expect -re "ftp>" {
        #9. Close the FTP connection to the cloud server.
        exp_send "quit\r\n"
    }
```

The output of running the above script file is the following.
Connected to www.peterhychang.com.
220 Microsoft FTP Service
User (www.peterhychang.com:(none)): sent username
331 Password required for peter75.
Password:
230 User peter75 logged in.
ftp>250 CWD command successful.
ftp>200 Type set to I.
ftp>sending expense.xml
200 PORT command successful.
150 Opening BINARY mode data connection for expense.xml.
226 Transfer complete.
ftp: 731 bytes sent in 0.28 Seconds 2.60 Kbytes/sec. ftp>

The content of a TCL/Except script that retrieves a file from a cloud virtual storage is similar to the content of the last script except that the step 8 is replaced by the following.

```
    expect -re "ftp>" {
        #8. Get file.
        puts "get [lindex $argv 0]"
        exp_send "get [lindex $argv 0]\r\n"
    }
```

Figure 28:
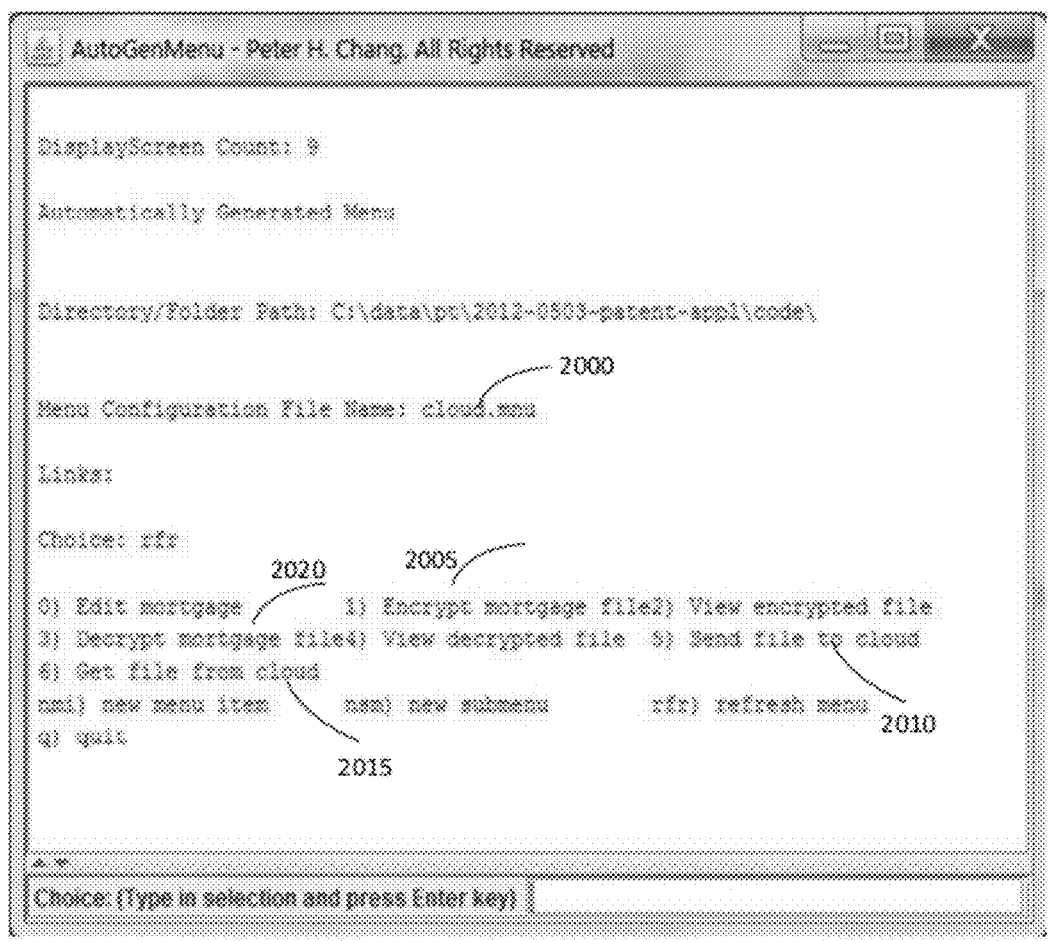
FIG. 28 illustrates an example menu diagram; the menu items invokes commands to edit a file, encrypt a file, view an encrypted file, decrypt a file, view a decrypted file, send a file to the cloud, or retrieve a file from the cloud, respectively.

A user interface for a user to activate the transfers of files to or from a cloud virtual storage is based on an automatically generated menu as illustrated in the FIG. 28. The box 2000 shows, as an example, the name of the menu configuration file as cloud.mnu, which has the following content:

Edit mortgage;start notepad mortgage.html;mortgage
Encrypt mortgage file;perl encrypt.pl mortgage.html> mortgage-enc.html;encrypt
View encrypted file;notepad mortgage-enc.html;view_enc_ file
Decrypt mortgage file;perl decrypt.pl mortgage-enc.html>mortgage-dec.html;decrypt
View decrypted file;notepad mortgage-dec.html;view_dec_file
Send file to cloud;tclsh put.tcl mortgage-enc.html; send_file
Get file from cloud;tclsh get.tcl mortgage-enc.html; get_file There are three fields in each line of the above configuration file separated by the semicolon character ';'. The first field is the label field for a menu item. The second field is the command field. The content of the second argument: put.tcl of the command field of the sixth line is the content of the TCL/Expect script discussed above. Box 2005 of FIG. 28 shows the second menu item labeled as: "1) Encrypt mortgage file". If a user enters 1 in the Choice field on the bottom of the user interface, then an encryption program that uses an encryption algorithm, for example an encryption algorithm based on either the rule set EARS-1 or the rule set EARS-2, is executed. Box 2010 shows the sixth menu item labeled as "5) Second file to cloud". If a user enters 5 in the Choice field, then the sixth menu item is executed, which sends the encrypted copy of the mortgage file from a computing device, referred hereafter as the first computing device, to the cloud. Box 2015 shows the seventh menu item labeled as "6) Get file from cloud". If a user enters 6 in the Choice field, then the seventh menu item is executed which retrieves the encrypted mortgage file to a computing device, referred hereafter as the second computing device, from the cloud. The second computing device may be the first computing device; if not, they may be on the same location or on different locations in the world. Box 2020 shows the fourth menu item labeled as "3) Decrypt mortgage file". After retrieving the encrypted mortgage file from the cloud, if a user enters 3 in the choice field, then the fourth menu item is executed to decrypt the encrypted mortgage file. This example shows an automated sequence of commands that secures the confidentiality of the transfer of a sensitive file by encrypting the file, transferring the encrypted copy from a selected location over the Internet or Intranet to the cloud, retrieving the encrypted copy from the cloud to a selected location, and decrypting the file at the selected location.

Figure 29:
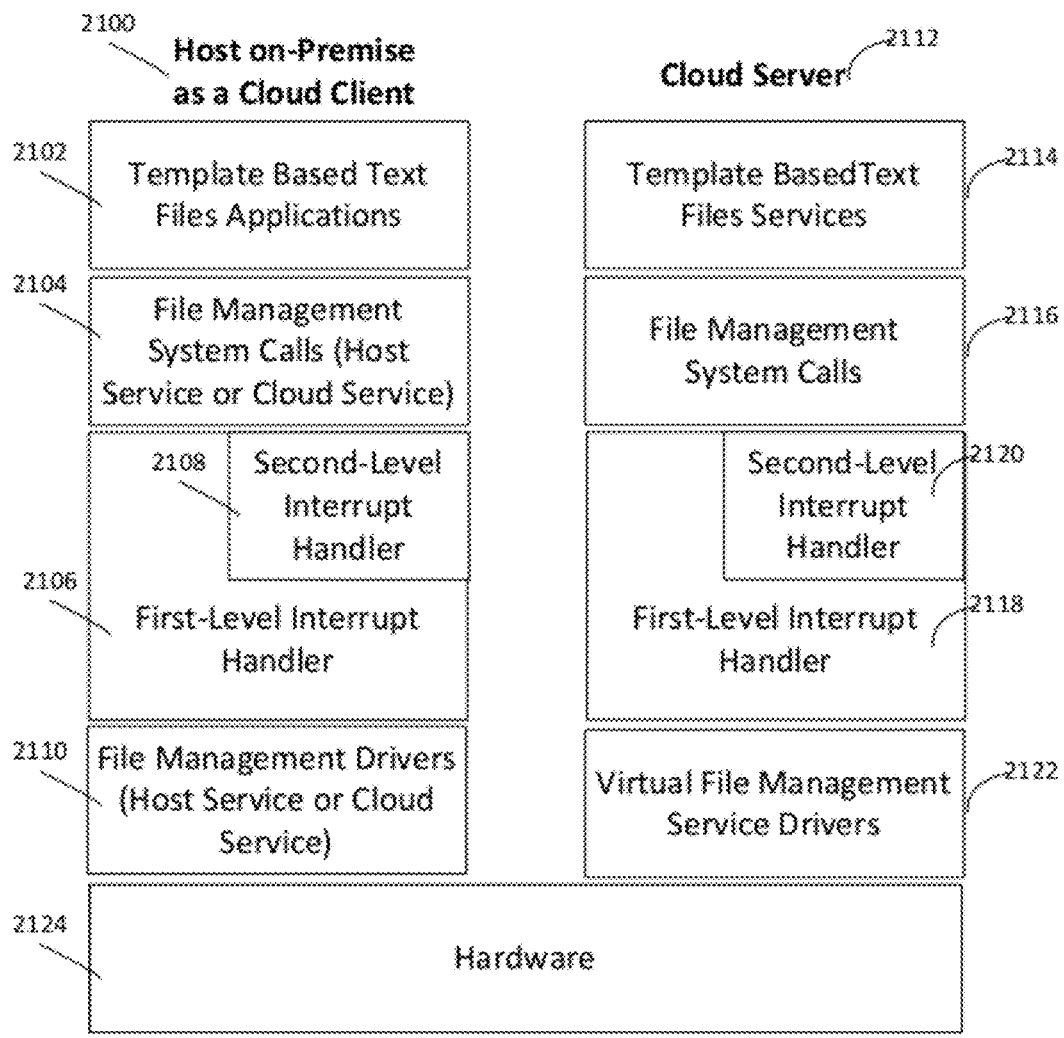
FIG. 29 illustrates example cloud file management services for generating text files from template files.

Text files are generated as target files from template files in this embodiment. Herein text files of such type are referred as template based text files. FIG. 29 illustrates example cloud file management services for template based text files. As discussed, template files can contain changeable fields and unchangeable fields; changeable fields are identified with persistent placeholders of types 1 or 2, temporary placeholders, access control list, and audit trail information. Both the host on-premise, as a cloud client, and the cloud server can have operating systems such as Linux, UNIX, MAC OS X, or Microsoft Windows installed and configured. Box 2100 heads a column of boxes describing layers of file management components supporting template based text files on a host computer on the premise as a cloud client. Box 2102 describes the execution of a template based text file application, which includes file management operations such as opening, editing, encrypting, or decrypting files stored either locally on the host or remotely on the cloud server. Box 2104 describes the invocation of system calls in supporting the above file management operations; each of these system calls such as open, read, and write, contains a parameter, referred hereafter as the template based text file cloud parameter (TTFCP), indicating whether the call is for a file stored locally on the host on-premise or the call is for a file stored remotely on a cloud server. Box 2106 describes the first-level interrupt handler, which performs a context switch of system code for an interrupt that is platform specific and is in need of fast handling. Box 2108 describes second-level interrupt handler that handles secondary interrupts. Box 2110 describes file management device drivers. If the TTFCP argument value indicates that the file is stored locally on the host on-premise, then the storage device drivers are invoked to handle the local retrieval or storage of the file. If the TTFCP argument value indicates that the file is stored remotely on the cloud server, then the network interface device drivers are invoked to transfer the service requests to the cloud server. Box 2112 heads a column of boxes describing layers of file management service components on a cloud server supporting service requests for client's template based text files. Box 2114 describes the execution of a template based text file service, which includes file management services such as opening, editing, or encrypting files stored on the cloud server. Box 2116 describes the invocation of system calls in supporting the above file management services. Box 2118 describes the first-level interrupt handler on the cloud server and box 2120 describes the second-level interrupt handler on the cloud server. Box 2122 describes device drivers for virtual file management services, which include the file management device drivers and the network interface device drivers. Both drivers need to be invoked to respond to client's service requests, which include but not limited to receiving the transmission of a client file and storing it on a server storage device, or retrieving a client file from a server storage device and transmitting it to the client. Box 2122 describes the hardware, which include the host computer on-premise, networks, the cloud server, and their peripherals.

A text file generated as a target file from a template file can be appended with another template file. For example, a patient visits a clinic several times. For each of the visits, an electronic medical record (EMR) or a computer record of a similar kind needs to be created. Typically a healthcare professional such as a physician wants to see accumulated EMR's for the same patient arranged in a chronological order. The following shows an example template file for an EMR, referred hereafter as the EMR template file, containing persistent changeable fields of type 1.

```
<?xml version="1.0"?>
<!--Patient Electronic Medical Record Template-->
<Patient>
    <patientName value="% var % patient_name % evar %"/>
    <examinatonDate value="% var % examination_date % evar %"/>
    <medicalRecordID value="% var % medical_record_number % evar %"/>
    <item value="% var % weight % evar %">
        <name>Weight</name>
        <description>
           Body Weight
        </description>
    </item>
    <item value="% var % height % evar %">
        <name>height</name>
        <description>
           Body Height
        </description>
    </item>
    <item value="% var % temperature % evar %">
        <name>temperature</name>
        <description>
           Body Temperature
        </description>
    </item>
    <item value="% var % blood_pressure % evar %">
        <name>blood pressure value</name>
        <description>
           Blood Pressure Systolic Value/Diastolic Value
        </description>
    </item>
    <symptom>
        <description>
           % var % patient_symptom % evar %
        </description>
    </symptom>
    <diagnosis>
        <description>
           % var % diagnosis % evar %
           <!--Fill more below-->
        </description>
    </diagnosis>
```

```xml
<treatment>
    <description>
        % var % treatment % evar %
        <!--Fill more below-->
    </description>
</treatment>
</patient>
```

As discussed before, a dialog frame window with prompting labels such as that shown in FIG. 30 can be dynamically created. Suppose a patient visited the clinic for the first time, a healthcare professional ran an application based on the above method, brought up a dialog frame window, and entered input values as those shown in FIG. 30. Then an EMR record file, referred hereafter as the first EMR record file, can be generated as the following.

```xml
<?xml version="1.0"?>
<!--Patient Electronic Medical Record Template-->
<Patient>
    <patientName value="Smith, John"/>
    <examinatonDate value="Mar. 26, 2012"/>
    <medicalRecordID value="311234750"/>
    <item value="180 lb">
        <name>Weight</name>
        <description>
            Body Weight
        </description>
    </item>
    <item value="6 ft 2 in">
        <name>height</name>
        <description>
            Body Height
        </description>
    </item>
    <item value="98 f">
        <name>temperature</name>
        <description>
            Body Temperature
        </description>
    </item>
    <item value="120/70">
        <name>blood pressure value</name>
        <description>
            Blood Pressure Systolic Value/Diastolic Value
        </description>
    </item>
    <symptom>
        <description>
            cough, stuffy nose
        </description>
    </symptom>
    <diagnosis>
        <description>
            cold
            <!--Fill more below-->
        </description>
    </diagnosis>
    <treatment>
        <description>
            cold medicine
            <!--Fill more below-->
        </description>
    </treatment>
</patient>
```

In both the diagnosis segment and the treatment segment, the physician can fill out more detailed information. Patients' medical records contain sensitive information. If the above EMR record is to be transferred over the Internet to a cloud server for storage, it is more secured if an encrypted version of this record is transferred. The HIPAA Act of 1996 expects security measures such as encryption to be constructed within the EMR systems. Using the encryption algorithm described by FIG. 21 with encryption key number 29, the above EMR record can be encrypted to the following.

```
Y\5*)<3"/0&,+<Z<?NKM?\[==Y>JJ<m~1&"+1<b)"
1/,+&
<j"!&
~)<o"
J!<q"*-)~1"<<<<<<<<<JJ[==Ym~1&"+1[==<<<Y-
~1&"+1k~*"<3~)2"Z?p*&1% I=g,%+?<L[=<<<Y"5~*&+
    ~1,+a~1"<3~)2"Z?j~/
%<OSI<OMNO?<L[=<<<Y*"!&
~)o"
J!fa<3~)2"Z?PNNOPQTRM?<L[=<<<Y&1"*<3~)
    2"<Z<?NUM<)
?[=<<<<<<Y+~*"[t"&$%1YL+~*"
    [=<<<<<<=<<<<<<Y!"0
/&-1&,+[=<<<<<<<<_,!6<t"&$%1=<<<<<<YL!"0
/&-
1&,+[=<<<YL&1"*[==<<<Y&1"*<3~)
    2"<Z<?S<#1<O<&+?[=<<<<<<<Y+~*"[%"&$%1YL
+~*"[==<<<<<<Y!"0
/&-1&,+[=<<<<<<<<_,!6<e"&$%1<=<<<<<<YL!"0
/&-1&,+[=<<<YL&1"*[==<<<Y&1"*<3~)2"<Z<?VU<#?
    [=<<<<<<Y+~*"[1"*-
"/~12/"YL+~*"[==<<<<<<Y!"
/&-1&,+[=<<<<<<<<_,|6<q"*-"/~12/"=<<<<<<YL!"0
/&-1&,+[=<<<YL&1"*[==<<<Y&1"*<3~)
    2"<Z<?NOM<L<TM?[=<<<<<<Y+~*"[),!<-
/"002/"<3~)2"YL+~*"[==<<<<<<Y!"0
/&-1&,+[=<<<<<<<<_),!<m/"002/"<p601,)&
<s~)2"La&~01,)&
<s~)2"<<<<<<<<<<<=<<<<<<YL!"0
/&-1&,+[=<<<YL&1"*[==<<<Y06*-1,*[=<<<<<<Y!"0
/&-1&,+[=<<<<<<<<
,2$% I<012##6<+,0"<<<<<<<<<<=<<<<<<YL!"0
/&-1&,+[==<<<YL06*-1,*[=<<<Y!&~$+,0&0
    [=<<<<<<Y!"0
/&-1&,+[=<<<<<<<<
,)!<<=<<<<<<<<<Y>JJ<c&))<*,/"<"),4<JJ
    [<<=<<<<<=<<<<<<YL!"0
/&-1&,+[==<<<YL!&~$+,0&0[==<<<Y1/"~1*"+1
    [=<<<<<<Y!"0
/&-1&,+[=<<<<<<<<
,)!<*"!&
&+"=<<<<<<<<<Y>JJ<c&))<*,/"<"),4<JJ
    [<<<<=<<<<<=<<<<<<YL!"0
/&-1&,+[==<<<YL1/"~1*"+1[==YL-~1&"+1[
```

If the patient visits the clinic the second time, then the EMR template file can be appended to the first EMR record file and the same file generation method can be applied to generate a new target file with the accumulated medical information describing the patient's two visits. This step of appending the EMR template file to the current version of the accumulated EMR's and generating the next version of the accumulated EMR's can be repeated for each of the patient's future visits to the clinic. For security protections, the EMR template file can also contain persistent changeable fields of type 2 with audit trail data. Instead of having the generated EMR record file encrypted in whole as discussed, the EMR template file can also contain temporary changeable fields with confidential data that need to be encrypted.

What is claimed is:

1. A computer implemented method for generating a target file, comprising:
enabling a user to select a first template file, wherein the first template file includes:
a plurality of fields, including:
at least first and second changeable fields configured to be changed persistently, wherein
the first changeable field is configured to receive from a user a content value used to generate a target file;
the second changeable field is configured to receive a security-related value;
at least a third changeable field including a first value configured to be changed temporarily to receive an encrypted version of the first value,
wherein when the target file is intercepted during transmission to a first destination, the third changeable field of the target file contains the encrypted version of the first value to prevent exposure of the first value to an interceptor, wherein the encrypted version of the first value is stored with the target file during transmission, and after the target file being received at the first destination, the encrypted version of the first value will be dynamically decrypted and the third changeable field will include the first value;
one or more unchangeable fields;
parsing the first template file to generate a user interface, including:
a first prompting label, corresponding to the first changeable field, requesting the user to enter the user content value,
a second prompting label, corresponding to the second changeable field, requesting that the user enter audit data and/or access control data;
generating an encrypted version of the first value corresponding to the third changeable field, and temporarily replacing the first value with the encrypted value; and
generating the target file based at least in part on:
a user input received via the first changeable field, including the user content value,
a user input received via the second changeable field, including the audit data and/or access control data, and
on the encrypted version of the first value.

2. The method as defined in claim 1, wherein the second changeable field is configured to receive an audit trail update.

3. The method as defined in claim 1, wherein the second changeable field is configured to receive access control permission data.

4. The method as defined in claim 1, the method further comprising:
retrieving the first template file from a cloud storage system; and
dynamically generating the target file from the first template file based at least in part on user inputs received via the first changeable field, the second changeable field, and on the encrypted version of the first value.

5. The method as defined in claim 1, the method further comprising:
decrypting the encrypted version of the first value of the third changeable field at least partly in response to determining that an authorized user is accessing the first target file.

6. The method as defined in claim 1, the method further comprising:
detecting a first tag in the first template file indicating a first placeholder for the first changeable field;
at least partly in response to detecting the first tag in the first template file, extracting information of the first placeholder, and dynamically prompting the user to enter at least one value,
detecting a second tag in the first template file to indicate a second placeholder for the second changeable field;
at least partly in response to detecting the second tag in the first template file, extracting information of the second placeholder, and dynamically updating security information;
detecting a third tag in the first template file indicating a third placeholder for the third changeable field; and
at least partly in respond to detecting the third tag in the first template file, extracting the first value of the third placeholder, and replacing it by a dynamically generated encrypted value;
wherein generating the target file is performed and/or stored using a host computer or a cloud computer system.

7. The method as defined in claim 1, the method further comprising:
retrieving the first template file from a cloud storage system;
wherein generating the target file is performed dynamically, over a host computer or a cloud computer system.

8. The method as defined in claim 1, the method further comprising:
appending the generated target file with a selected second template file; and
generating a second target file based at least in part on a parsing of the generated target file with the appended selected second template file.

9. The method as defined in claim 1, the method further comprising:
appending the first changeable field with another changeable field or embedding the first changeable field within the third changeable field.

10. The method as defined in claim 1, the method further comprising using geometric equations for points, line segments, or curve segments, to encrypt the first value corresponding to the third changeable field and then to decrypt the encrypted first value.

11. The method as defined in claim 1, wherein the target file is a markup language file.

12. The method as defined in claim 1, wherein the target file is an electronic medical record file, an electronic health record file, a smartphone mobile service file, an enterprise resource planning file, a Web service file, a cloud service file, an operating system service file, or a database service file, composed of text and/or markup language.

13. The method as defined in claim 1, the method further comprising tracking the generation of the target file from the first template file using an audit trail in the form of one or more activity summary files and/or one or more tables in one or more relational databases, wherein the audit trail is describable by an object class diagram in a unified modeling language.

14. A system comprising:
one or more computing devices;
non-transitory computer readable media having instructions stored thereon that when executed by the one or more computing devices, cause the one or more computing devices to perform operations comprising:

enabling a user to select a first template file, wherein the first template file includes:
a plurality of fields, including:
at least first and second changeable fields configured to be changed persistently, wherein
the first changeable field is configured to receive from a user a content value used to generate a target file;
the second changeable field is configured to receive a security-related value;
at least a third changeable field including a first value configured to be changed temporarily to receive an encrypted version of the first value
wherein when the target file is intercepted during transmission to a first destination, the third changeable field of the target file contains the encrypted version of the first value to prevent exposure of the first value to an interceptor, wherein the encrypted version of the first value is stored with the target file during transmission, and after the target file being received at the first destination, the encrypted version of the first value will be dynamically decrypted and the third changeable field will include the first value;
one or more unchangeable fields;
parsing the first template file to generate a user interface, including:
a first prompting label, corresponding to the first changeable field, requesting the user to enter the user content value,
a second prompting label, corresponding to the second changeable field, requesting that the user enter audit data and/or access control data;
generating an encrypted version of the first value corresponding to the third changeable field, and temporarily replacing the first value with the encrypted value; and
generating the target file based at least in part on:
a user input received via the first changeable field, including the user content value,
a user input received via the second changeable field, including the audit data and/or access control data, and
on the encrypted version of the first value.

15. The system as defined in claim 14, wherein the second changeable field is configured to receive an audit trail update.

16. The system as defined in claim 14, wherein the second changeable field is configured to receive access control permission data.

17. The system as defined in claim 14, the operations further comprising:
retrieving the first template file from a cloud storage system; and
dynamically generating the target file from the first template file based at least in part on user inputs received via the first changeable field, the second changeable field, and on the encrypted version of the first value.

18. The system as defined in claim 14, the operations further comprising:
decrypting the encrypted version of the first value of the third changeable field at least partly in response to determining that an authorized user is accessing the first target file.

19. The system as defined in claim 14, the operations further comprising:
detecting a first tag in the first template file indicating a first placeholder for the first changeable field;

at least partly in response to detecting the first tag in the first template file, extracting information of the first placeholder, and dynamically prompting the user to enter at least one value,
detecting a second tag in the first template file to indicate a second placeholder for the second changeable field;
at least partly in response to detecting the second tag in the first template file, extracting information of the second placeholder, and dynamically updating security information;
detecting a third tag in the first template file indicating a third placeholder for the third changeable field; and
at least partly in respond to detecting the third tag in the first template file, extracting the first value of the third placeholder, and replacing it by a dynamically generated encrypted value;
wherein generating the target file is performed and/or stored using a host computer or a cloud computer system.

20. The system as defined in claim 14, the operations further comprising:
retrieving the first template file from a cloud storage system,
wherein generating the target file is performed dynamically, over a host computer or a cloud computer system.

21. The system as defined in claim 14, the operations further comprising:
appending the generated target file with a selected second template file; and
generating a second target file based at least in part on a parsing of the generated target file with the appended selected second template file.

22. The system as defined in claim 14, the operations further comprising:
appending the first changeable field with another changeable field or embedding the first changeable field within the third changeable field.

23. The system as defined in claim 14, the operations further comprising using geometric equations for points, line segments, or curve segments, to encrypt the first value corresponding to the third changeable field and then to decrypt the encrypted first value.

24. Non-transitory computer readable media having instructions stored thereon that when executed by a computing system, cause the computing system to perform operations comprising:
enabling a user to select a first template file, wherein the first template file includes:
a plurality of fields, including:
at least first and second changeable fields configured to be changed persistently, wherein
the first changeable field is configured to receive from a user a content value used to generate a target file;
the second changeable field is configured to receive a security-related value;
at least a third changeable field including a first value configured to be changed temporarily to receive an encrypted version of the first value,
wherein when the target file is intercepted during transmission to a first destination, the third changeable field of the target file contains the encrypted version of the first value to prevent exposure of the first value to an interceptor, wherein the encrypted version of the first value is stored with the target file during transmission, and after the target file being received at the first destination, the encrypted version of the first value will be dynamically decrypted and the third changeable field will include the first value;
one or more unchangeable fields;

parsing the first template file to generate a user interface, including:
- a first prompting label, corresponding to the first changeable field, requesting the user to enter the user content value,
- a second prompting label, corresponding to the second changeable field, requesting that the user enter audit data and/or access control data;

generating an encrypted version of the first value corresponding to the third changeable field, and temporarily replacing the first value with the encrypted value; and generating the target file based at least in part on:
- a user input received via the first changeable field, including the user content value,
- a user input received via the second changeable field, including the audit data and/or access control data, and
- on the encrypted version of the first value.

* * * * *

UNITED STATES PATENT AND TRADEMARK OFFICE
CERTIFICATE OF CORRECTION

| | | |
|---|---|---|
| PATENT NO. | : 8,352,444 B1 | Page 1 of 4 |
| APPLICATION NO. | : 13/544552 | |
| DATED | : January 8, 2013 | |
| INVENTOR(S) | : Peter Hon-You Chang | |

It is certified that error appears in the above-identified patent and that said Letters Patent is hereby corrected as shown below:

In the Drawings:

Sheet 11 of 45 (Reference Numeral 334, FIG. 6C) at line 1, delete "complier" and insert --compiler--.

Sheet 17 of 45 (Reference Numeral 712, FIG. 10A) at line 8, delete "delimter" and insert --delimiter--.

Sheet 30 of 45 (Reference Numeral 1516, FIG. 20B) at line 2, delete "encrytion" and insert --encryption--.

Sheet 31 of 45 (Reference Numeral 1520, FIG. 20C) at line 3, delete "encrytion" and insert --encryption--.

Sheet 36 of 45 (Reference Numeral 1716, FIG. 23B) at line 2, delete "encrytion" and insert --encryption--.

Sheet 37 of 45 (Reference Numeral 1719, FIG. 23C) at line 3, delete "encrytion" and insert --encryption--.

Sheet 37 of 45 (Reference Numeral 1720, FIG. 23C) at line 3, delete "encrytion" and insert --encryption--.

In the Specifications:

In column 10 at line 58, delete "createPromt" and insert --createPrompt--.

In column 10 at line 60, delete "createPromt" and insert --createPrompt--.

Signed and Sealed this
Twenty-seventh Day of August, 2013

Teresa Stanek Rea
*Acting Director of the United States Patent and Trademark Office*

CERTIFICATE OF CORRECTION (continued)

U.S. Pat. No. 8,352,444 B1

In column 19 at line 47, delete "of Field" and insert --of_Field--.

In column 21 at line 1, delete "-J" and insert --,/--.

In column 23 at line 8, delete "[]^_a" and insert --[\]^_`a--.

In column 23 at line 43, delete "encrytion" and insert --encryption--.

In column 24 at line 42, delete "Ig" and insert --I<g--.

In column 24 at line 57, delete ""'"0"'"" and insert --"+0"--.

In column 25 at line 53, delete "encrytion" and insert --encryption--.

In column 25 at line 59, delete "encrytion" and insert --encryption--.

In column 25 at line 61, delete "encrytion" and insert --encryption--.

In column 25 at line 64, delete "f-l(y)" and insert --$f$-1(y)--.

In column 26 at line 54, delete "24C" and insert --24C:--.

In column 27 at line 19, delete ""0"/" and insert --"0?/--.

In column 29 at line 62, delete "VZ" and insert --V`Z--.

In column 29 at line 66, delete "v\U" and insert --v\`U--.

In column 30 at line 1, delete "7U" and insert --7`U--.

In column 30 at line 3, delete "WYUZ" and insert --W`YU`Z--.

In column 30 at line 4, delete "WYUZ" and insert --W`YU`Z--.

In column 30 at line 4, delete "DU" and insert --D`U--.

In column 30 at line 5, delete "7U" and insert --7`U--.

In column 30 at line 6, "WYUZ" and insert --W`YU`Z--.

In column 30 at line 7, delete "][" and insert --]`[--.

In column 30 at line 7, delete "WYUZ" and insert --W`YU`Z--.

CERTIFICATE OF CORRECTION (continued)
U.S. Pat. No. 8,352,444 B1

In column 30 at line 8, delete "DU" and insert --D`U--.

In column 30 at line 8, delete "7U" and insert --7`U--.

In column 30 at line 9, delete "v\U" and insert --v\`U--.

In column 30 at line 10, delete "WYUZ" and insert --W`YU`Z--.

In column 30 at line 11-12, delete "WYUZ" and insert --W`YU`Z--.

In column 30 at line 12, delete "DU" and insert --D`U--.

In column 30 at line 37, delete "cUcc" and insert --cU` cc--.

In column 31 at line 6, delete "NR" and insert --N`R--.

In column 31 at line 13, delete "Yo" and insert --Y`o--.

In column 31 at line 14, delete "dbccabc" and insert --d`bc`cabc--.

In column 31 at line 19, delete "FmH" and insert --Fm`H--.

In column 31 at line 21, delete "m"N" and insert --m`"N--.

In column 31 at line 25, delete "MmH" and insert --Mm`H--.

In column 31 at line 27, delete "m`&M" and insert --m`'&M--.

In column 31 at line 28, delete "m"N" and insert --m`"N--.

In column 31 at line 32, delete "EmH" and insert --Em`H--.

In column 31 at line 34, delete "m`&M" and insert --m`'&M--.

In column 31 at line 35, delete "m"M" and insert --m`"N--.

In column 31 at line 35, delete "m&" and insert --m`&--.

In column 34 at line 29, delete "<examinaton" and insert --<examination--.

In column 35 at line 20, delete "<examinaton" and insert --<examination--.

CERTIFICATE OF CORRECTION (continued)
U.S. Pat. No. 8,352,444 B1

In the Claims:

In column 37 at line 16, Claim 1, change "first value," to --first value;--.

In column 39 at line 12, Claim 14, change "first value" to --first value;--.

In column 40 at line 59, Claim 24, change "first value," to --first value;--.